(12) United States Patent
Nozaki et al.

(10) Patent No.: US 7,287,517 B2
(45) Date of Patent: Oct. 30, 2007

(54) DME FUEL SUPPLY DEVICE FOR DIESEL ENGINE

(75) Inventors: Shinya Nozaki, Higashi-Matsuyama (JP); Toshifumi Noda, Higashi-Matsuyama (JP); Daijo Ushiyama, Higashi-Matsuyama (JP); Teruaki Ishikawa, Higashi-Matsuyama (JP); Yukihiro Hayasaka, Higashi-Matsuyama (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 11/612,748

(22) Filed: Dec. 19, 2006

(65) Prior Publication Data
US 2007/0084447 A1 Apr. 19, 2007

Related U.S. Application Data

(62) Division of application No. 10/506,701, filed on Mar. 7, 2005.

(51) Int. Cl.
*F02M 37/04* (2006.01)

(52) U.S. Cl. .................... 123/514; 123/446; 123/198 D

(58) Field of Classification Search ................ 123/514, 123/446, 516, 179.17, 198 D, 541, 525–7, 123/467, 196 R; 184/6.28; 417/281
See application file for complete search history.

(56) References Cited

U.S. PATENT DOCUMENTS

| | | | | |
|---|---|---|---|---|
| 2,446,604 A | * | 8/1948 | Moule | 417/270 |
| 5,074,272 A | * | 12/1991 | Bostick et al. | 123/514 |
| 6,805,105 B2 | * | 10/2004 | Kato et al. | 123/514 |
| 6,904,879 B2 | * | 6/2005 | Kato | 123/73 AD |
| 6,918,370 B2 | * | 7/2005 | Yamaoka et al. | 123/198 D |
| 6,955,156 B2 | * | 10/2005 | Noda et al. | 123/364 |
| 7,007,656 B2 | * | 3/2006 | Fujino | 123/196 R |
| 7,128,054 B2 | * | 10/2006 | Koehler et al. | 123/446 |
| 2002/0078929 A1 | * | 6/2002 | Schueler | 123/464 |
| 2003/0000504 A1 | * | 1/2003 | Katayama et al. | 123/516 |
| 2005/0235948 A1 | * | 10/2005 | Hayasaka et al. | 123/255 |
| 2006/0054141 A1 | * | 3/2006 | Nozaki et al. | 123/514 |

\* cited by examiner

*Primary Examiner*—Carl S. Miller
(74) *Attorney, Agent, or Firm*—Priest & Goldstein, PLLC

(57) ABSTRACT

In the DME fuel supply device for a diesel engine, the time necessary to retrieve DME fuel remaining in the injection system after stopping the diesel engine into the fuel tank can be reduced. In a non-injection state, a three-way valve (71) is controlled to be OFF to form a communication passage in the direction indicated by the arrow B and a two-way valve (72) is controlled to be ON. DME fuel delivered from a feed pump (5) is delivered to an aspirator (7), passed from an inlet (7a) to the outlet (7b) thereof and returned to a fuel tank (4). That is, the DME fuel circulates via the aspirator. A vapor-phase pressure delivery pipe switching solenoid valve (75) is controlled to be ON and opened so that flow can pass through a vapor-phase pressure delivery pipe (73) connecting the vapor-phase (4a) in the fuel tank (4) and the inlet of the fuel gallery (11). DME fuel in a liquid state remaining in the fuel gallery (11), an overflow fuel pipes (8) and (9) is delivered under pressure to a suction port (7c) by the high pressure of the vapor-phase (4a).

16 Claims, 23 Drawing Sheets

(a)

(b)

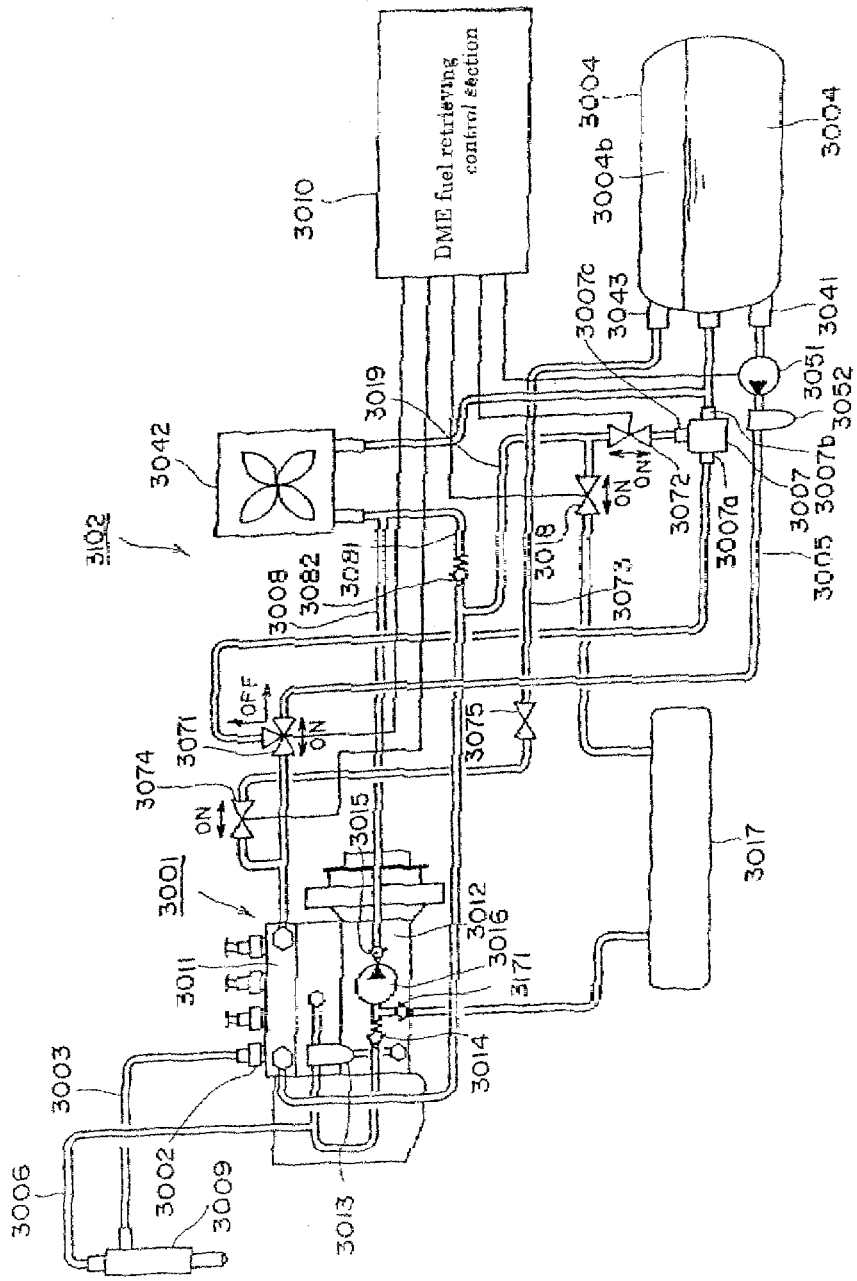

DME FUEL SUPPLY DEVICE FOR DIESEL ENGINE

TECHNICAL FIELD

This invention relates to an injection pump of a DME fuel supply device for a diesel engine and a DME fuel supply device for a diesel engine provided with the injection pump.

BACKGROUND ART

A diesel engine which uses clean-burning DME (dimethyl ether), instead of light oil, as fuel is now attracting attention as means for reducing air pollution by diesel engines. DME fuel is a liquefied gas fuel unlike light oil as a conventional fuel. That is, DME fuel has a boiling point lower than that of light oil and vaporizes at room temperature, whereas light oil exists as a liquid at atmospheric pressure and temperature. Thus, in a diesel engine using DME fuel, there is a possibility that when DME fuel remaining in the injection system after stopping the engine leaks from a nozzle seat of a fuel injection nozzle into a cylinder of the engine and is evaporated therein and then the evaporated DME fuel fills the cylinder, abnormal combustion such as knocking occurs at the next start of the engine and the engine cannot be normally started, resulting in significant vibration and noise.

When the DME fuel remaining in the injection system of the DME fuel supply device after stopping the engine is retrieved into a tank by suction means such as an aspirator, it is possible to prevent abnormal combustion such as knocking at the next start of the engine caused by the DME fuel remaining in the injection system after stopping the engine. The aspirator does not suck the DME fuel using a suction force source such as a pump but creates a circulating flow of DME fuel using an injection pump for delivering DME fuel as a driving source and sucks the DME fuel by a suction force created by the flow of DME fuel.

However, it is difficult to suck all the DME fuel remaining in the injection system of the DME fuel supply device after stopping the engine into the tank with suction means such as an aspirator within a short period of time. This is because evaporated DME fuel cannot be sucked since the suction force of the aspirator is weak and since communication between the injection system and the fuel tank is shut off when the engine is stopped and the injection system is almost hermetically closed. That is, the DME fuel remaining in the injection system of the DME fuel supply device cannot be entirely retrieved before the DME fuel remaining in the injection system of the DME fuel supply device is entirely evaporated by residual heat of the engine or naturally.

Thus, it takes some time to retrieve the DME fuel remaining in the injection system of the DME fuel supply device entirely. It is, hence, impossible to retrieve the DME fuel remaining in the injection system of the DME fuel supply device entirely when the engine is stopped for a short period of time such as during idling stop at a signal crossing in an urban area, and abnormal combustion such as knocking may occur when the engine is restarted.

In a DME fuel supply device for a diesel engine using DME as fuel, DME fuel is supplied under pressure to a fuel gallery of the injection pump by a feed pump or the like to prevent it from evaporating, and highly-pressurized DME fuel is delivered under pressure to the fuel injection nozzle of the diesel engine through an injection pipe. Then, DME fuel overflowed from the fuel injection nozzle is delivered to a nozzle return pipe, and DME fuel overflowed from the fuel gallery is delivered to an overflow fuel pipe. The DME fuel delivered to the nozzle return pipe and the overflow fuel pipe is returned to the fuel tank through an overflow return pipe after having been cooled in a cooler or the like.

However, DME fuel is more likely to be affected by temperature by its nature than light oil fuel is, and the injection characteristics of DME fuel injected from the fuel injection nozzle are significantly changed by a small increase in temperature. Thus, when heat from the DME fuel supply device or the diesel engine is transmitted to the injection pipe and increases the temperature of the injection pipe, and the temperature of DME fuel delivered under pressure to the fuel injection nozzle is increased, the injection characteristics of DME fuel injected from the fuel injection nozzle may be unstable.

Also, immediately after the diesel engine has been stopped, the diesel engine is high in temperature and the injection pipe is also high in temperature. Thus, when DME fuel in a liquid state is filled into the injection pipe high in temperature from the fuel tank to restart the engine immediately, part of the DME fuel filled into the injection pipe may be evaporated by heat from the injection pipe and the evaporated DME fuel may prevent the DME fuel in a liquid state from filling the injection pipe.

It is necessary to correct the fuel injection amount with temperature using an electronic governor or the like to make the amount of DME fuel injected from the injection pump constant regardless of the changes in temperature of the DME fuel in the fuel gallery. Thus, in an injection pump provided with a mechanical governor the amount of DME fuel injected from the injection pump cannot be constant regardless of the changes in temperature of the DME fuel in the fuel gallery and the injection characteristics of DME fuel cannot be stabilized.

DISCLOSURE OF THE INVENTION

This invention has been made in view of the above circumstances, and an object of this invention is to reduce the time to retrieve DME fuel in the fuel injection system of a DME fuel supply device for a diesel engine after stopping the diesel engine.

Another object of this invention is to reduce the possibility that the injection characteristics of DME fuel injected from the fuel injection nozzle become unstable when the temperature of the injection pipe is increased and the possibility that DME fuel cannot be filled into the injection pipe when DME fuel is supplied into the injection pipe immediately after the diesel engine has been stopped.

Yet another object of this invention is to stabilize the injection characteristics of DME fuel without correcting the injection amount of the DME fuel by maintaining the temperature of the DME fuel in the fuel gallery constant.

In accomplishing the above objects, the first aspect of this invention is a DME fuel supply device for a diesel engine having a feed pump for pressurizing DME fuel in a fuel tank to a specified pressure and delivering it into a feed pipe an injection pump for delivering DME fuel in a fuel gallery into which the DME fuel delivered via the feed pipe flows in a specified amount to an injection pipe communicated with a fuel injection nozzle of the diesel engine at specified timing, an overflow fuel pipe for returning DME fuel overflowed from the fuel injection nozzle and DME fuel overflowed from the injection pump to the fuel tank, and residual fuel retrieving means for retrieving DME fuel remaining in the fuel gallery and the overflow fuel pipe after stopping the diesel engine into the fuel tank the DME fuel supply device comprising a vapor-phase pressure delivery pipe connecting an inlet of the fuel gallery to which the feed pipe is connected and a vapor phase in the fuel tank and a vapor-phase pressure delivery pipe switching solenoid valve for opening and closing the vapor-phase pressure delivery pipe.

When the vapor-phase pressure delivery pipe switching solenoid valve is opened after stopping the diesel engine, the vapor phase in the fuel tank and the inlet of the fuel gallery is communicated with each other via the vapor-phase pressure delivery pipe and the pressure of the vapor phase in the fuel tank is transmitted into the fuel gallery. The vapor phase in the fuel tank has a pressure higher than that in the fuel gallery since the DME fuel vaporizes. Thus, the DME fuel in a liquid state remaining in the fuel gallery and the overflow fuel pipe can be forcibly delivered under pressure to the residual fuel retrieving means by the pressure of the vapor phase in the fuel tank.

According to the DME fuel supply device for a diesel engine of the first aspect, the DME fuel in a liquid state remaining in the fuel gallery and the overflow fuel pipe can be forcibly delivered under pressure to the residual fuel retrieving means by the pressure of the vapor phase in the fuel tank. It is, therefore, possible to achieve the effect that the time necessary for the residual fuel retrieving means to retrieve the DME fuel remaining in the fuel gallery and the overflow fuel pipe into the fuel tank can be reduced.

The second aspect of this invention is the DME fuel supply device for a diesel engine of the first aspect, wherein the vapor-phase pressure delivery pipe has a small-diameter portion where the inside diameter is partially reduced.

Since the pressure of the evaporated DME fuel delivered from the vapor phase in the fuel tank is further increased by the small-diameter portion, the DME fuel in a liquid state remaining in the fuel gallery and the overflow fuel pipe can be delivered under a higher pressure to the residual fuel retrieving means.

According to the DME fuel supply device for a diesel engine of the second aspect of this invention, the DME fuel in a liquid state remaining in the fuel gallery and the overflow fuel pipe can be forcibly delivered under a higher pressure to the residual fuel retrieving means. It is, therefore, possible to achieve the effect, in addition to the effect of the first aspect, that the time necessary to retrieve the DME fuel remaining in the fuel gallery and the overflow fuel pipe into the fuel tank can be further reduced.

The third aspect of this invention is the DME fuel supply device for a diesel engine of the first or second aspect, wherein the residual fuel retrieving means has an aspirator which is disposed between the feed pipe and the overflow fuel pipe and which returns DME fuel delivered from the feed pump to the fuel tank so that the DME fuel remaining in the fuel gallery and the overflow fuel pipe can be drown by the returning DME fuel and retrieved into the fuel tank.

As described before, the aspirator does not suck the DME fuel using a suction force source such as a pump but creates a circulating flow of DME fuel using an injection pump for delivering DME fuel as a driving source and sucks the DME fuel remaining in the fuel gallery and the overflow fuel pipe by a suction force created by the flow of DME fuel. That is, the suction force of the aspirator is weaker than that of a suction force source such as a pump, so that the aspirator can suck only evaporated DME fuel in the fuel gallery and the overflow fuel pipe.

According to the DME fuel supply device for a diesel engine of the third aspect, DME fuel in a liquid state before evaporation can be forcibly delivered under pressure to the aspirator. It is, therefore, possible to achieve the effect of the first or second aspect with high effectiveness.

The fourth aspect of this invention is the DME fuel supply device for a diesel engine of the third aspect, wherein the residual fuel retrieving means has a first solenoid valve for communicating a delivery port of the feed pipe with either an inlet to a circulation passage of the aspirator or an inlet to the fuel gallery; a second solenoid valve for opening and closing the communication of a suction port of the aspirator with the fuel gallery and the overflow fuel pipe; and a DME fuel retrieving control section for performing control to switch the first solenoid valve to communicate it with the inlet of the aspirator and open the second solenoid valve to form a passage for returning the DME fuel delivered from the feed pump to the fuel tank and open the vapor-phase pressure delivery pipe switching solenoid valve and to close only the vapor-phase pressure delivery pipe switching solenoid valve after a lapse of a predetermined period of time.

By switching the first and second solenoid valves, a circulating flow of DME fuel which flows out of the fuel tank, passes from the inlet to the outlet of the aspirator and returns to the fuel tank is created. At the same time, the vapor-phase pressure delivery pipe switching solenoid valve is opened to deliver the DME fuel in a liquid state remaining in the fuel gallery and the overflow fuel pipe forcibly to the residual fuel retrieving means by the pressure of the vapor phase in the fuel tank. Then, only the vapor-phase pressure delivery pipe switching solenoid valve is closed after a lapse of a predetermined period of time to keep the pressure in the fuel gallery and the overflow fuel pipe low. That is, only the vapor-phase pressure delivery pipe switching solenoid valve is closed after the DME fuel remaining in a liquid state in the fuel gallery and the overflow fuel pipe has been delivered under pressure by the pressure of the vapor phase. The pressure in the fuel gallery and the overflow fuel pipe is thereby kept low and evaporation of DME fuel in a liquid state which was unable to be delivered under pressure and remains in a small amount is promoted. Thus, the DME fuel in the fuel gallery and the overflow fuel pipe can be retrieved into the fuel tank within a shorter period of time.

According to the DME fuel supply device for a diesel engine of the fourth aspect, evaporation of DME fuel in a liquid state which was unable to be delivered under pressure can be promoted. It is, therefore, possible to achieve the effect, in addition to the effect of the third aspect, that the time necessary for the residual fuel retrieving means to retrieve the DME fuel remaining in the fuel gallery and the overflow fuel pipe into the fuel tank can be further reduced.

The fifth aspect of this invention is the DME fuel supply device for a diesel engine of the first or second aspect, wherein the injection pump has an injection pump element having a delivery valve which can be opened and closed by up-and-down movement of a plunger in engagement with a camshaft rotated by rotation transmitted from a driving shaft of the diesel engine and which can deliver the DME fuel in the fuel gallery into which the DME fuel delivered from the fuel tank via the feed pipe flows in a specified amount to an injection pipe in communication with a fuel injection nozzle of a diesel engine at specified timing; and injection state switching means for switching the injection pump element between an injection state in which the delivery valve is opened and closed by a cam of the camshaft and a non-injection state in which the delivery valve is not opened and closed even when the plunger is moved up and down by the cam, and wherein the injection pump element allows communication between the injection pipe and the fuel gallery even if the delivery valve is closed only in the non-injection state.

Since the injection pipe and the fuel gallery are communicated with each other even if the delivery valve is closed after the injection pump element has been brought into the non-injection state by the injection state switching means and the diesel engine has been stopped, DME fuel remaining in the injection pipe can be retrieved when the residual fuel retrieving means retrieves the DME fuel remaining in the fuel gallery.

According to the DME fuel supply device for a diesel engine of the fifth aspect, DME fuel remaining between the injection pump element and the fuel injection nozzle after stopping the engine can be retrieved since the DME fuel remaining in the injection pipe can be retrieved when the residual fuel retrieving means retrieves the DME fuel remaining in the fuel gallery after stopping the engine. It is, therefore, possible to obtain an effect, in addition to the effect of the first or second aspect, that abnormal combustion such as knocking which prevents the engine from starting normally and causes significant vibration and noise can be avoided.

The sixth aspect of this invention is the DME fuel supply device for a diesel engine of the fifth aspect, wherein the plunger of the injection pump element has a generally cylindrical shape and is rotated circumferentially in a plunger barrel by the injection state switching means, and the injection amount of the DME fuel is changed according to the rotational position of the plunger, and wherein the injection pump element is brought into the non-injection state and a purge passageway for communicating the injection pipe and the fuel gallery is formed when the plunger is rotated to such a rotational position that the injection amount is zero.

In the DME fuel supply device for a diesel engine of the sixth aspect, the plunger of the injection pump element is rotated circumferentially by the injection state switching means and the injection amount of the DME fuel is changed according to the rotational position of the plunger, and the injection pump element is brought into the non-injection state and a purge passageway for communicating the injection pipe and the fuel gallery is formed when the plunger is rotated to such a rotational position that the injection amount is zero, whereby the effect of the fifth aspect can be achieved.

The seventh aspect of this invention is the DME fuel supply device for a diesel engine of the sixth aspect, wherein the injection pump element has a delivery valve holder having a delivery valve insertion hole communicated with the injection pipe; a delivery valve received in the delivery valve insertion hole for reciprocating movement; a delivery valve seat disposed integrally with the delivery valve holder and having a valve seat part for shutting off the communication between the injection pipe and the fuel gallery to establish a valve-closed state when a valve part of the delivery valve comes into contact with it; a delivery spring for urging the delivery valve toward the delivery valve seat; a plunger barrel disposed integrally with the delivery valve seat and having a compression chamber communicated with the delivery valve seat; a plunder received in the compression chamber for reciprocating movement and having an end opposed to the delivery valve; and a plunger spring for urging the plunger toward the cam wherein, when the injection pump element is in the injection state, the plunger is pushed up from the valve-closed state by the cam to shut off the communication between the compression chamber and the fuel gallery, the DME fuel in the compression chamber pushes up to open the delivery valve and brings the delivery valve into an open state, the DME fuel in the compression chamber is delivered under pressure to the injection pipe through the delivery valve in the open state, the compression chamber and the fuel gallery are communicated with each other again via a notch formed in an outer peripheral surface of the plunger, and the liquid pressure in the compression chamber is decreased and the delivery valve is closed by the urging force of the delivery spring, and wherein, when the injection pump element is in the non-injection state, the plunger is rotated circumferentially by the injection state switching means to such a rotational position that a purge groove formed in an outer peripheral surface of the plunger and a purge port formed in an inner peripheral surface of the plunger barrel are communicated with each other, and the injection pipe and the fuel gallery are communicated with each other via the purge port, the purge groove, and a purge passage formed in the delivery valve seat for communicating the injection pipe and the purge port.

Since the injection pump is brought into the non-injection state from the injection state when the plunger is rotated circumferentially by the injection state switching means to such a rotational position that the purge groove formed in an outer peripheral surface of the plunger and the purge port formed in an inner peripheral surface of the plunger barrel are communicated with each other, a purge passageway for communicating the injection pipe and the fuel gallery is formed via a purge passage formed in the delivery valve seat for communicating the injection pipe and the purge port and the DME fuel remaining in the injection pipe can be retrieved when the residual fuel retrieving means retrieves the DME fuel remaining in the fuel gallery after the stopping of the engine.

In the DME fuel supply device for a diesel engine of the seventh aspect, the injection pump is brought into the non-injection state from the injection state when the plunger is rotated circumferentially by the injection state switching means to such a rotational position that the purge groove formed in an outer peripheral surface of the plunger and the purge port formed in an inner peripheral surface of the plunger barrel are communicated with each other, whereby the effect of the sixth aspect can be achieved.

The eighth aspect of this invention is the DME fuel supply device for a diesel engine of the fifth aspect, wherein the injection pump has a cam chamber in which the camshaft is placed and lubricating oil is reserved and which has an exclusive lubricating system separated from a lubricating system of the diesel engine, and wherein an oil separator for separating DME fuel from lubricating oil containing the DME fuel and a compressor driven by a cam of the camshaft for pressurizing the separated DME fuel and delivering it to the fuel tank are disposed in the cam chamber.

Since the cam chamber has an exclusive lubricating system which is separated from the lubricating system of the diesel engine, there is no possibility that DME fuel leaked through a gap between the plunger and the plunger barrel of the injection pump element enters the lubricating system of the diesel engine. Also, since DME fuel mixed in the lubricating oil is separated from by the oil separator provided in the cam chamber and the separated DME fuel is delivered to the fuel tank by the compressor, it is possible to prevent degradation of the lubrication performance of the lubricating oil caused by DME fuel mixed in the lubricating oil. Further, the compressor is driven by a cam in the cam chamber, there is no need for a driving source, such as an electric motor, for driving the compressor.

According to the DME fuel supply device for a diesel engine of the eighth aspect, there is no possibility that DME fuel leaked though the gap between the plunger and the plunger barrel of the injection pump element enters the lubricating system of the diesel engine. It is, therefore, possible to achieve the effect, in addition to the effect of the fifth aspect, that the possibility that the DME fuel having entered the lubricating system of the diesel engine is evaporated and the evaporated DME fuel enters the crank chamber of the engine and is ignited therein can be eliminated.

Also, since it is possible to prevent degradation of the lubricating performance of the lubricating oil caused by DME fuel mixed in the lubricating oil, it is possible to prevent degradation of the performance of the injection pump caused by degradation of the lubrication performance of the lubricating oil or the like. Further, since there is no need for a driving source for driving the compressor, it is possible to achieve a low power consumption DME fuel supply device for a diesel engine.

The ninth aspect of this invention is a DME fuel supply device for a diesel engine having an injection pump for delivering DME fuel supplied from a fuel tank via a feed pipe in a specified amount to an injection pipe in communication with a fuel injection nozzle of the diesel engine at specified timing, the DME fuel supply device comprising means for cooling the injection pipe.

Since the DME fuel supply device is provided with the means for cooling the injection pipe, it is possible to prevent heat from the DME fuel supply device and the diesel engine from being transferred to the injection pipe and increasing the temperature of the injection pipe.

According to the DME fuel supply device for a diesel engine of the ninth aspect, since temperature rise of the injection pipe can be prevented, temperature rise of DME fuel delivered under pressure to the fuel injection nozzle can be prevented. It is, therefore, possible to achieve the effect that the possibility that the injection characteristics of DME fuel injected from the fuel injection nozzle become unstable can be reduced. Also, since temperature rise of the injection pipe can be prevented, it is possible to achieve the effect that the possibility that part of the DME fuel filled into the injection pipe is evaporated and the evaporated DME fuel prevents DME fuel from filling into the injection pipe when DME fuel is supplied into the injection pipe from the fuel tank immediately after the diesel engine is stopped can be reduced.

The tenth aspect of this invention is the DME fuel supply device for a diesel engine of the ninth aspect, wherein the injection pipe has an injection fuel passage through which DME fuel delivered from the injection pump to the fuel injection nozzle flows and a coolant passage through which coolant for cooling the DME fuel flowing through the injection fuel passage flows, and has a double pipe structure in which the coolant flows along the outer peripheral surface of the injection fuel passage.

Since the injection pipe has a double pipe structure having an injection fuel passage and a coolant passage through which coolant for cooling DME fuel flowing through the injection fuel passage flows, the coolant flowing through the coolant passage can prevent temperature rise of the injection pipe.

In the DME fuel supply device of the tenth aspect, the injection pipe has a double pipe structure having an injection fuel passage and a coolant passage through which coolant for cooling DME fuel flowing through the injection fuel passage flows, whereby the effect of the ninth aspect can be achieved.

The eleventh aspect of this invention is the DME fuel supply device for a diesel engine of the tenth aspect, wherein a coating of a heat insulating material is applied on the outer peripheral surface of the injection pipe.

According to the DME fuel supply device for a diesel engine of the eleventh aspect, the coating of a heat insulating material applied on the outer peripheral surface of the injection pipe can insulate heat to the injection pipe from around it. It is, therefore, possible to achieve the effect, in addition to the effect of the tenth aspect that the temperature rise of the injection pipe can be reliably prevented.

The twelfth aspect of this invention is the DME fuel supply device for a diesel engine of the tenth or eleventh aspect, further comprising an overflow fuel pipe for returning the DME fuel overflowed from the fuel injection pump to the fuel tank; and a nozzle return pipe for delivering DME fuel overflowed from the fuel injection nozzle to the overflow fuel pipe, wherein the DME fuel flows from the feed pipe to the nozzle return pipe through the coolant passage as the coolant.

According to the DME fuel supply device for a diesel engine of the twelfth aspect, the injection pipe can be efficiently cooled with DME fuel in the fuel tank as coolant by using DME fuel with a relatively low temperature before being delivered to the fuel gallery through the feed pipe as coolant, that is, by forming a circulation route for circulating DME fuel from the feed pipe to the fuel tank via the coolant passage and the nozzle return pipe. It is, therefore, possible to achieve the effect, in addition to the effect of the tenth or eleventh aspect, that the means for cooling the injection pipe can be constituted at a low cost.

The thirteenth aspect of this invention is the DME fuel supply device for a diesel engine of the twelfth aspect, further comprising a overflow valve disposed in the overflow pipe for maintaining the pressure of the DME fuel in the fuel gallery in the injection pump and regulating the overflowed DME fuel to flow only in the direction of being returned to the fuel tank, wherein the nozzle return pipe is connected downstream of the overflow valve.

The upstream of the overflow valve for maintaining the pressure of DME fuel in the fuel gallery is communicated with the fuel gallery with a high pressure and the downstream of the overflow valve is communicated with the fuel tank. Since DME fuel as coolant flows through the coolant passage from the feed pipe to the nozzle return pipe as described before, when the nozzle return pipe is connected to the downstream of the overflow valve, a circulation route for circulating DME fuel from the feed pipe to the fuel tank via the coolant passage and the nozzle return pipe can be formed. That is, DME fuel can be supplied to the fuel gallery and delivered to the coolant passage as coolant when the feed pump delivers the DME fuel in the fuel tank to the feed pipe.

In the DME fuel supply device for a diesel engine of the thirteenth aspect, DME fuel as coolant can be delivered to the coolant passage, whereby the effect of the twelfth aspect can be achieved.

The fourteenth aspect of this invention is the DME fuel supply device for a diesel engine of the thirteenth aspect, further comprising a check valve disposed in the nozzle return pipe for regulating the overflowed DME fuel from the fuel injection nozzle to flow only in the direction of being returned to the fuel tank.

Since the nozzle return pipe is connected to the downstream of the overflow valve, DME fuel in the nozzle return pipe may flow in reverse direction when the diesel engine is stopped. When a check valve is disposed in the nozzle return pipe, it is possible to prevent DME fuel in the nozzle return pipe from flowing in reverse direction when the diesel engine is stopped.

The fifteenth aspect of this invention is the DME fuel supply device for a diesel engine of the thirteenth aspects further comprising residual fuel retrieving means for retrieving the DME fuel remaining in the fuel gallery, the nozzle return pipe and the overflow fuel pipe after stopping the diesel engine into the fuel tank; and a coolant passage retrieving pipe for connecting the upstream side of the overflow valve and the nozzle return pipe when the residual fuel retrieving means retrieves the DME fuel in the coolant passage.

Since the upstream of the overflow valve for maintaining the pressure of DME fuel in the fuel gallery is communicated with the fuel gallery, DME fuel remaining in the fuel gallery has to be retrieved from the upstream side of the overflow valve. However, since the nozzle return pipe is connected to the downstream of the overflow valve, the overflow valve is located between the nozzle return pipe and the fuel gallery and DME fuel remaining in the nozzle return pipe cannot be retrieved when the residual fuel retrieving means retrieves the DME fuel in the fuel gallery because of the overflow valve.

When a coolant passage retrieving pipe connecting the upstream of the overflow valve and the nozzle return pipe is provided, DME fuel remaining in the nozzle return pipe can be retrieved from the upstream side of the overflow valve. When a solenoid valve or the like capable of opening and closing the coolant passage retrieving pipe is provided so that the coolant passage retrieving pipe can be opened when the residual fuel retrieving means retrieves DME fuel in the coolant passage, the DME fuel remaining in the nozzle return pipe can be retrieved.

According to the DME fuel supply device for a diesel engine of the fifteenth aspect, it is possible to achieve the effect, in addition to the effect of the thirteenth aspect, that DME fuel remaining in the nozzle return pipe can be retrieved through a coolant passage retrieving pipe for connecting the upstream of the overflow valve and the nozzle return pipe when the residual fuel retrieving means retrieves DME fuel.

The sixteenth aspect of this invention is the DME fuel supply device for a diesel engine of the fifteenth aspect, further comprising an oil separator for separating DME fuel contained in lubricating oil in the cam chamber in the injection pump having an exclusive lubricating system which is separated from the lubricating system of the diesel engine; a compressor for pressurizing the DME fuel separated by the oil separator and delivering it to the fuel tank; a low-pressure tank disposed between the oil separator and the compressor; a purge pipe for communicating the low-pressure tank and the overflow fuel pipe; and a purge pipe switching solenoid valve for opening and closing the purge pipe.

Since DME fuel vaporizes at room temperature as described before and has a low viscosity DME fuel leaks from the plunger of the injection pump element into the cam chamber in the injection pump. When the cam chamber of the injection pump has an exclusive lubricating system which is separated from the lubricating system of the diesel engine, and when DME fuel leaked into the cam chamber and mixed in the lubricating oil is separated by the oil separator and delivered to the fuel tank by the compressor, it is possible to eliminate the possibility that DME fuel leaked into the cam chamber is ignited therein.

When the diesel engine is stopped, the residual fuel retrieving means retrieves DME fuel remaining in the fuel gallery, the nozzle return pipe and the overflow fuel pipe (which will be hereinafter referred to as "injection system" as a whole) to prevent the DME fuel remaining in the injection system from vaporizing and filling the injection system of the diesel engine to cause abnormal combustion at the next start of the engine. However, as described before, it is difficult to suck all the DME fuel remaining in the injection system of the DME fuel supply device after stopping the diesel engine into the tank with suction means such as an aspirator within a short period of time, and it takes some time to retrieve the DME fuel remaining in the injection system of the DME fuel supply device entirely.

Since the low-pressure tank is provided between the oil separator and the compressor, the pressure in the low-pressure tank is kept low by the suction force of the compressor. Also, a purge pipe communicating the low-pressure tank and the overflow fuel pipe and a purge pipe switching solenoid valve capable of opening and closing the purge pipe are provided. Thus, the purge pipe switching solenoid valve is controlled to be opened to communicate the injection system with the low-pressure tank via the purge pipe, part of DME fuel remaining in the injection system can be sucked and retrieved into the low-pressure tank by the negative pressure in the low-pressure tank maintained by the suction force of the compressor. Since part of the DME fuel remaining in the injection system can be retrieved through a route which is different from the residual fuel retrieving means, the load on the residual fuel retrieving means can be reduced and the time necessary for the residual fuel retrieving means to retrieve DME fuel can be thereby reduced.

According to the DME fuel supply device for a diesel engine of the sixteenth aspect, part of DME fuel remaining in the injection system can be sucked and retrieved into the low-pressure tank by the negative pressure in the low-pressure tank maintained by the suction force of the compressor. It is, therefore, possible to achieve the effect, in addition to the effect of the fifteenth aspect, that the time necessary for the residual fuel retrieving means to retrieve DME fuel remaining in the injection system can be reduced.

The seventeenth aspect of this invention is the DME fuel supply device for a diesel engine of the sixteenth aspect, further comprising a check valve disposed between the oil separator and the low-pressure tank for maintaining the pressure on the oil separator side and preventing DME fuel from flowing in reverse direction from the low-pressure tank to the oil separator.

Since the check valve maintains the pressure on the oil separator side, that is, in the cam chamber of the injection pump, at a specified level and prevents DME fuel from flowing in reverse direction from the low-pressure tank to the oil separator, the pressure in the cam chamber can be maintained higher than atmospheric pressure. Thus, it is possible to prevent the pressure in the cam chamber from becoming lower than atmospheric pressure and atmospheric air from entering the injection pump.

According to the DME fuel supply device of the seventeenth aspect, it is possible to achieve the effect, in addition to the effect of the sixteenth aspect, that the pressure in the low-pressure tank can be low with the pressure in the cam chamber kept higher than atmospheric pressure by the check valve disposed between the oil separator and the low-pressure tank.

The eighteenth aspect of this invention is the DME fuel supply device for a diesel engine of the sixteenth aspect, further comprising DME fuel retrieving control section for performing control to retrieve the DME fuel remaining in the fuel gallery; the nozzle return pipe and the overflow fuel pipe into the fuel tank with the residual fuel retrieving means for a predetermined period of time and then open the purge pipe switching solenoid valve to retrieve the DME fuel which was unable to be retrieved by the residual fuel retrieving means using a negative pressure in the low-pressure tank after stopping the diesel engine.

According to the DME fuel supply device for a diesel engine of the eighteenth aspect, when the DME fuel retrieving control section communicates the low-pressure tank and the injection system after the residual fuel retrieving means has retrieves DME fuel remaining in the injection system, DME fuel which was unable to be retrieved by the residual fuel retrieving means can be retrieved by the negative pressure in the low-pressure tank at once. It is, therefore, possible to achieve the effect, in addition to the effect of the sixteenth aspect, that the operation of the residual fuel retrieving means and the low-pressure tank to retrieve DME fuel in the injection system can be performed with the highest effectiveness and efficiency.

The nineteenth aspect of this invention is the DME fuel supply device for a diesel engine of the sixteenth aspect, further comprising a supply fuel cooling unit for cooling DME fuel flowing through the feed pipe with a cooling cycle using the DME fuel as coolant; temperature detecting means for detecting the temperature of the DME fuel in the injection pump; and a supply fuel temperature control section for controlling the supply fuel cooling unit to control the temperature of the DME fuel flowing through the feed pipe so that the temperature of DME fuel to be delivered to the injection pipe can be constant based on the temperature of the DME fuel in the injection pump detected by the temperature detecting means.

The temperature of DME fuel in the fuel gallery can be maintained constant by controlling the supply fuel cooling unit so that the temperature of DME fuel to be delivered to the injection pipe can be constant based on the temperature of DME fuel in the injection pump detected by the temperature detecting means.

According to the DME fuel supply device of the nineteenth aspect, the temperature of the DME fuel in the fuel gallery can be maintained constant and the temperature of DME fuel in the fuel gallery can be thereby maintained constant. It is, therefore, possible to achieve the effect, in addition to the effect of the sixteenth aspect that the injection characteristics of DME fuel can be stabilized without correcting the injection amount of the DME fuel by maintaining the temperature of the DME fuel.

The twentieth aspect of this invention is the DME fuel supply device for a diesel engine of the nineteenth aspect, wherein the supply fuel cooling unit has a fuel cooler using DME fuel as coolant; a coolant supply pipe for supplying DME fuel as the coolant from the fuel tank to the fuel cooler; and a coolant supply pipe switching solenoid valve for opening and closing the coolant supply pipe, wherein the fuel cooler evaporates DME fuel flowing through the coolant supply pipe and cools DME fuel flowing through the feed pipe using the heat of vaporization of the DME fuel, and wherein the supply fuel temperature control section control the temperature of the DME fuel flowing through the feed pipe by opening and closing the coolant supply pipe switching solenoid valve.

DME fuel vaporizes at room temperature as described before. Thus, when a cooling cycle using DME fuel as coolant is constituted, DME fuel in the feed pipe can be cooled using the heat of vaporization of the DME fuel. That is, since the DME fuel in the feed pipe can be cooled by a fuel cooler utilizing the excellent characteristics of DME fuel as a coolant effectively, the supply fuel cooling unit can be constituted reasonably.

According to the DME fuel device of the twentieth aspect, the supply fuel cooling unit can be constituted reasonably with a fuel cooler utilizing the excellent characteristics of DME fuel as a coolant effectively. It is, therefore possible to achieve the effect, in addition to the effect of the nineteenth aspect, that the cost for the DME fuel supply device for a diesel engine can be decreased.

The twenty-first aspect of this invention is the DME fuel supply device for a diesel engine of the twentieth aspect, wherein the DME fuel supplied from the fuel tank to the fuel cooler and evaporated therein is delivered to the compressor.

Since DME fuel supplied to the fuel cooler and evaporated therein is delivered to the compressor, the DME fuel separated from lubricating oil by the oil separator and the DME fuel supplied to the fuel cooler and evaporated therein can be pressurized and delivered to the fuel tank by one compressor. Thus, the supply fuel cooling unit can be constituted with efficiency.

According to the DME fuel supply device for a diesel engine of the twenty-first aspect, the supply fuel cooling unit can be constituted with efficiency. It is, therefore, possible to achieve the effect, in addition to the effect of the twentieth aspect, that the cost for the DME fuel supply device for a diesel engine can be further decreased.

The twenty-second aspect of this invention is the DME fuel supply device for a diesel engine of any one of the ninth to the eleventh aspects, wherein the DME fuel delivered from the injection pump is supplied to a common rail and delivered to the fuel injection nozzle from the common rail.

According to the DME fuel supply device for a diesel engine of the twenty-second aspect, it is possible to achieve the effect of any one of the ninth to eleventh aspects in a common rail type DME fuel supply device for a diesel engine.

The twenty-third aspect of this invention is a DME fuel supply device for a diesel engine having an injection pump for delivering DME fuel supplied from a fuel tank via a feed pipe in a specified amount to an injection pipe in communication with a fuel injection nozzle of the diesel engine at specified timing, the DME fuel supply device comprising a supply fuel cooling unit for cooling DME fuel flowing through the feed pipe with a cooling cycle using DME fuel as coolant, temperature detecting means for detecting the temperature of DME fuel in the injection pump; and a supply fuel temperature control section for controlling the supply fuel cooling unit to control the temperature of DME fuel flowing through the feed pipe so that the temperature of DME fuel to be delivered to the injection pipe can be constant based on the temperature of DME fuel in the injection pump detected by the temperature detecting means.

The temperature of DME fuel in the fuel gallery can be maintained constant by controlling the supply fuel cooling unit so that the temperature of DME fuel to be delivered to the injection pipe can be constant based on the temperature of DME fuel in the injection pump detected by the temperature detecting means.

According to the DME fuel supply device for a diesel engine of the twenty-third aspect, the temperature of the DME fuel in the fuel gallery can be maintained constant. It is, therefore, possible to achieve the effect that the injection characteristics of DME fuel can be stabilized without correcting the injection amount of the DME fuel by maintaining the temperature of the DME fuel.

The twenty-fourth aspect of this invention is the DME fuel supply device for a diesel engine of the twenty third aspect, wherein the supply fuel cooling unit has a fuel cooler using DME fuel as coolant; a coolant supply pipe for supplying the DME fuel as the coolant from the fuel tank to the fuel cooler; and a coolant supply pipe switching solenoid valve for opening and closing the coolant supply pipe, wherein the fuel cooler evaporates the DME fuel flowing through the coolant supply pipe and cools the DME fuel flowing through the feed pipe using the heat of vaporization of the DME fuel, and wherein the supply fuel temperature control section control the temperature of DME fuel flowing through the feed pipe by opening and closing the coolant supply pipe switching solenoid valve.

DME fuel vaporizes at room temperature as described before. Thus, when a cooling cycle using DME fuel as coolant is constituted, DME fuel in the feed pipe can be cooled using the heat of vaporization of the DME fuel. That is, since the DME fuel in the feed pipe can be cooled by a fuel cooler utilizing the excellent characteristics of DME fuel as a coolant effectively, the supply fuel cooling unit can be constituted reasonably.

According to the DME fuel device of the twenty-fourth aspect, the supply fuel cooling unit can be constituted reasonably with a fuel cooler utilizing the excellent characteristics of DME fuel as a coolant effectively. It is, therefore, possible to achieve the effect, in addition to the effect of the twenty-third aspect, that the cost for the DME fuel supply device for a diesel engine can be decreased.

The twenty-fifth aspect of this invention is the DME fuel supply device for a diesel engine of the twenty-fourth aspect, further comprising an oil separator for separating DME fuel contained in lubricating oil in the cam chamber in the injection pump having an exclusive lubricating system which is separated from the lubricating system of the diesel engine; and a compressor for pressurizing the DME fuel separated by the oil separator and delivering it to the fuel tank, wherein the DME fuel supplied from the fuel tank to the fuel cooler and evaporated therein is delivered to the compressor.

Since DME fuel vaporizes at room temperature as described before and has a low viscosity, DME fuel leaks from the plunger of the injection pump element into the cam chamber in the injection pump. When the cam chamber of the injection pump has an exclusive lubricating system which is separated from the lubricating system of the diesel engine, and when DME fuel leaked into the cam chamber and mixed in the lubricating oil is separated by the oil separator and delivered to the fuel tank by the compressor, it is possible to eliminate the possibility that DME fuel leaked into the cam chamber is ignited therein. Since DME fuel supplied to the fuel cooler and evaporated therein is delivered to the compressor, the DME fuel separated from lubricating oil by the oil separator and the DME fuel supplied to the fuel cooler and evaporated therein can be pressurized and delivered to the fuel tank by one compressor. Thus, the supply fuel cooling unit can be constituted with efficiency.

According to the DME fuel supply device for a diesel engine of the twenty-fifth aspect, the supply fuel cooling unit can be constituted with efficiency. It is, therefore, possible to achieve the effect, in addition to the effect of the twenty-fourth aspect, that the cost for the DME fuel supply device for a diesel engine can be further decreased.

The twenty-sixth aspect of this invention is the DME fuel supply device for a diesel engine of any one of the twenty-third to twenty-fifth aspects, wherein the fuel temperature detecting means detects the temperature of DME fuel in the fuel gallery.

According to the DME fuel supply device for a diesel engine of the twenty-sixth aspect, the fuel temperature detecting means detects the temperature of DME fuel in the fuel gallery; and the supply fuel temperature control section controls the supply fuel cooling unit based on the temperature of DME fuel in the fuel gallery. It is, therefore, possible to achieve the effect that, in addition to the effect of any one of the twenty-third to twenty-fifth aspect, that the temperature of DME fuel in the fuel gallery can be maintained constant with higher accuracy.

The twenty-seventh aspect of this invention is the DME fuel supply device for a diesel engine of any one of the twenty-third to twenty-fifth aspects, further comprising means for cooling the injection pipe.

Since the DME fuel supply device is provided with the means for cooling the injection pipe, it is possible to prevent heat from the DME fuel supply device and the diesel engine from being transferred to the injection pipe and increasing the temperature of the injection pipe.

According to the DME fuel supply device for a diesel engine of the twenty-seventh aspect, since temperature rise of the injection pipe can be prevented, temperature rise of DME fuel delivered under pressure to the fuel injection nozzle can be prevented. It is, therefore, possible to achieve the effect, in addition to the effect of any one of the twenty-third to twenty-fifth aspects, that the possibility that the injection characteristics of DME fuel injected from the fuel injection nozzle become unstable can be reduced. Also, since temperature rise of the injection pipe can be prevented, it is possible to achieve the effect that the possibility that part of the DME fuel filled into the injection pipe is evaporated and the evaporated DME fuel prevents DME fuel from filling into the injection pipe when DME fuel is supplied into the injection pipe from the fuel tank immediately after the diesel engine is stopped can be reduced.

The twenty-eighth aspect of this invention is the DME fuel supply device for a diesel engine of the twenty-seventh aspect, wherein the injection pipe has an injection fuel passage through which DME fuel delivered from the injection pump to the fuel injection nozzle flows and a coolant passage through which coolant for cooling the DME fuel flowing through the injection fuel passage flows, and has a double pipe structure in which the coolant flows along the outer peripheral surface of the injection fuel passage.

Since the injection pipe has a double pipe structure having an injection fuel passage and a coolant passage through which coolant for cooling DME fuel flowing through the injection fuel passage flows, the coolant flowing through the coolant passage can prevent temperature rise of the injection pipe.

In the DME fuel supply device of the twenty-eighth aspect, the injection pipe has a double pipe structure having an injection fuel passage and a coolant passage through which coolant for cooling DME fuel flowing through the injection fuel passage flows, whereby the effect of the twenty-seventh aspect can be achieved.

The twenty-ninth aspect of this invention is the DME fuel supply device for a diesel engine of the twenty-eighth aspect, wherein a coating of a heat insulating material is applied on the outer peripheral surface of the injection pipe.

According to the DME fuel supply device for a diesel engine of the twenty-ninth aspect, the coating of a heat insulating material applied on the outer peripheral surface of the injection pipe can insulate heat to the injection pipe from around it. It is, therefore, possible to achieve the effect, in addition to the effect provided by the sixth aspect of the invention of this application, that the temperature rise of the injection pipe can be reliably prevented.

The thirtieth aspect of this invention is the DME fuel supply device for a diesel engine of the twenty-eighth aspect, further comprising an overflow fuel pipe for returning DME fuel overflowed from the fuel injection pump to the fuel tank; and a nozzle return pipe for delivering the DME fuel overflowed from the fuel injection nozzle to the overflow fuel pipe, wherein the DME fuel flows from the feed pipe to the nozzle return pipe through the coolant passage as the coolant.

According to the DME fuel supply device for a diesel engine of the twelfth aspect of this invention, the injection pipe can be efficiently cooled with DME fuel in the fuel tank as coolant by using DME fuel with a relatively low temperature before being delivered to the fuel gallery through the feed pipe as coolant, that is, by forming a circulation route for circulating DME fuel from the feed pipe to the fuel tank via the coolant passage and the nozzle return pipe. It is, therefore, possible to achieve the effect, in addition to the effect of the twenty-eighth aspect, that the means for cooling the injection pipe can be constituted at a low cost.

The thirty-first aspect of this invention is the DME fuel supply device for a diesel engine according to any one of the twenty-third to twenty-fifth aspects, wherein the DME fuel delivered from the injection pipe is supplied to a common rail and delivered to the fuel injection nozzle from the common rail.

According to the DME fuel supply device for a diesel engine of the thirty-first aspect, it is possible to achieve the effect of any one of the twenty-third to twenty-fifth aspects in a common rail type DME fuel supply device for a diesel engine.

The thirty-second aspect of this invention is a DME fuel supply device for a diesel engine having an injection pump for delivering DME fuel supplied from a fuel tank via a feed pipe in a specified amount to an injection pipe in communication with a fuel injection nozzle of a diesel engine at specified timing;

an overflow fuel pipe for returning the DME fuel overflowed from the fuel injection pump to the fuel tank, a nozzle return pipe for delivering the DME fuel overflowed from the fuel injection nozzle to the overflow fuel pipe; and residual fuel retrieving means for retrieving the DME fuel remaining in a fuel gallery, the nozzle return pipe and the overflow fuel pipe after stopping the diesel engine into the fuel tank, the DME fuel supply device comprising an oil separator for separating the DME fuel contained in lubricating oil in the cam chamber in the injection pump having an exclusive lubricating system which is separated from the lubricating system of the diesel engine, a compressor for pressurizing the DME fuel separated by the oil separator and delivering it to the fuel tank, a low-pressure tank disposed between the oil separator and the compressor, a purge pipe for communicating the low-pressure tank and the overflow fuel pipe, and a purge pipe switching solenoid valve for opening and closing the purge pipe.

Since DME fuel vaporizes at room temperature as described before and has a low viscosity, DME fuel leaks from the plunger of the injection pump element into the cam chamber in the injection pump. When the cam chamber of the injection pump has an exclusive lubricating system which is separated from the lubricating system of the diesel engine, and when DME fuel leaked into the cam chamber and mixed in the lubricating oil is separated by the oil separator and delivered to the fuel tank by the compressor, it is possible to eliminate the possibility that DME fuel leaked into the cam chamber is ignited therein.

When the diesel engine is stopped, the residual fuel retrieving means retrieves DME fuel remaining in the fuel gallery, the nozzle return pipe and the overflow fuel pipe (which will be hereinafter referred to as "injection system" as a whole) to prevent the DME fuel remaining in the injection system from vaporizing and filling the injection system of the diesel engine to cause abnormal combustion at the next start of the engine. However, as described before, it is difficult to suck all the DME fuel remaining in the injection system of the DME fuel supply device after stopping the diesel engine into the tank with suction means such as an aspirator within a short period of time, and it takes some time to retrieve the DME fuel remaining in the injection system of the DME fuel supply device entirely.

Since the low-pressure tank is provided between the oil separator and the compressor, the pressure in the low-pressure tank is kept low by the suction force of the compressor. Also, a purge pipe communicating the low-pressure tank and the overflow fuel pipe and a purge pipe switching solenoid valve capable of opening and closing the purge pipe are provided. Thus, the purge pipe switching solenoid valve is controlled to be opened to communicate the injection system with the low-pressure tank via the purge pipe, part of DME fuel remaining in the injection system can be sucked and retrieved into the low-pressure tank by the negative pressure in the low-pressure tank maintained by the suction force of the compressor. Since part of the DME fuel remaining in the injection system can be retrieved through a route which is different from the residual fuel retrieving means, the load on the residual fuel retrieving means can be reduced and the time necessary for the residual fuel retrieving means to retrieve DME fuel can be thereby reduced.

According to the DME fuel supply device for a diesel engine of the thirty-second aspect, part of DME fuel remaining in the injection system can be sucked and retrieved into the low-pressure tank by the negative pressure in the low-pressure tank maintained by the suction force of the compressor. It is, therefore, possible to achieve the effect that the time necessary for the residual fuel retrieving means to retrieve DME fuel remaining in the injection system can be reduced.

The thirty-third aspect of this invention is the DME fuel supply device for a diesel engine of the thirty-second aspect, further comprising a check valve disposed between the oil separator and the low-pressure tank for maintaining the pressure on the oil separator side and preventing DME fuel from flowing in reverse direction from the low-pressure tank to the oil separator.

Since the check valve maintains the pressure on the oil separator side, that is, in the cam chamber of the injection pump, at a specified level and prevents DME fuel from flowing in reverse direction from the low-pressure tank to the oil separator, the pressure in the cam chamber can be maintained higher than atmospheric pressure. Thus, it is possible to prevent the pressure in the cam chamber from becoming lower than atmospheric pressure and atmospheric air from entering the injection pump.

According to the DME fuel supply device of the thirty-third aspect, it is possible to achieve the effect, in addition to the effect provided by the first aspect of the invention of this application that the pressure in the low-pressure tank can be low with the pressure in the cam chamber kept higher than atmospheric pressure by the check valve disposed between the oil separator and the low-pressure tank.

The thirty-fourth aspect of this invention is a DME fuel supply device for a diesel engine having an injection pump for delivering DME fuel supplied from a fuel tank via a feed pipe in a specified amount to an injection pipe in communication with a fuel injection nozzle of a diesel engine at specified timing;

an overflow fuel pipe for returning the DME fuel overflowed from the fuel injection pump to the fuel tank, a nozzle return pipe for delivering DME fuel overflowed from the fuel injection nozzle to the overflow fuel pipe, and residual fuel retrieving means for retrieving the DME fuel remaining in the fuel gallery the nozzle return pipe and the overflow fuel pipe after stopping the diesel engine into the fuel tank, the DME; fuel supply device comprising an oil separator for separating DME; fuel contained in lubricating oil in the cam chamber in the injection pump having an exclusive lubricating system which is separated from the lubricating system of the diesel engine, a compressor for pressurizing the DME fuel separated by the oil separator and delivering it to the fuel tank, a low-pressure tank connected to a suction port of the compressor, a purge pipe for communicating the low-pressure tank and the overflow fuel pipe, and a purge pipe switching solenoid valve for opening and closing the purge pipe.

Since DME fuel vaporizes at room temperature as described before and has a low viscosity, DME fuel leaks from the plunger of the injection pump element into the cam chamber in the injection pump. When the cam chamber of the injection pump has an exclusive lubricating system which is separated from the lubricating system of the diesel engine, and when DME fuel leaked into the cam chamber and mixed in the lubricating oil is separated by the oil separator and delivered to the fuel tank by the compressor, it is possible to eliminate the possibility that DME fuel leaked into the cam chamber is ignited therein.

Since the low-pressure tank is connected to the suction port of the compressor, the pressure in the low-pressure tank is kept low by the suction force of the compressor. Thus, the purge pipe switching solenoid valve is controlled to be opened to communicate the injection system with the low-pressure tank via the purge pipe, part of DME fuel remaining in the injection system can be sucked and retrieved into the low-pressure tank via the purge pipe by the negative pressure in the low-pressure tank maintained by the suction force of the compressor. Then, the DME fuel retrieved into the low-pressure tank is sucked by the compressor and delivered into the fuel tank while vaporizing.

Since part of DME fuel remaining in the injection system can be retrieved by the negative pressure in the low-pressure tank maintained by the compressor for delivering DME fuel separated from lubricating oil in the cam chamber by the oil separator, part of DME fuel remaining in the injection system can be reasonably retrieved through a route which is different from the residual fuel retrieving means. Since the load on the residual fuel retrieving means can be reduced, it is possible to achieve the effect that the time necessary for the residual fuel retrieving means to retrieve DME fuel remaining in the injection system can be further reduced.

The thirty-fifth aspect of this invention is the DME fuel supply device for a diesel engine of the thirty-fourth aspect, further comprising a check valve disposed between the compressor and the low-pressure tank for maintaining the pressure in the low-pressure tank.

Since the check valve maintains the pressure in the low-pressure tank at a specified level, it is possible to achieve the effect that the pressure in the low-pressure tank created by the suction of the compressor can be kept low.

The thirty-sixth aspect of this invention is the DME fuel supply device for a diesel engine of any one of the thirty-second to thirty-fifth aspects, further comprising DME fuel retrieving control section for performing control to retrieve DME fuel remaining in the fuel gallery; the nozzle return pipe and the overflow fuel pipe into the fuel tank with the residual fuel retrieving means for a predetermined period of time and then open the purge pipe switching solenoid valve to retrieve the DME fuel which was unable to be retrieved by the residual fuel retrieving means using a negative pressure in the low-pressure tank after stopping the diesel engine.

According to the DME fuel supply device for a diesel engine of the thirty-sixth aspect, when the DME fuel retrieving control section communicates the low-pressure tank and the injection system after the residual fuel retrieving means has retrieves DME fuel remaining in the injection system, DME fuel which was unable to be retrieved by the residual fuel retrieving means can be retrieved by the negative pressure in the low-pressure tank at once. It is, therefore, possible to achieve the effect, in addition to the effect of any one of the thirty-second to thirty-fifth aspects, that the operation of the residual fuel retrieving means and the low-pressure tank to retrieve DME fuel in the injection system can be performed with the highest effectiveness and efficiency.

The thirty-seventh aspect of this invention is the DME fuel supply device for a diesel engine of any one of the thirty-second to thirty-fifth aspects, further comprising a vapor-phase pressure delivery pipe connecting an inlet of the fuel gallery to which the feed pipe is connected and a vapor phase in the fuel tank; and a vapor-phase pressure delivery pipe switching solenoid valve for opening and closing the vapor-phase pressure delivery pipe.

When the vapor-phase pressure delivery pipe switching solenoid valve is opened after stopping the diesel engine, the vapor phase in the fuel tank and the inlet of the fuel gallery is communicated with each other via the vapor-phase pressure delivery pipe and the pressure of the vapor phase in the fuel tank transmitted into the fuel gallery. The vapor phase in the fuel tank has a pressure higher than that in the fuel gallery since the DME fuel vaporizes. Thus, the DME fuel in a liquid state remaining in injection system can be forcibly delivered to the residual fuel retrieving means by the pressure of the vapor phase in the fuel tank.

According to the DME fuel supply device for a diesel engine of the thirty-seventh aspect of this invention, the DME fuel in a liquid state remaining in the injection system can be forcibly delivered to the residual fuel retrieving means by the pressure of the vapor phase in the fuel tank. It is, therefore, possible to achieve the effect, in addition to the effect of any one of the thirty-second to thirty-fifth aspects of the invention, that the time necessary for the residual fuel retrieving means to retrieve the DME fuel remaining in the injection system into the fuel tank can be further reduced.

The thirty-eighth aspect of this invention is the DME fuel supply device for a diesel engine of the thirty-seventh aspect, wherein the vapor-phase pressure delivery pipe has a small-diameter portion where the inside diameter is partially reduced.

Since the pressure of the evaporated DME fuel delivered from the vapor phase in the fuel tank is further increased by the small-diameter portion, the DME fuel in a liquid state remaining in the fuel gallery and the overflow fuel pipe can be delivered under a higher pressure to the residual fuel retrieving means.

According to the DME fuel supply device for a diesel engine of the thirty-eighth aspect of this invention, the DME fuel in a liquid state remaining in the fuel gallery and the overflow fuel pipe can be forcibly delivered under a higher pressure to the residual fuel retrieving means. It is, therefore, possible to achieve the effect, in addition to the effect of the thirty-seventh aspect, that the time necessary to retrieve the DME fuel remaining in the injection system to the fuel tank can be further reduced.

The thirty-ninth aspect of this invention is the DME fuel supply device for a diesel engine of the thirty-eighth aspect, further comprising a feed pump for pressurizing DME fuel in a fuel tank to a specified pressure and delivering it into a feed pipe, wherein the residual fuel retrieving means has an aspirator which is disposed between the feed pipe and the overflow fuel pipe and which returns the DME fuel delivered from the feed pump to the fuel tank so that the DME fuel remaining in the fuel gallery and the overflow fuel pipe can be drawn by the returning DME fuel and retrieved into the fuel tank.

As described before, the aspirator does not suck the DME fuel using a suction force source such as a pump but creates a circulating flow of DME fuel using an injection pump for delivering DME fuel as a driving source and sucks the DME fuel remaining in injection system by a suction force created by the flow of DME fuel. That is, the suction force of the aspirator is weaker than that of a suction force source such as a pump, so that the aspirator can suck only evaporated DME fuel in injection system.

According to the DME fuel supply device for a diesel engine of the thirty-ninth aspect, DME fuel in a liquid state before evaporation can be forcibly delivered under pressure to the aspirator. It is, therefore, possible to achieve the effect of the thirty-eighth aspect with high effectiveness.

The fortieth aspect of this invention is the DME fuel supply device for a diesel engine of the thirty-ninth aspect, wherein the residual fuel retrieving means has a first solenoid valve for communicating a delivery port of the feed pipe with either an inlet to a circulation passage of the aspirator or an inlet to the fuel gallery, and a second solenoid valve for opening and closing the communication of a suction port of the aspirator with the fuel gallery and the overflow fuel pipe, wherein the DME fuel retrieving control section performs control to switch the first solenoid valve to communicate it with the inlet of the aspirator and open the second solenoid valve to form a passage for returning the DME fuel delivered from the feed pump to the fuel tank and open the vapor-phase pressure delivery pipe switching solenoid valve and to close only the vapor-phase pressure delivery pipe switching solenoid valve a lapse of a predetermined period of time for a predetermined period of time after stopping the diesel engine.

By switching the first and second solenoid valves, a circulating flow of DME fuel which flows out of the fuel tank, passes from the inlet to the outlet of the aspirator and returns to the fuel tank is created. At the same time, the vapor-phase pressure delivery pipe switching solenoid valve is opened to deliver the DME fuel in a liquid state remaining in the injection system forcibly to the residual fuel retrieving means by the pressure of the vapor phase in the fuel tank. Then, only the vapor-phase pressure delivery pipe switching solenoid valve is closed after a lapse of a predetermined period of time to keep the pressure in the injection system low. That is, only the vapor-phase pressure delivery pipe switching solenoid valve is closed after the DME fuel remaining in a liquid state in injection system has been delivered under pressure by the pressure of the vapor phase. The pressure in injection system is thereby kept low and evaporation of DME fuel in a liquid state which was unable to be delivered under pressure and remains in a small amount is promoted. Thus, DME fuel in the injection system can be retrieved into the fuel tank within a shorter period of time.

According to the DME fuel supply device for a diesel engine of the fortieth aspect, evaporation of DME fuel in a liquid state which was unable to be delivered under pressure can be promoted. It is, therefore, possible to achieve the effect, in addition to the effect of the thirty-ninth aspect, that the time necessary for the residual fuel retrieving means to retrieve the DME fuel remaining in the fuel gallery and the overflow fuel pipe into the fuel tank can be further reduced.

The forty-first aspect of this invention is the DME fuel supply device for a diesel engine of the fortieth aspect, wherein the DME fuel retrieving control section has means for opening the purge pipe switching solenoid valve after the second solenoid valve has been closed.

After stopping the diesel engine, the first solenoid valve is switched to communicate it with the inlet of the aspirator and the second solenoid valve is opened to create a circulating flow of DME fuel which flows out of the fuel tank, passes from the inlet to the outlet of the aspirator and returns to the fuel tank so that DME fuel remaining in the fuel gallery and the overflow fuel pipe can be sucked into the suction port of the aspirator and retrieved into the fuel tank. After suction of residual fuel has been performed with the aspirator for a predetermined period of time, the second solenoid valve is closed to close the suction port of the aspirator with the residual fuel still remaining. Then, the purge pipe switching solenoid valve is opened to communicate the low-pressure tank and the overflow fuel pipe so that the residual fuel can be sucked by the negative pressure in the low-pressure tank at once. That is, after retrieving some of DME fuel remaining in the injection system into the fuel tank with the aspirator, residual fuel which was unable to be retrieved by the aspirator can be retrieved at once. It is, therefore, possible to achieve the effect that the time necessary to retrieve DME fuel remaining in the injection system after stopping the engine can be further reduced.

The forty-second aspect of this invention is the DME fuel supply device for a diesel engine of any one of thirty-second to thirty-fifth aspect, further comprising a supply fuel cooling unit for cooling DME fuel flowing through the feed pipe with a cooling cycle using the DME fuel as coolant; temperature detecting means for detecting the temperature of the DME fuel in the injection pump; and a supply fuel temperature control section for controlling the supply fuel cooling unit to control the temperature of the DME fuel flowing through the feed pipe so that the temperature of the DME fuel to be delivered to the injection pipe can be constant based on the temperature of the DME fuel in the injection pump detected by the temperature detecting means.

The temperature of DME fuel in the fuel gallery can be maintained constant by controlling the supply fuel cooling unit so that the temperature of DME fuel to be delivered to the injection pipe can be constant based on the temperature of DME fuel in the injection pump detected by the temperature detecting means.

According to the DME fuel supply device of the forty-second aspect, the temperature of the DME fuel in the fuel gallery can be maintained constant and the temperature of DME fuel in the fuel gallery can be thereby maintained constant. It is, therefore, possible to achieve the effect, in addition to the effect of any one of thirty-second to thirty-fifth aspect, that the injection characteristics of DME fuel can be stabilized without correcting the injection amount of the DME fuel by maintaining the temperature of the DME fuel.

The forty-third aspect of this invention is the DME fuel supply device for a diesel engine of the forty-second aspect, wherein the supply fuel cooling unit has a fuel cooler using DME fuel as coolant; a coolant supply pipe for supplying the DME fuel as the coolant from the fuel tank to the fuel cooler; and a coolant supply pipe switching solenoid valve for opening and closing the coolant supply pipe, wherein the fuel cooler evaporates the DME fuel flowing through the coolant supply pipe and cools the DME fuel flowing through the feed pipe using the heat of vaporization of the DME fuel, and wherein the supply fuel temperature control section control the temperature of the DME fuel flowing through the feed pipe by opening and closing the coolant supply pipe switching solenoid valve.

DME fuel vaporizes at room temperature as described before. Thus, when a cooling cycle using DME fuel as coolant is constituted, DME fuel in the feed pipe can be cooled using the heat of vaporization of the DME fuel. That is, since the DME fuel in the feed pipe can be cooled by a fuel cooler utilizing the excellent characteristics of DME fuel as a coolant effectively, the supply fuel cooling unit can be constituted reasonably.

According to the DME fuel device of the forty-third aspect, the supply fuel cooling unit can be constituted reasonably with a fuel cooler utilizing the excellent characteristics of DME fuel as a coolant effectively. It is, therefore, possible to achieve the effect, in addition to the effect of the forty-second aspect, that the cost for the DME fuel supply device for a diesel engine can be decreased.

The forty-fourth aspect of this invention is the DME fuel supply device for a diesel engine of the forty-third aspect, wherein the DME fuel supplied from the fuel tank to the fuel cooler and evaporated therein is delivered to the compressor.

Since DME fuel supplied to the fuel cooler and evaporated therein is delivered to the compressor, the DME fuel separated from lubricating oil by the oil separator and the DME fuel supplied to the fuel cooler and evaporated therein can be pressurized and delivered to the fuel tank by one compressor. Thus, the supply fuel cooling unit can be constituted with efficiency.

According to the DME fuel supply device for a diesel engine of the forty-fourth aspect, the supply fuel cooling unit can be constituted with efficiency. It is, therefore, possible to achieve the effect, in addition to the effect of the forty-third aspect, that the cost for the DME fuel supply device for a diesel engine can be further decreased.

The forty-fifth aspect of this invention is the DME fuel supply device for a diesel engine of any one of thirty-second to thirty-fifth aspects, wherein the DME fuel delivered from the injection pipe is supplied to a common rail and delivered to the fuel injection nozzle from the common rail.

According to the DME fuel supply device for a diesel engine of the forty-fifth aspect, it is possible to achieve the effect of any one of thirty-second to thirty-fifth aspects in a common rail type DME fuel supply device for a diesel engine.

BRIEF DESCRIPTION OF DRAWINGS

FIG. 23 is a schematic diagram of a tenth embodiment of the DME fuel supply device according to the invention of the present application.

BEST MODE FOR CARRYING OUT THE INVENTION

An embodiment of the invention of the present application will be hereinafter described with reference to the drawings.

First, the general structure of a DME fuel supply device for a diesel engine will be described.

Figure 1:
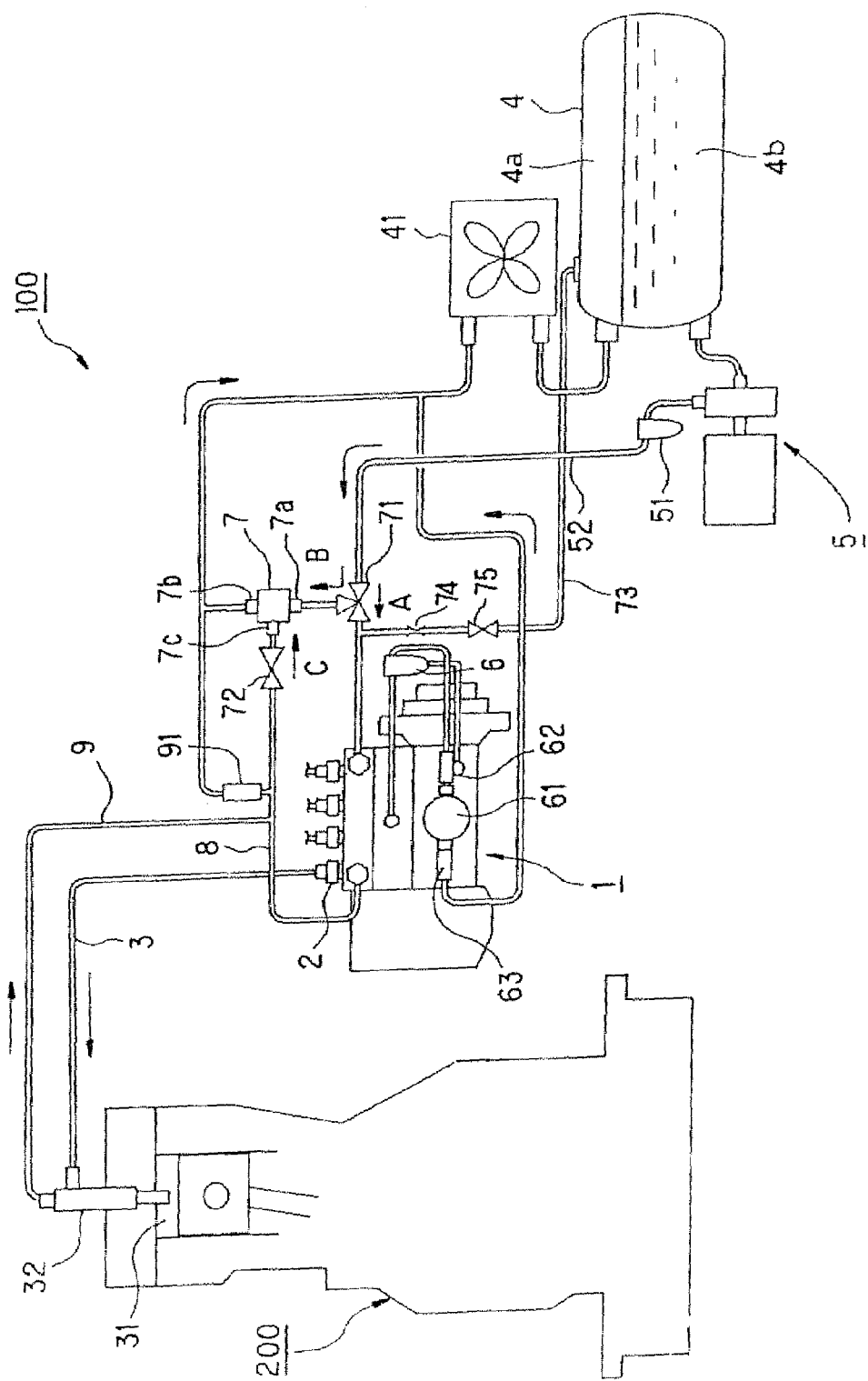
FIG. 1 is a system diagram illustrating a general structure of a first embodiment of a DME fuel supply device for a diesel engine according to the invention of the present application.

FIG. 1 is a system diagram illustrating a general structure of a first embodiment of a DME fuel supply device for a diesel engine according to the invention of the present application.

A DME fuel supply device 100 for supplying DME fuel to a diesel engine 200 according to the invention of the present application has an injection pump 1. The injection pump 1 has the same number of injection pump elements 2 as the number of cylinders 31 which the diesel engine 200 has. A feed pump 5 pressurizes DME fuel reserved in a fuel tank 4 to a specified pressure and delivers it into a feed pipe 52. The fuel tank 4 has a DME fuel delivery port which is located below the level of the DME fuel in the fuel tank 4, and the feed pump 5 is disposed in the vicinity of the DME fuel delivery port of the fuel tank 4. The DME fuel delivered into the feed pipe 52 is filtered by a filter 51, and delivered to the injection pump 1 via a three-way solenoid valve 71. The three-way solenoid valve 71 as a component of hereinafter described "residual fuel retrieving means" is ON in an injection state (while the diesel engine 200 is operating) and permits flow in the direction indicated by the arrow A.

Since the DME fuel delivery port of the fuel tank 4 is located below the level of the DME fuel in the fuel tank 4, and since the feed pump 5 is disposed in the vicinity of the DME fuel delivery port of the fuel tank 4 and delivers the DME fuel to the injection pump 1, it is possible to prevent a significant pressure decrease in the fuel tank 4. Thus, it is possible to reduce the possibility that the DME fuel in the fuel tank 4 is evaporated by a decrease in pressure in the fuel tank 4.

A cam chamber (not shown) in the injection pump 1 has an exclusive lubricating system which is separated from the lubricating system of the diesel engine 200. An oil separator 6 separates lubricating oil in the cam chamber in the injection pump 1 containing DME fuel leaked into the cam chamber into DME fuel and lubricating oil and returns the lubricating oil to the cam chamber. The DME fuel separated by the oil separator 6 is delivered to a compressor 61 driven by a cam in the cam chamber via a check valve 62 for preventing the pressure in the cam chamber from decreasing to atmospheric pressure or below, pressurized in the compressor 61, and returned to the fuel tank 4 via a check valve 63 and a cooler 41. The check valve 63 is provided to prevent DME fuel from flowing in reverse direction from the fuel tank 4 to the cam chamber when the diesel engine 200 is stopped.

Since the cam chamber of the injection pump 1 has en exclusive lubricating system separated from the lubricating system of the diesel engine 200, there is no possibility that DME fuel leaked into the cam chamber from the injection pump elements 2 enters the lubricating system of the diesel engine 200. Thus, there is no possibility that DME fuel having entered the lubricating system of the diesel engine 200 is evaporated and the evaporated DME fuel enters the crank chamber of the engine and is ignited therein.

Since DME fuel mixed in the lubricating oil is separated by the oil separator 6 provided in the cam chamber and the separated DME fuel is delivered to the fuel tank 4 by the compressor 61, it is possible to prevent degradation of the lubrication performance of the lubricating oil caused by DME fuel mixed in the lubricating oil. It is, therefore, possible to prevent the degradation of the performance of the injection pump 1 caused by degradation of the lubrication performance of the lubricating oil or the like.

Further, the compressor 61 is driven by a cam in the cam chamber, there is no need for a driving source, such as an electric motor, for the compressor 61. Thus, it is possible to achieve a low power consumption injection pump 1.

The DME fuel pressurized to a specified pressure by the feed pump 5 and delivered from the fuel tank 4 is delivered under pressure in a specified amount from each of the injection pump elements 2 of the injection pump 1 to a fuel injection nozzle 31 provided in each of the cylinders 32 of the diesel engine 200 via an injection pipe 3 at specified timing. DME fuel overflowed from the injection pump 1 is returned to the fuel tank 4 via an overflow fuel pipe 8, a check valve 91 for determining the pressure of the overflowed fuel, and the cooler 41. DME fuel overflowed from each fuel injection nozzle 32 is returned to the fuel tank 4 via an overflow fuel pipe 9, the check valve 91 for determining the pressure of the overflowed fuel, and the cooler 41.

The DME fuel supply device 100 has an aspirator 7, a three-way solenoid valve 71, and a two-way solenoid valve 72 as components of "residual fuel retrieving means" for retrieving DME fuel remaining in a fuel gallery (not shown) in the injection pump 1, the overflow fuel pipe 8, and the overflow fuel pipe 9 to the fuel tank 4 when the diesel engine 200 is stopped.

Figure 2:
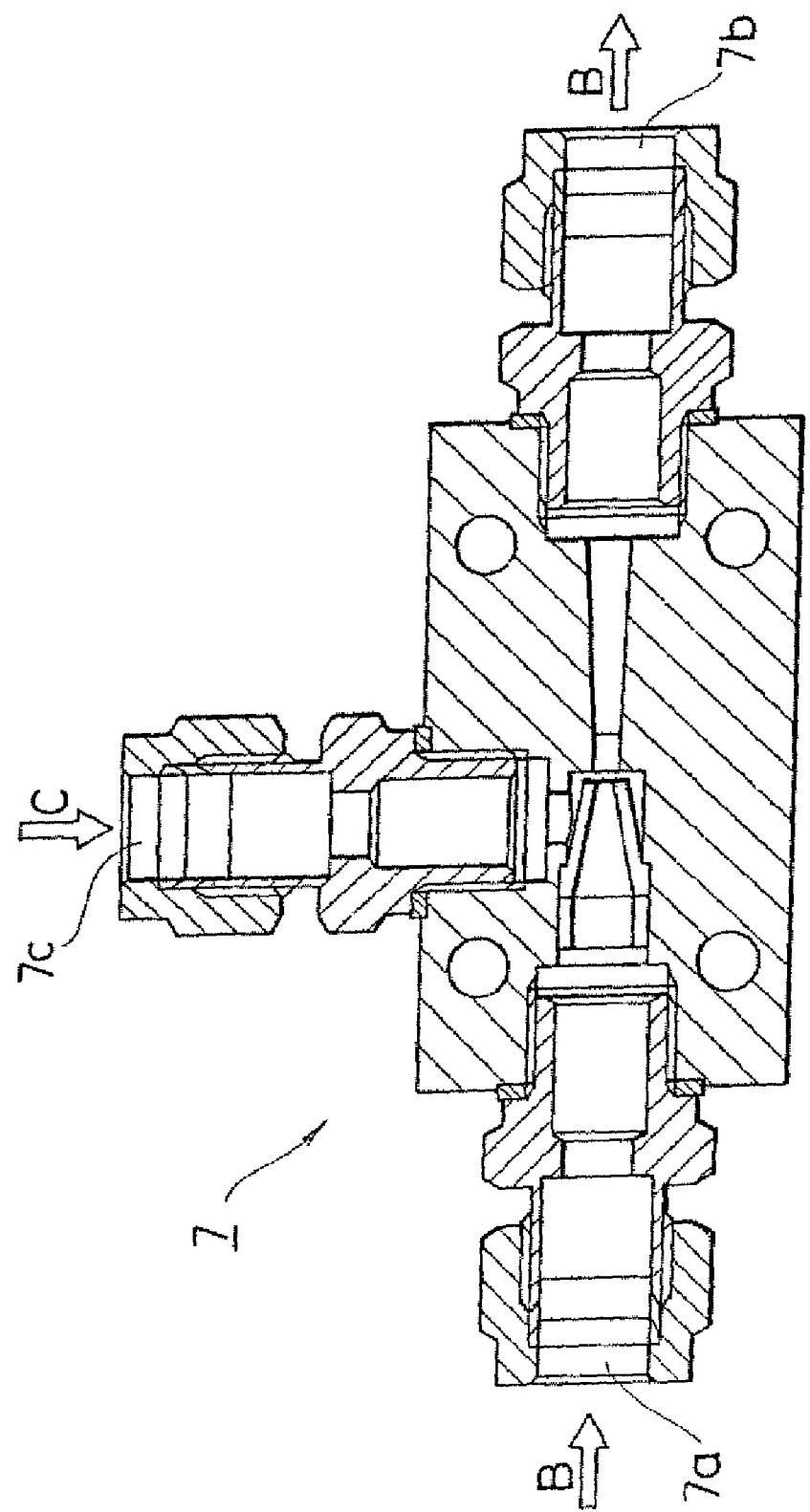
FIG. 2 is a cross-sectional view of an aspirator.

FIG. 2 is a cross-sectional view of the aspirator 7. The aspirator 7 has an inlet 7a, an outlet 7b and a suction port 7c. The inlet 7a and the outlet 7b are communicated with each other via a straight communication passage, and the suction port 7c is branched at generally a right angle from the communication passage between the inlet 7a and the outlet 7b. By a flow of DME fuel from the inlet 7a to the outlet 7b (a flow in the direction indicated by the arrow B), a suction force in the direction indicated by the arrow C is generated at the suction port 7c. The suction force is not so strong as to be able to such DME fuel in a liquid state in the pipe. The pressure in the aspirator 7 is decreased by the suction force and evaporated DME fuel is thereby sucked into the aspirator 7.

The DME fuel supply device 100 also has a vapor-phase pressure delivery pipe 73 (see FIG. 1) connecting an outlet for a vapor-phase 4a in the fuel tank 4 and an inlet of the fuel gallery of the injection pump 1 (the part where the feed pipe 52 is connected). The vapor-phase pressure delivery pipe 73 has a small-diameter portion 74 where the inside diameter is partially reduced, and a vapor-phase pressure delivery pipe switching solenoid valve 75 for opening and closing the vapor-phase pressure delivery pipe 73. Description will be made of the operation of each component when the "residual fuel retrieving means" retrieves DME fuel remaining in the fuel gallery in the injection pump 1, the overflow fuel pipe 8 and the overflow fuel pipe 9 into the fuel tank 4 when the diesel engine 200 is stopped, and the operation and effects of the vapor-phase pressure delivery pipe 73, the small-diameter portion 74, and the vapor-phase pressure delivery pipe switching solenoid valve 75.

Figure 3:
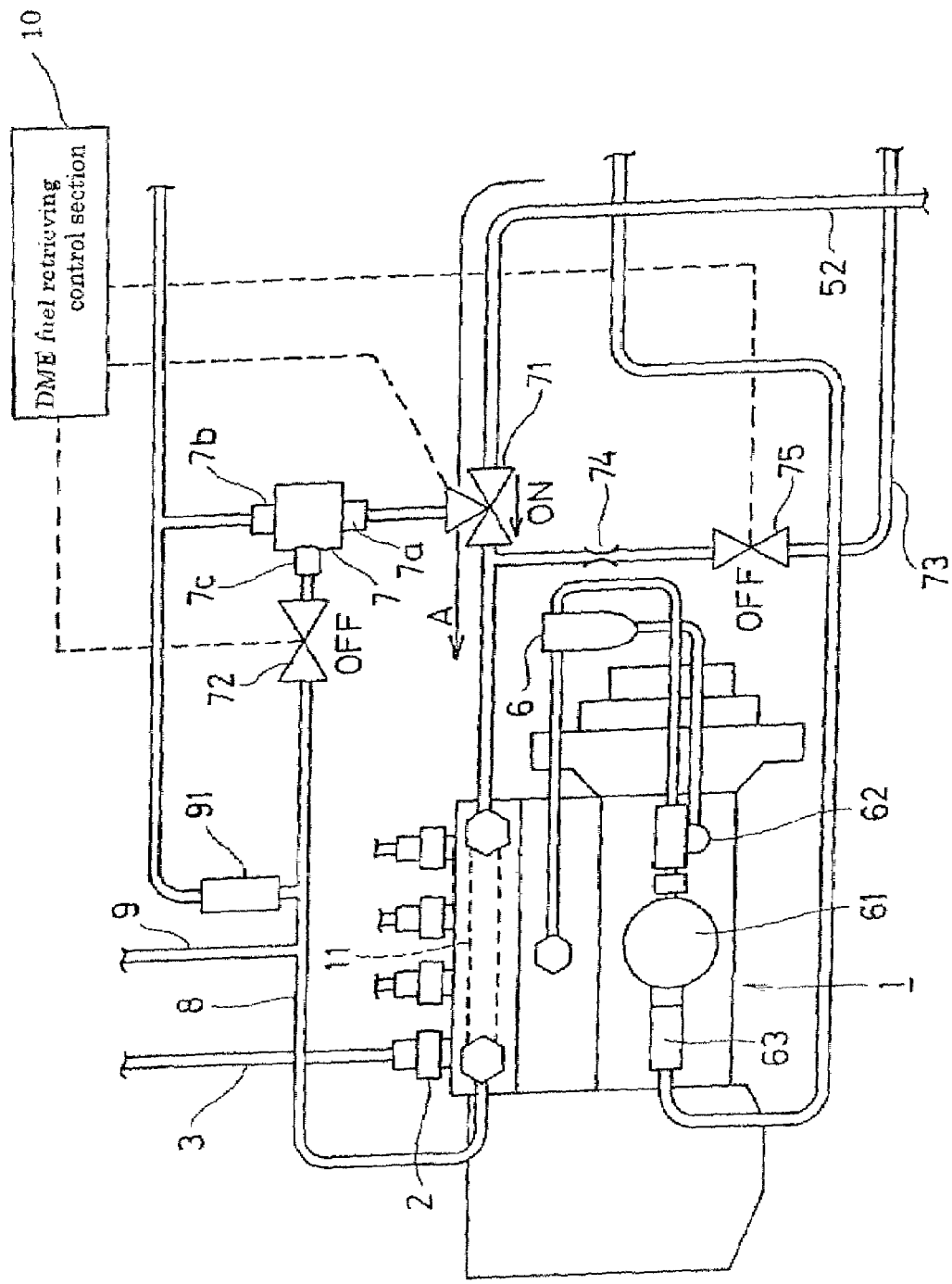
FIG. 3 is an enlarged schematic system diagram illustrating "residual fuel retrieving means" of the DME fuel supply device in an injection state and its vicinity.

FIG. 3 is an enlarged system diagram illustrating the "residual fuel retrieving means" of the DME fuel supply device 100 in an injection state and around it.

The DME fuel supply device 100 has a DME fuel retrieving control section 10, and the three-way solenoid valve 71, the two-way valve 72 and the vapor-phase pressure delivery pipe switching solenoid valve 75 are controlled to open and close by the DME fuel retrieving control section 10. When the DME fuel supply device 100 is in an injection state, the three-way valve 71 is controlled to be ON, and the feed pipe 52 and the fuel gallery 11 are communicated with each other. Thus, DME fuel in the fuel tank 4 is delivered to the fuel gallery 11 by the feed pump 5. The two-way valve 72 is controlled to be OFF, and communication between the overflow fuel pipes 8 and 9 and the suction port 7c of the aspirator 7 is shut off. The vapor-phase pressure delivery pipe switching solenoid valve 75 is also controlled to be OFF and communication between the inlet of the fuel gallery 11 and the liquid phase 4a in the fuel tank 4 is shut off.

Figure 4:
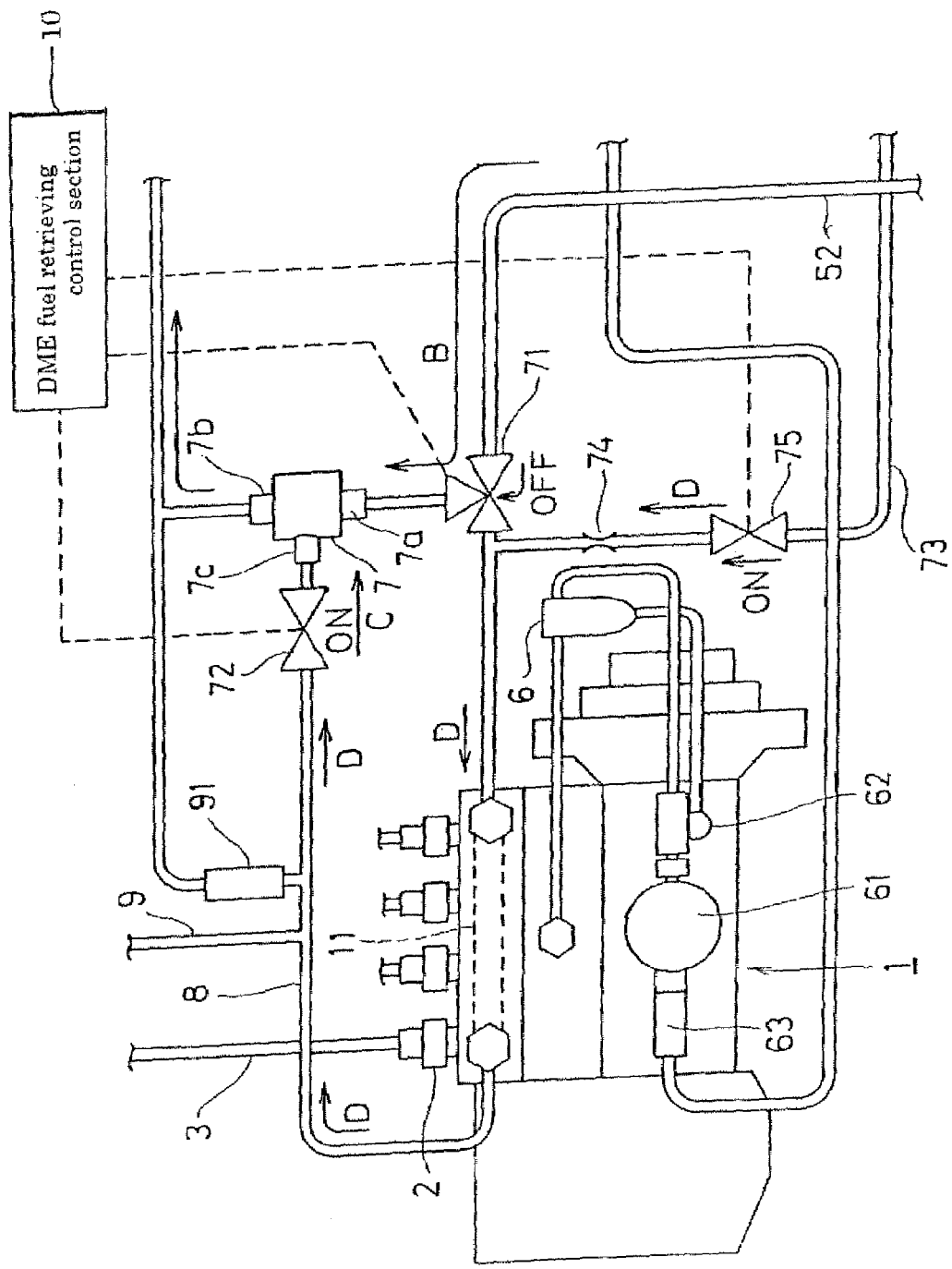
FIG. 4 is an enlarged schematic system diagram illustrating the "residual fuel retrieving means" of the DME fuel supply device in a non-injection state and its vicinity.

FIG. 4 is an enlarged schematic system diagram illustrating the "residual fuel retrieving means" of the DME fuel supply device 100 in a non-injection state and around it.

In a non-injection state (while the diesel engine 200 is stopped), the three-way solenoid valve 71 is controlled to be OFF to form a communication passage in the direction indicated by the arrow B, and the two-way solenoid valve 72 is controlled to be ON to communicate the overflow fuel pipe 8 and the overflow fuel pipe 9 with the suction port 7c of the aspirator 7 (in the direction indicated by the arrow C). Then, DME fuel delivered from the feed pump 5 is delivered not to the injection pump 1 but to the aspirator 7, passed from the inlet 7a to the outlet 7b, returned to the fuel tank 4 via the cooler 41 and delivered again from the feed pump 5 to the aspirator 7. That is, the DME fuel is circulated via the aspirator 7. Then, DME fuel remaining in the fuel gallery in the injection pump 1, the overflow fuel pipe 8 and the overflow fuel pipe 9 is evaporated, and the evaporated DME fuel is sucked through the suction port 7c by the flow of the DME fuel flowing from the inlet 7a to the outlet 7b and retrieved into the fuel tank 4.

At the same time, the vapor-phase pressure delivery pipe switching solenoid valve 75 is controlled to be ON and opened so that flow can pass through the vapor-phase pressure delivery pipe 73 connecting the vapor phase 4a in the fuel tank 4 and the inlet of the fuel gallery 11. The DME fuel in the fuel tank 4 is separated into a vapor phase 4a in a vapor state and a liquid phase 4b in a liquid state. As described before, since DME fuel is vaporizes at room temperature, the DME fuel in the fuel tank 4 evaporates and forms a vapor phase 4a with a high pressure.

Thus, when the vapor phase 4a and the fuel gallery 11 in the injection pump 1 are communicated with each other, the DME fuel in a liquid state remaining in the fuel gallery 11, the overflow fuel pipe 8 and the overflow fuel pipe 9 is delivered under pressure toward the suction port 7c of the aspirator 7 by the high pressure of the vapor phase 4a. Also, since the pressure is further increased by the small-diameter portion 74 of the vapor-phase pressure delivery pipe 73, where the inside diameter is partially reduced, the DME fuel is delivered under a higher pressure. As described before, the suction force of the aspirator 7 can only suck evaporated DME fuel at most. Thus, the time necessary to retrieve the DME fuel remaining in the fuel gallery 11, the overflow fuel pipe 8 and the overflow fuel pipe 9 can be significantly reduced by delivering the DME fuel in a liquid state to the suction port 7c of the aspirator 7 using the pressure of the vapor phase 4a.

Figure 5:
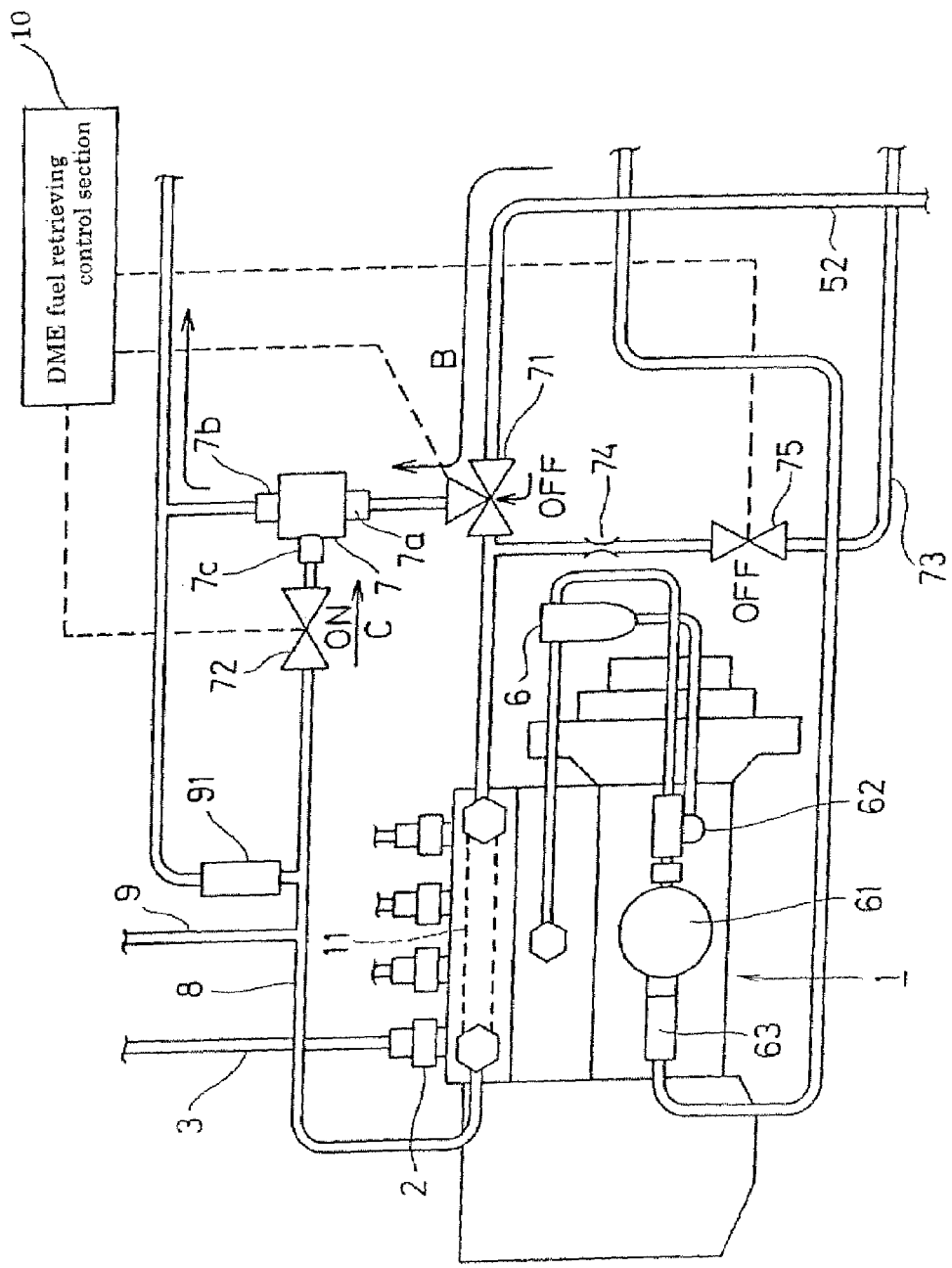
FIG. 5 is an enlarged schematic system diagram of the "residual fuel retrieving means" of the DME fuel supply device in a non-injection state and its vicinity, illustrating the state in which a vapor phase pressure delivering pipe switching solenoid valve is closed after a lapse of a predetermined period of time from the state shown in FIG. 4.

FIG. 5 is an enlarged schematic system diagram of the "residual fuel retrieving means" of the DME fuel supply device 100 in a non-injection state and around it, illustrating the state in which a vapor phase pressure delivering pipe switching solenoid valve 75 is controlled to be OFF and closed after a lapse of a predetermined period of time from the state shown in FIG. 4.

Since only the vapor phase pressure delivering pipe switching solenoid valve 75 is closed after a lapse of a predetermined period of time to shut off the communication between the fuel gallery 11 and the high-pressure vapor phase 4a, the pressure in the fuel gallery 11, the overflow fuel pipe 8 and the overflow fuel pipe 9 can be further lowered. Then, since evaporation of DME fuel in a liquid state which was unable to be delivered under pressure and remains in a small amount is promoted, the time necessary to retrieve the residual DME fuel can be further reduced. The predetermined period of time is determined based on the amount of DME fuel which can remain in the fuel gallery 11, the overflow fuel pipe 8 and the overflow fuel pipe 9 and so on and can be set to an optimum value by experiment or other means.

As described above, in the DME fuel supply device for the diesel engine 200, the time necessary to retrieve DME fuel remaining in the injection system (the fuel gallery 11, the overflow fuel pipe 8 and the overflow fuel pipe 9) after stopping the diesel engine 200 into the fuel tank 4 can be significantly reduced.

Another embodiment has a feature, in addition to the features of the first embodiment, that the injection pipe 3 and the fuel gallery 11 are communicated with each other even if a delivery valve is closed only when the injection pump elements of the injection pump 1 are in a non-injection state. Description will be made of the general structure of the injection pump element 2 of the injection pump 1 according to the invention of the present application.

Figure 6:
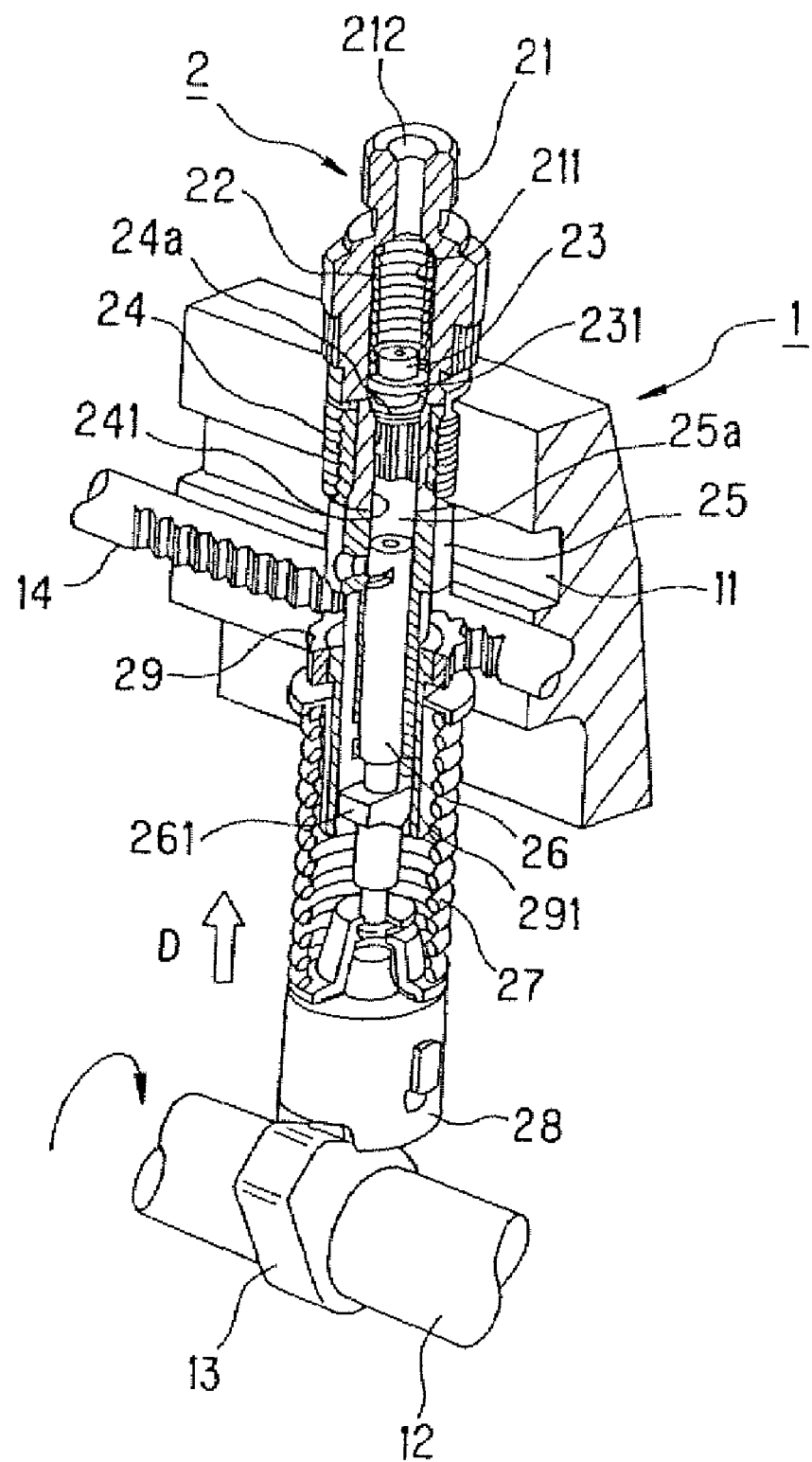
FIG. 6 is a perspective view of an essential part of an injection pump element of an injection pump according to an embodiment.

FIG. 6 is a perspective view of an essential part of the injection pump element 2 of the injection pump 1 according to this embodiment.

A delivery valve holder 21 has a delivery valve insertion hole 211 and is fixed to the base of the injection pump 1. An injection pipe 3 is connected to a fuel liquid delivery port 212 communicated with the delivery valve insertion hole 211. A delivery valve 23 is received in the delivery valve insertion hole 211 for reciprocating movement and urged by a delivery spring 22 such that a valve part 231 of the delivery valve 23 is in contact with a valve seat part 24a of a delivery valve seat 24 disposed integrally with the delivery valve holder 21.

A plunger barrel 25 is disposed integrally with the delivery valve seat 24 and has a compression chamber 25a communicated with the delivery valve seat 24. A plunger 26 is received in the compression chamber 25a for reciprocating movement and has an end opposed to the delivery valve 23. The plunger 26 is urged toward a cam 13 by a plunger spring 27. The plunger 26 is pushed up toward the delivery valve 23 (in the direction indicated by the arrow D) via a tappet 28 by the cam 13 of a camshaft 12 connected to the driving shaft of the diesel engine 200 and rotated by the driving force of the diesel engine 200. The plunger 26 has a flange 261 received in a sleeve 291 that is a cylindrical member integrated with a pinion 29 which is rotated in engagement with a control rack 14. The pinion 29 is rotated by the reciprocating motion of the control rack 147 and the plunger 26 is thereby rotated circumferentially. The injection amount of DME fuel is increased or decreased according to the rotational position of the plunger 26.

Figure 7:
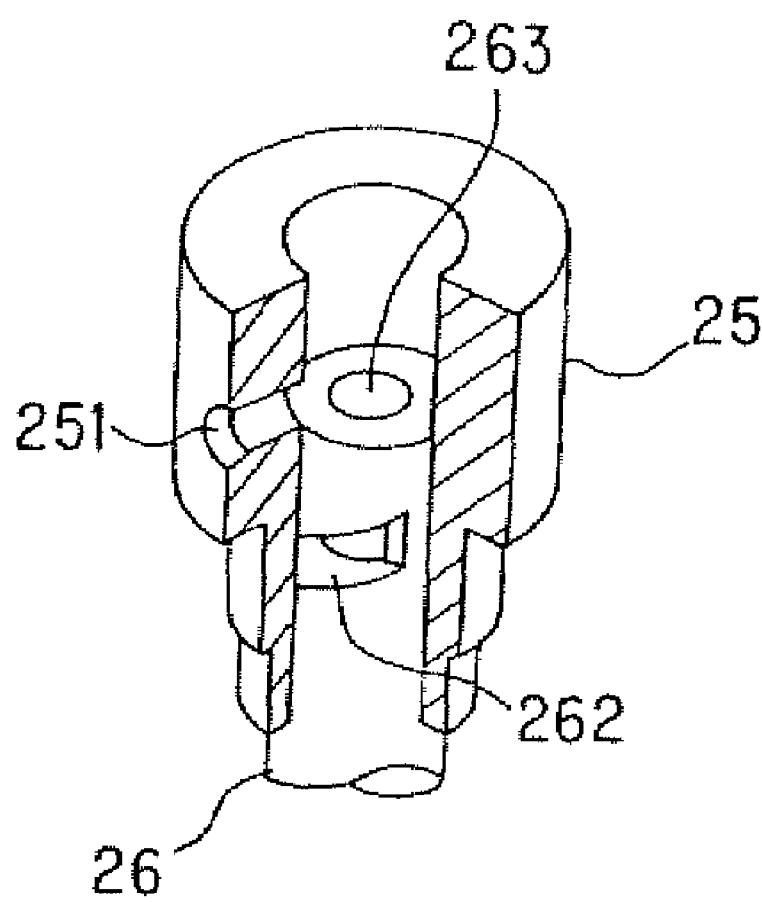
FIG. 7 is an enlarged perspective view of a part of a plunger received in a plunger barrel of the injection pump element according to the embodiment.

FIG. 7 is an enlarged perspective view of a part of the plunger 26 received in the plunger barrel 25.

In the injection pump 1, the injection pump element 2 is an important part which can pressurize the DME fuel to a high pressure and increase or decrease the injection amount of the DME fuel. Thus, the sliding portions of the plunger 26 and the delivery valve 23 are finished with super high precision. A suction and discharge port 251 for communicating the fuel gallery 11 and the compression chamber 25a is formed through a side wall of the plunger barrel 25. The plunger 26 has a notch 262. The notch 262 is a groove that is cut obliquely in the outer peripheral surface of the plunger 26 as illustrated and communicated to a hole 263 formed through the center of the plunger 26.

Here, the operation of the plunger 26 will be described with reference to FIG. 8 to FIG. 11.

Figure 8:
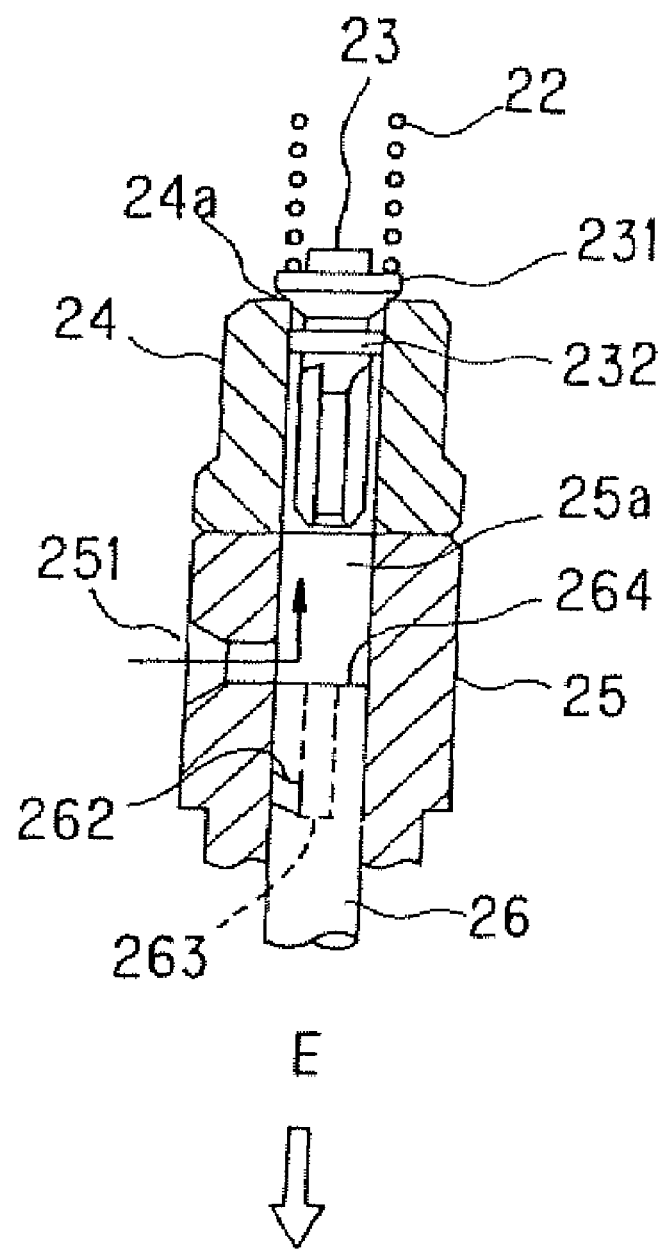
FIG. 8 is a front view illustrating a section of an essential part of the injection pump element according to the embodiment during a suction process in an injection state.
Figure 9:
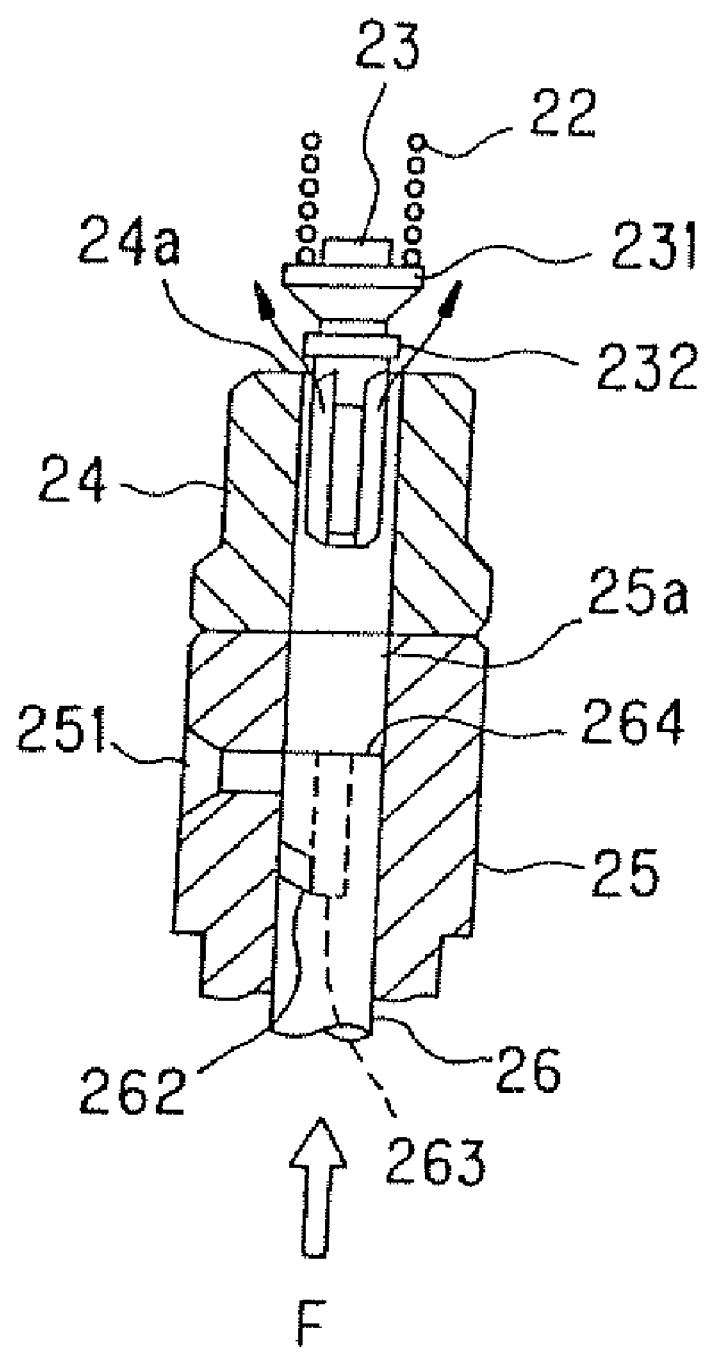
FIG. 9 is a front view illustrating a section of an essential part of the injection pump element according to the embodiment at the start of injection during an injection process in the injection state.
Figure 10:
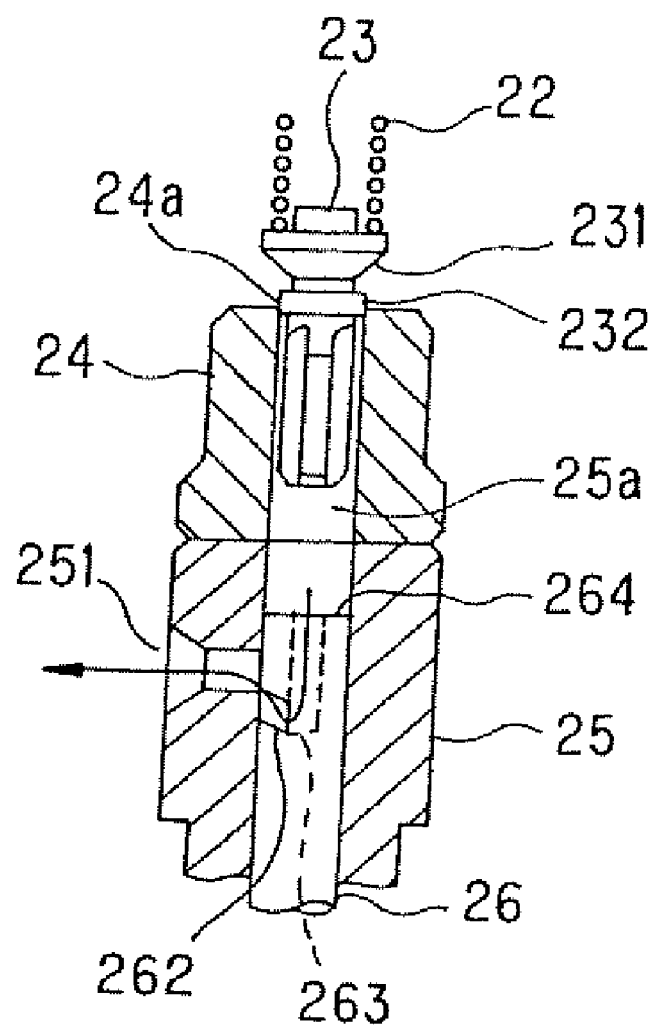
FIG. 10 is a front view illustrating a section of an essential part of the injection pump element according to the embodiment at the end of injection during an injection process in the injection state.

FIG. 8 is a front view illustrating a section of an essential part of the injection pump element 2 according to this embodiment during a suction process in the injection state (while the diesel engine 200 is operating). FIG. 9 shows the start of injection during the injection process in the injection state, and FIG. 10 shows the end of injection during the injection process in the injection state.

With downward motion of the cam 13, the plunger 26 is moved down (in the direction indicated by the arrow E). When the upper end 264 of the plunger 26 comes down to the level of the suction and discharge port 251 of the plunger barrel 25, DME fuel in the fuel gallery 11 is delivered into the compression chamber 25a through the suction and discharge port 251. The suction of DME fuel is completed when the cam 13 reaches its bottom dead center (suction process). With upward motion of the cam 13, the plunger 26 is moved up. When the upper end 264 of the plunger 26 closes the suction and discharge port 251, the communication between the fuel gallery 11 and the compression chamber 25a is shut off (start of injection during the injection process). As the cam 13 is further moved upward, the DME fuel pushes up to open the delivery valve and is delivered under pressure to the injection nozzle of the diesel engine 200 via the injection pipe 3. When the notch 262 of the plunger 26 reaches the suction and discharge port 251, the DME fuel in the compression chamber 25a flows by its own pressure into the fuel gallery 11 through the hole 264 of the plunger 26, the notch 262, and the suction and discharge port 251. The pressure of the DME fuel in the compression chamber 25a is thereby decreased, and the delivery valve 23 is moved down by the urging force of the delivery spring 22 and closed when the valve part 232 comes into contact with the valve seat part 24a of the delivery valve seat 24 (end of injection during the injection process).

The stroke of the plunger 26 from the start of injection (FIG. 9) to the end of injection (FIG. 10) is referred to as effective stroke. DME fuel is delivered under pressure during the effective stroke, and the amount of fuel to be delivered under pressure can be increased or decreased by changing the length of the effective stroke. The notch 262 is formed obliquely with respect to the circumferential direction as illustrated. Thus, by changing the position of the control rack 14 (FIG. 10) to rotate the plunger 26 circumferentially as described before, the distance which the notch 262 of the plunger 26 is to be moved until it reaches the suction and discharge port 251 can be changed. The effective stroke can be thereby changed.

Description will be made of the non-injection state.

Figure 11:
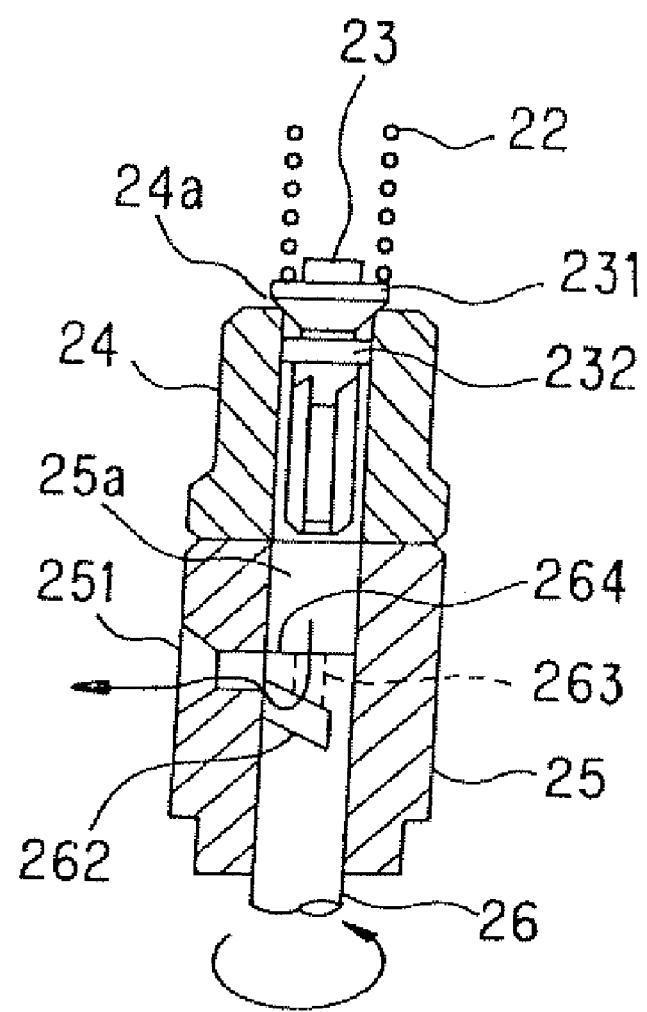
FIG. 11 is a front view illustrating a section of an essential part of the injection pump element according to the embodiment in the non-injection state (while the diesel engine is stopped)

FIG. 11 is a front view illustrating a section of an essential part of the injection pump element 2 according to this embodiment in the non-injection state (while the diesel engine 200 is not operating).

When the control rack 14 is located in such a position that the amount of DME fuel to be delivered under pressure is zero, namely in such a position that the notch 262 reaches the suction and discharge port 251 when the upper end 264 of the plunger 26 closes the suction and discharge port 251, the effective stroke is zero and the compression chamber 25a and the fuel gallery 11 are kept communicated with each other even when the plunger 26 is moved upward. Thus, no DME fuel is delivered under pressure even when the plunger 26 is moved up and down by the cam 13. This is the non-injection state. Since DME fuel is not delivered under pressure, the supply of DME fuel to the diesel engine 200 is stopped and the diesel engine 200 is stopped.

Figure 12:
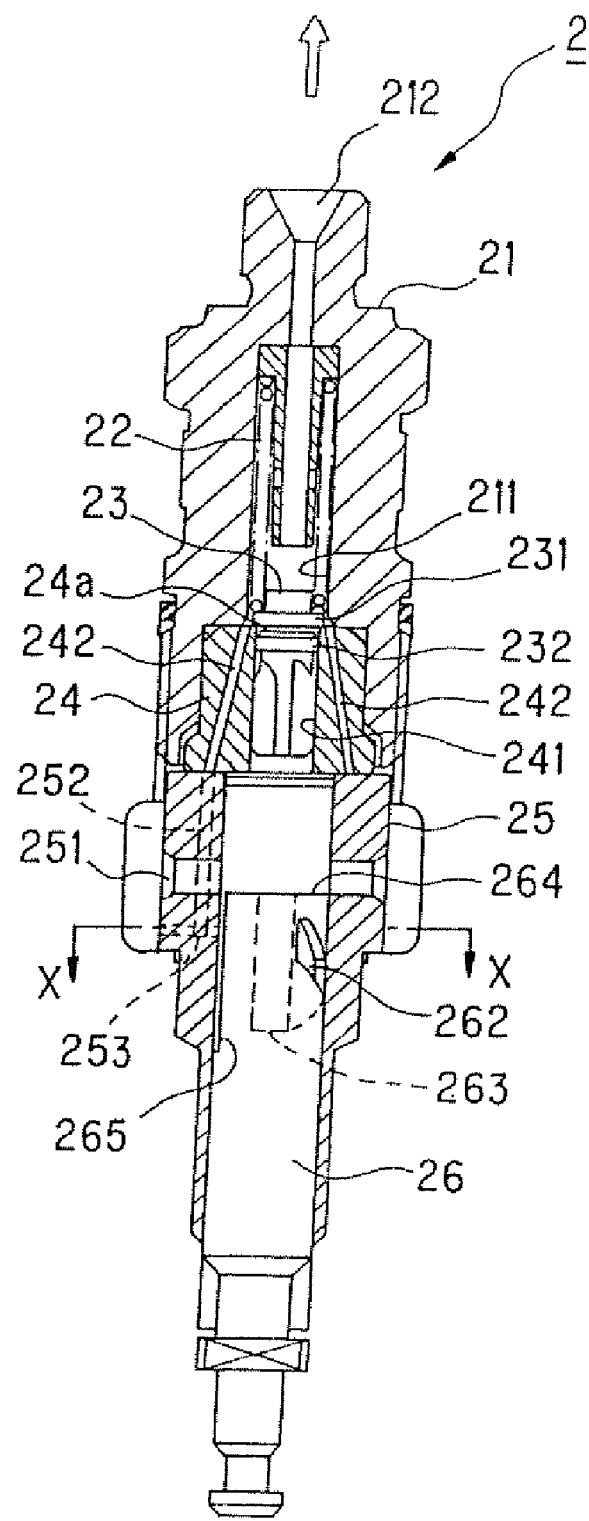
FIG. 12 is a front view illustrating a section of the injection pump element according to the embodiment.

FIG. 12 is a front view illustrating a section of the injection pump element 2 according to this embodiment.

The delivery valve seat 24 has a purge passage 242. One end of the purge passage 242 is communicated with the fuel liquid delivery port 212 and the other end is communicated with a purge passage 252 formed in the plunger barrel 25. The purge passage 252 is communicated with a purge port 253 extending to an inner peripheral surface of the plunger barrel 25. That is, the injection pump element 2 has a communication route communicating the injection pipe 3 connected to the fuel liquid delivery port 212 and the inner peripheral surface of the plunger barrel 25.

Description will be made of the retrieving route through which DME fuel remaining in the injection pipe 3 is retrieved by the aspirator 7 in the non-injection state.

Figure 13:
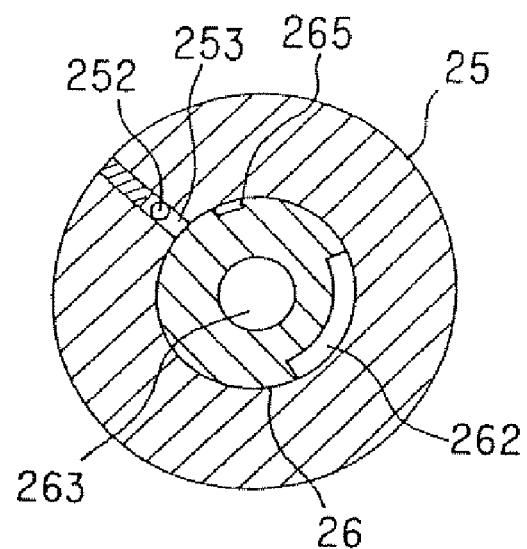
FIG. 13 is a cross-sectional view of the injection pump element according to the embodiment taken along the line X-X in FIG. 12, in which FIG. 13($a$) shows the injection pump element in the injection state and FIG. 13($b$) shows the injection pump element in the non-injections state.
Figure 13:
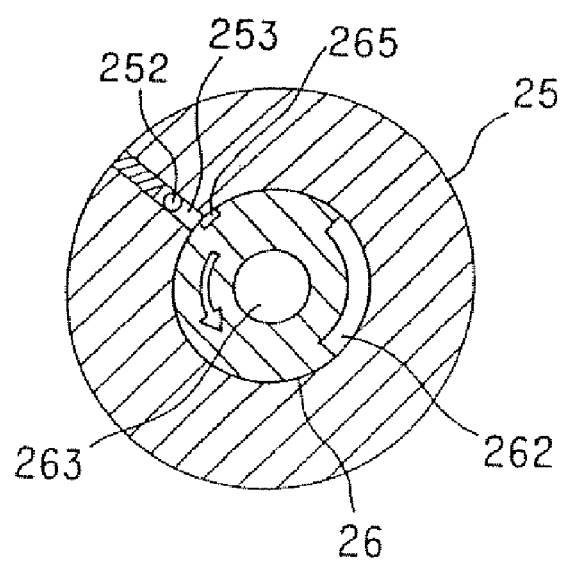

FIG. 13 is a cross-sectional view of the injection pump element 2 according to this embodiment taken along the line X-X in FIG. 12. FIG. 13(a) shows the injection pump element in the injection state and FIG. 13(b) shows the injection pump element in the non-injections state.

In the injection state shown in FIG. 13(a), namely when the plunger 26 is in such a rotational position that an effective stroke, by which a specified amount of DME fuel can be delivered under pressure, can be obtained, a purge groove 265 formed axially in the outer peripheral surface of the plunger 26 is not communicated with the purge port 253 formed in the inner peripheral surface of the plunger barrel 25.

In the non-injection state shown in FIG. 13(b), the plunger 26 is rotated circumferentially to such a rotational position that the purge groove 265 formed in the outer peripheral surface of the plunger 26 and the purge port 253 formed in the inner peripheral surface of the plunger barrel 25 are communicated with each other. Since the purge groove 265 extends to the upper end 264 of the plunger 26, the purge groove 265 is communicated with the fuel gallery 11 via the hole 263 and the notch 262. That is, in the non-injection state, a purge passageway is formed by the purge passage 242, the purge passage 252, the purge port 253, the purge groove 265, the hole 263, and the notch 262, and the injection pipe 3 is thereby communicated with the fuel gallery 11 even if the delivery valve 23 is closed. Thus, by retrieving DME fuel in the fuel gallery 11 with the aspirator 7 in the non-injection state, DME fuel in the injection pipe 3 communicated with the fuel gallery 11 can be retrieved through the purge passageway.

As described above, in the DME fuel supply device 100 of this embodiment, the injection pipe 3 and the fuel gallery 11 are communicated with each other in a non-injection state after stopping the diesel engine 200 even though the delivery valve 23 is closed. Thus, when the DME fuel in the fuel gallery 11 is retrieved by the aspirator 7 after the stopping of the diesel engine 200, DME fuel remaining in the injection pipe 3 can be evaporated and retrieved. Thus, the time necessary to retrieve DME fuel remaining in the injection system (the fuel gallery 11, the overflow fuel pipe 8 and the overflow fuel pipe 9) after stopping the diesel engine 200 into the fuel tank 4 can be reduced. It is, therefore, possible to avoid abnormal combustion such as knocking which prevents the diesel engine 200 from starting normally and causes significant vibration and noise.

In the DME fuel supply device for a diesel engine according to this embodiment, the time necessary to retrieve DME fuel remaining in the injection system after stopping the diesel engine into the fuel tank can be reduced.

Figure 14:
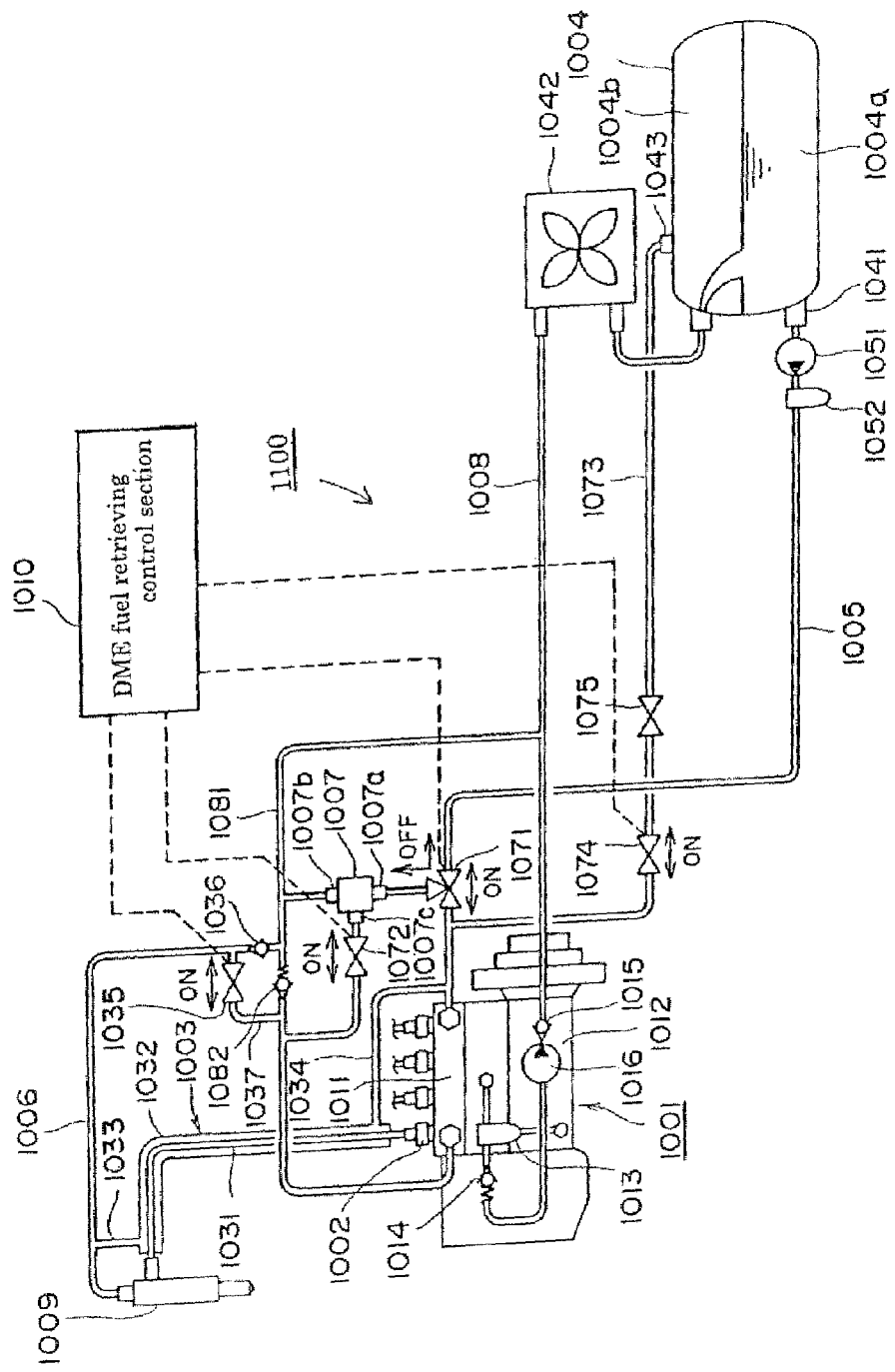
FIG. 14 is a schematic diagram of a second embodiment of the DME fuel supply device according to the invention of the present application.

FIG. 14 is a schematic diagram of a second embodiment of the DME fuel supply device according to the invention of the present application.

A DME fuel supply device 1100 for supplying DME fuel to a diesel engine has an injection pump 1001. The injection pump 1001 has the same number of injection pump elements 1002 as the number of cylinders which the diesel engine has. A feed pump 1051 pressurizes DME fuel reserved in a fuel tank 1004 to a specified pressure and delivers it into a feed pipe 1005. The fuel tank 1004 has a DME fuel delivery port 1041 which is located below the level of the DME fuel in the fuel tank 1004, and the feed pump 1051 is disposed in the vicinity of the DME fuel delivery port 1041 of the fuel tank 1004. The DME fuel delivered into the feed pipe 1005 is filtered by a filter 1051, and delivered to the injection pump 1001 via a three-way solenoid valve 1071. The three-way solenoid valve 1071 is ON in an injection state (while the diesel engine is operating) and permits flow in the direction indicated in the drawing.

A cam chamber 1012 in the injection pump 1001 has an exclusive lubricating system which is separated from the lubricating system of the diesel engine. An oil separator 1013 separates lubricating oil in the cam chamber 1012 in the injection pump 1001 containing DME fuel leaked into the cam chamber 1012 into DME fuel and lubricating oil and returns the lubricating oil to the cam chamber 1012. The DME fuel separated by the oil separator 1013 is delivered to a compressor 1016 via a check valve 1014 for preventing the pressure in the cam chamber 1012 from decreasing to atmospheric pressure or below, pressurized in the compressor 1016, and returned to the fuel tank 1004 via a check valve 1015 and the cooler 1042. The check valve 1015 is provided to prevent DME fuel from flowing in reverse direction from the fuel tank 1004 to the cam chamber 1012 when the diesel engine is stopped. The DME fuel supply device 1100 of this embodiment does not need an electric compressor, and the compressor 1016 uses a cam in the cam chamber 1012 as a driving source. Thus, it is possible to achieve a low power consumption DME fuel supply device 1100. The DME fuel pressurized to a specified pressure by the feed pump 1051 and delivered from the fuel tank 1004 is delivered under pressure in a specified amount from each of the injection pump elements 1002 of the injection pump 1001 to a fuel injection nozzle 1009 provided in each of the cylinders of the diesel engine via an injection pipe 1003 at specified timing. An overflow fuel pipe 1081 is provided with an overflow valve 1082 to maintain the pressure of DME fuel in a fuel gallery 1011 at a specified pressure and to regulate overflowed DME fuel to flow only in the direction of being returned to the fuel tank. The DME fuel overflowed from the injection pump 1001 is returned to the fuel tank 1004 via the overflow fuel pipe 1081, the overflow valve 1082, an overflow return pipe 1008 and a cooler 1042. The DME fuel overflowed from each fuel injection nozzle 1009 is returned to the fuel tank 1004 via a nozzle return pipe 1006, the overflow fuel pipe 1081, the overflow return pipe 1008 and the cooler 1042.

The DME fuel supply device 1100 also has "residual fuel retrieving means" for retrieving DME fuel remaining in the fuel gallery 1011 of the injection pump 1001, the overflow fuel pipe 1081 and the nozzle return pipe 1006 into the fuel tank 1004 when the diesel engine is stopped. The "residual fuel retrieving means" has an aspirator 1007, a three-way solenoid valve 1071, a two-way solenoid valve 1072 and a DME fuel retrieving control section 1010. The DME fuel retrieving control section 1010 detects the operating state of the diesel engine (the injection/non-injection state of the DME fuel supply device 1100) and controls the ON and OFF of the three-way solenoid valve 1071, the two-way solenoid valve 1072, the feed pump 1051 and so on depending on the detected state. When the diesel engine is stopped, the DME fuel retrieving control section 1010 performs control to retrieve DME fuel remaining in the fuel gallery 1011, the overflow fuel pipe 1081, and the nozzle return pipe 1006.

The aspirator 1007 has an inlet 1007a, an outlet 1007b and a suction port 1007c. The inlet 1007a and the outlet 1007b are communicated with each other via a straight communication passage, and the suction port 1007c is branched at generally a right angle from the communication passage between the inlet 1007a and the outlet 1007b. The outlet of a communication passage, through which flow can pass when the three-way solenoid valve 1071 is OFF, is connected to the inlet 1007a, and the outlet 1007b is connected to a passage to the fuel tank 1004 via the cooler 1042. The suction port 1007c is connected to the two-way solenoid valve 1072, which is closed in an OFF state in the injection state (while the diesel engine is operating).

In the non-injection state (while the diesel engine is stopped), the DME fuel retrieving control section 1010 controls the three-way solenoid valve 1071 to be OFF to form the communication passage between the feed pipe 1005 and the inlet 107a of the aspirator 1007, and also controls the two-way solenoid valve 1072 to be ON to communicate the overflow fuel pipe 1081 upstream from the overflow valve 1082 and the suction port 1007c of the aspirator 1007. Thus, DME fuel delivered from the feed pump 1051 is delivered not to the injection pump 1001 but to the aspirator 1007, passed from the inlet 1007a to the outlet 1007b, returned to the fuel tank 1004 via the overflow fuel pipe 1081 downstream from the overflow valve 1082, the overflow return pipe 1008 and the cooler 1042, and delivered again from the feed pump 1051 to the aspirator 1007. That is, the DME fuel is circulated via the aspirator 1007. DME fuel remaining in the fuel gallery 1011 in the injection pump 1001 and the overflow fuel pipe 1081 upstream from the overflow valve 1082 is evaporated by a suction force produced by the flow of DME fuel from the inlet 1007a to the outlet 1007b, and the evaporated DME fuel is sucked through the suction port 1007c, joins the flow of DME fuel from the inlet 1007a to the outlet 1007b and is retrieved into the fuel tank 1004. Since the DME fuel retrieving control section 1010 controls the two-way solenoid valve 1035 to be ON in the non-injection state, the nozzle return pipe 1006 and the overflow fuel pipe 1081 upstream from the overflow valve 1082 are communicated with each other so that DME fuel remaining in the nozzle return pipe 1006 is sucked through the suction port 1007c via the overflow fuel pipe 1081 upstream from the overflow valve 1082 and retrieved into the fuel tank 1004.

The DME fuel supply device 1100 also has a vapor-phase pressure delivery pipe 1073 connecting an outlet for a vapor phase 1004b in the fuel tank 1004 (vapor phase delivery port 1043) and the inlet of the fuel gallery 1011 of the injection pump 1001. The vapor-phase pressure delivery pipe 1073 has a small-diameter portion 1075 where the inside diameter is partially reduced, and a vapor-phase pressure delivery pipe switching solenoid valve 1074 for opening and closing the vapor-phase pressure delivery pipe 1073. While DME fuel in the fuel gallery 1011, the overflow fuel pipe 1081 and the nozzle return pipe 1006 is sucked and retrieved into the fuel tank 1004 by the foregoing "residual fuel retrieving means", the DME fuel retrieving control section 1010 controls the vapor-phase pressure delivery pipe switching solenoid valve 1074 to be ON so that flow can pass through the vapor-phase pressure delivery pipe 1073 connecting the vapor phase 1004b in the fuel tank 1004 and the inlet of the fuel gallery 1011. The DME fuel in a liquid state remaining in the fuel gallery 1011, the overflow fuel pipe 1081 and the nozzle return pipe 1006 is delivered under pressure to the suction port 1007c of the aspirator 1007 by the high pressure of the vapor phase 1004b. The pressure is further increased by the small-diameter portion 1075 of the vapor-phase pressure delivery pipe 1073, where the inside diameter is partially reduced, and the DME fuel can be delivered under a higher pressure.

As described before, the suction force of the aspirator 1007 can only suck evaporated DME fuel at most. Thus, the time necessary to retrieve the DME fuel remaining in the fuel gallery 1011, the overflow fuel pipe 1081 and the nozzle return pipe 1006 can be significantly reduced by delivering the DME fuel in a liquid state to the suction port 1007c of the aspirator 7 using the pressure of the vapor phase 1004b. Then, after a lapse of a predetermined period of time, the DME fuel retrieving control section 1010 closes only the vapor-phase pressure delivery pipe switching solenoid valve 1074 to shut off the communication between the fuel gallery 1011 and the high-pressure vapor phase 1004b. Since the pressures in the fuel gallery 1011, the overflow fuel pipe 1081 and the nozzle return pipe 1006 can be thereby further decreased, evaporation of residual DME fuel in a liquid state which was unable to be delivered by the pressure of the vapor phase is promoted. Thus, the time necessary for the "residual fuel retrieving means" to retrieve residual DME fuel can be further reduced.

Figure 18:
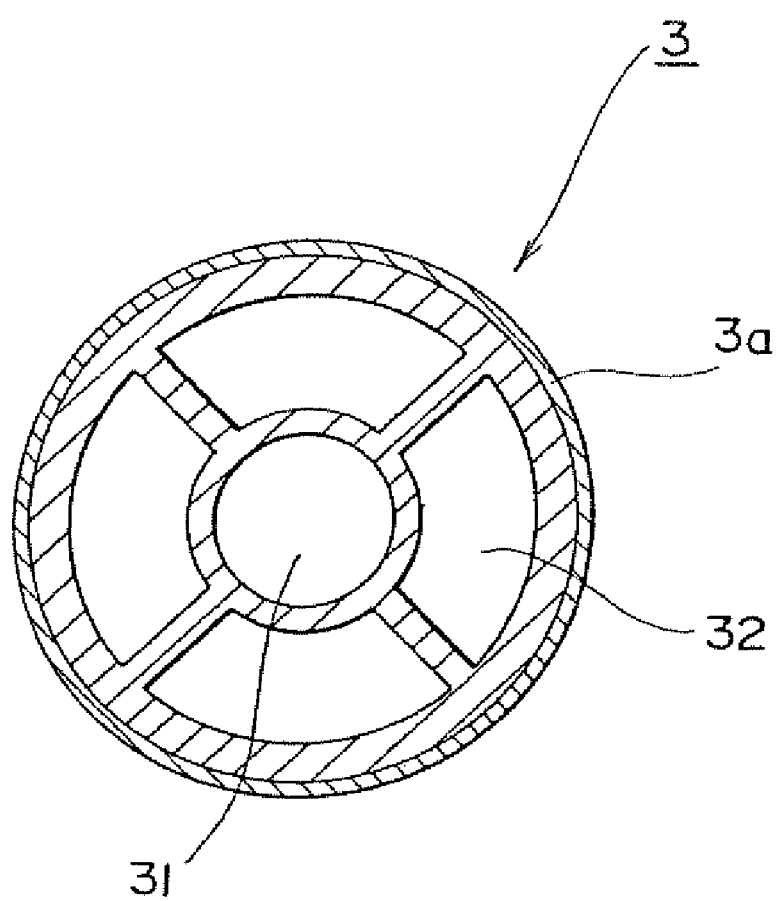
FIG. 18 is a cross-sectional view illustrating the structure of the injection pipe 3.

Each injection pipe 1003 of the DME fuel supply device 1100 has a double pipe structure having an injection fuel passage 1031 and a coolant passage 1032 as means for cooling the injection pipe 1003. FIG. 18 is a cross-sectional view illustrating the structure of the injection pipe 1003. The injection fuel passage 1031 communicates the delivery port of the injection pump element 1002 with the fuel injection nozzle 1009 so that high-pressure DME fuel delivered under pressure from the fuel gallery 1011 through the injection pump element 1002 to the fuel injection nozzle 1009. The coolant passage 1032 is formed around the injection fuel passage 1031 and communicates a feed pipe 1005 upstream from the inlet of the fuel gallery 1011 and the nozzle return pipe 1006 so that DME fuel delivered from the fuel tank 1004 to the feed pipe 1005 by the feed pump 1051 flows through the coolant passage 1032 as coolant for cooling DME fuel flowing through the injection fuel passage 1031.

That is, when the feed pump 1051 is operating, DME fuel in the fuel tank 1004 flows as a coolant through a circulation route. In other words, DME fuel flows into the coolant passage 1032 from the feed pipe 1005 via a pipe 1034, flows out to the nozzle return pipe 1006 via a pipe 1033, and returns to the fuel tank 1004 via a check valve 1036, the overflow fuel pipe 1081, the overflow return pipe 1008, and the cooler 1042. The check valve 1036 prevents DME fuel in the fuel tank 1004 from flowing in reverse direction from the overflow fuel pipe 1081 to the coolant passage 1032. The DME fuel flowing through the coolant passage 1032 cools the injection fuel passage 1031 and prevents temperature rise of the injection fuel passage 1031.

DME fuel remaining in the coolant passage 1032 in a non-injection state is retrieved by the foregoing "residual fuel retrieving means". Since the DME fuel retrieving control section 1010 controls the two-way valve 1035 to be ON in a non-injection state as described before, the nozzle return pipe 1006 and the overflow fuel pipe 1081 upstream from the overflow valve 1082 is communicated with each other via a coolant passage retrieving pipe 1037. Thus, DME fuel remaining in the coolant passage 1032 is sucked into the suction port 1007c of the aspirator 1007 via the coolant passage retrieving pipe 1037, the nozzle return pipe 1006 and the overflow fuel pipe 1081 upstream from the overflow valve 1082 and retrieved into the fuel tank 1004.

Since the fuel injection passage 1031 can be cooled by DME fuel as coolant flowing through the coolant passage 1032 as described above, it is possible to prevent heat from the DME fuel supply device 1100 and the diesel engine from being transferred to the injection pipe 1003 and increasing the temperature of the injection pipe 1003. Thus, it is possible to prevent temperature rise of DME fuel delivered under pressure to the fuel injection nozzle 1009, and to reduce the possibility that the injection characteristics of DME fuel injected from the fuel injection nozzle 1009 become unstable. Also, since the injection pipe 1003 has a double pipe structure having the injection fuel passage 1031 and the coolant passage 1032 and DME fuel in the fuel tank 1004 is circulated through the coolant passage 1032 as coolant, it is possible to achieve means for cooling the injection pipe 1003 at a low cost.

Since temperature rise of the injection pipe 1003 can be prevented, it is possible to reduce the possibility that part of the DME fuel filled into the injection pipe is evaporated and the evaporated DME fuel prevents DME fuel from filling into the injection fuel passage 1031 of the injection pipe 1003 when DME fuel is supplied into the injection pipe 1003 from the fuel tank 1004 immediately after the diesel engine is stopped. In addition, a coating 1003a of a heat insulating material is applied on the outer peripheral surface of the injection pipe 1003 to insulate heat to the injection pipe 1003 from around it and the temperature rise of the injection pipe 1003 can be reliably prevented.

Figure 15:
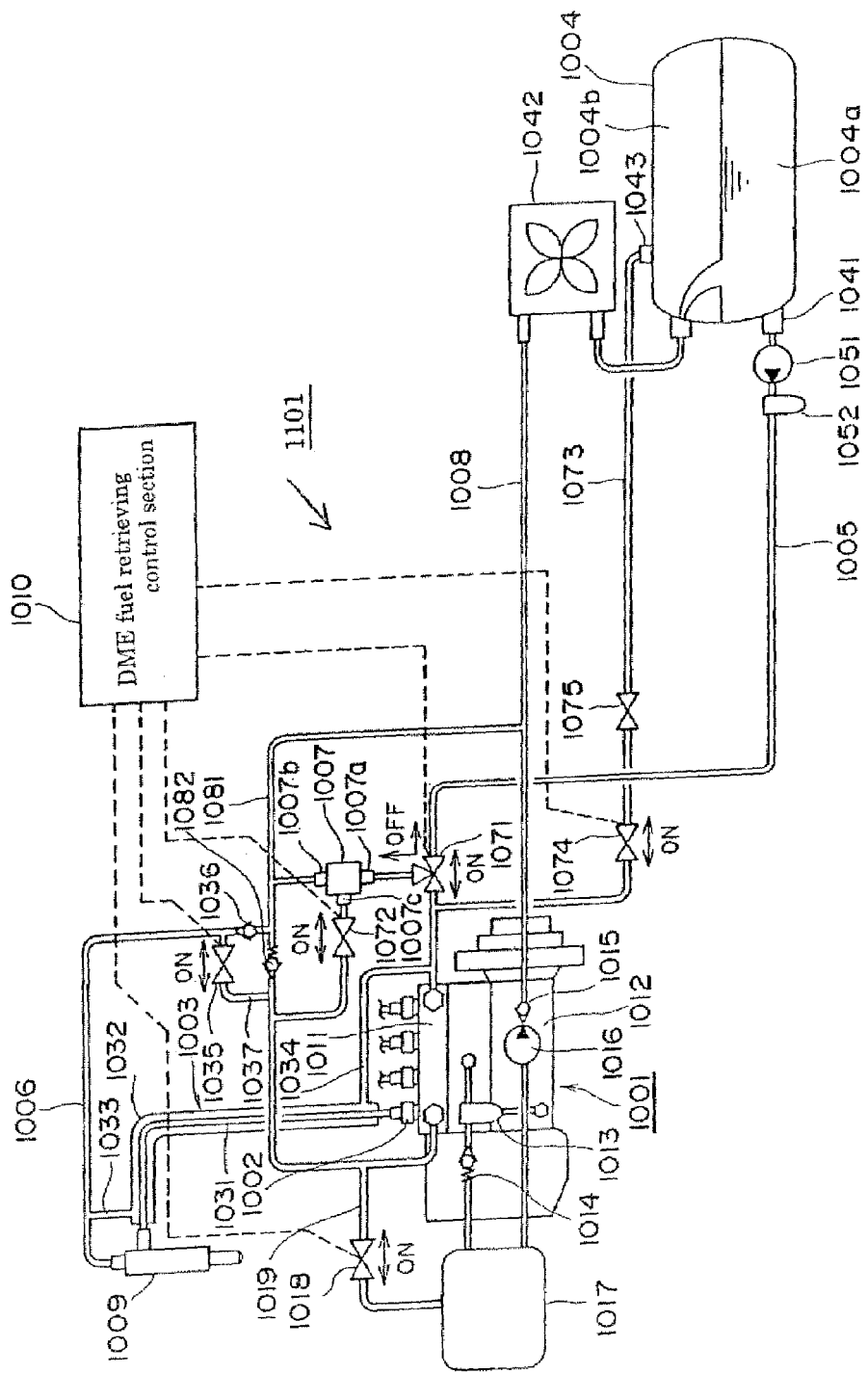
FIG. 15 is a schematic diagram of a third embodiment of the DME fuel supply device according to the invention of the present application.

A third embodiment of the DME fuel supply device according to the invention of the present application has a feature, in addition to the features of the second embodiment, that a low-pressure tank 1017 is provide between the oil separator 1013 and the compressor 1016. FIG. 15 is a schematic diagram of a third embodiment of the DME fuel supply device 1101 according to the invention of the present application.

A low-pressure tank 1017 with a sealed structure and a capacity which is smaller than that of the fuel tank 1004 is disposed between the oil separator 1013 and the compressor 1016. The low-pressure tank 1017 is communicated with the overflow fuel pipe 1081 upstream from the overflow valve 1082 via a purge pipe 1019. A purge pipe switching solenoid valve 1018 capable of opening and closing the purge pipe 1019 is disposed in the purge pipe 1019. The purge pipe switching solenoid valve 1018 is controlled by the DME fuel retrieving control section 1010. The purge pipe switching solenoid valve 1018 is controlled to be ON and opened so that the low-pressure tank 1017 and the overflow fuel pipe 1081 can be communicated with each other when the diesel engine is stopped, and controlled to be OFF and closed so that the communication between the low-pressure tank 1017 and the overflow fuel pipe 1081 can be shut off when the diesel engine is operating. A check valve 1014 is disposed between the low-pressure tank 1017 and the oil separator 1013. The check valve 1014 maintains the pressure on the oil separator 1013 side constant and prevents DME fuel from flowing in reverse direction from the low-pressure tank 1017 to the oil separator 1013.

DME fuel separated from lubricating oil in the cam chamber 1012 by the oil separator 1013 is sucked by the compressor 1016 via the low-pressure tank 1017. Since the pressure in the low-pressure tank 1017 is decreased by the suction of the compressor 1016 and since the check valve 1014 maintains the pressure on the oil separator 1013 side constant, a low pressure is created in the low-pressure tank 1017. Since the low-pressure tank 1017 has a sealed structure, the low-pressure state can be maintained in the low-pressure tank 1017 even when the diesel engine is stopped and the compressor 1016 is stopped. When the purge pipe switching solenoid valve 1018 is controlled to be ON to communicate the low-pressure tank 1017 and the overflow fuel pipe 1081 while the low-pressure state is maintained in the low-pressure tank 1017 after stopping the diesel engine, part of DME fuel remaining in the overflow fuel pipe 1081 (and DME fuel in the nozzle return pipe 1006 when the two-way valve 1035 is ON and opened) is sucked and retrieved into the low-pressure tank 1017 by the negative pressure in the low-pressure tank 1017. The DME fuel retrieved into the low-pressure tank 1017 is sucked by the compressor 1016 and retrieved into the fuel tank 1004 when the diesel engine is stated again and the compressor 1016 starts operating.

Thus, when the purge pipe switching solenoid valve 1018 is controlled to be ON after the DME fuel remaining in the fuel gallery 1011' the overflow fuel pipe 1081 and the nozzle return pipe 1006 has been retrieved by the "residual fuel retrieving means", residual DME fuel which was unable to be retrieved by the "residual fuel retrieving means" can be sucked and retrieved into the low-pressure tank 1017 at once. Thus, the time necessary for the "residual fuel retrieving means" to retrieve residual DME fuel can be thereby reduced. The same effect can be expected when the above operation is performed before the "residual fuel retrieving means" retrieves DME fuel remaining in the fuel gallery 1011, the overflow fuel pipe 1081 and the nozzle return pipe 1006.

Figure 16:
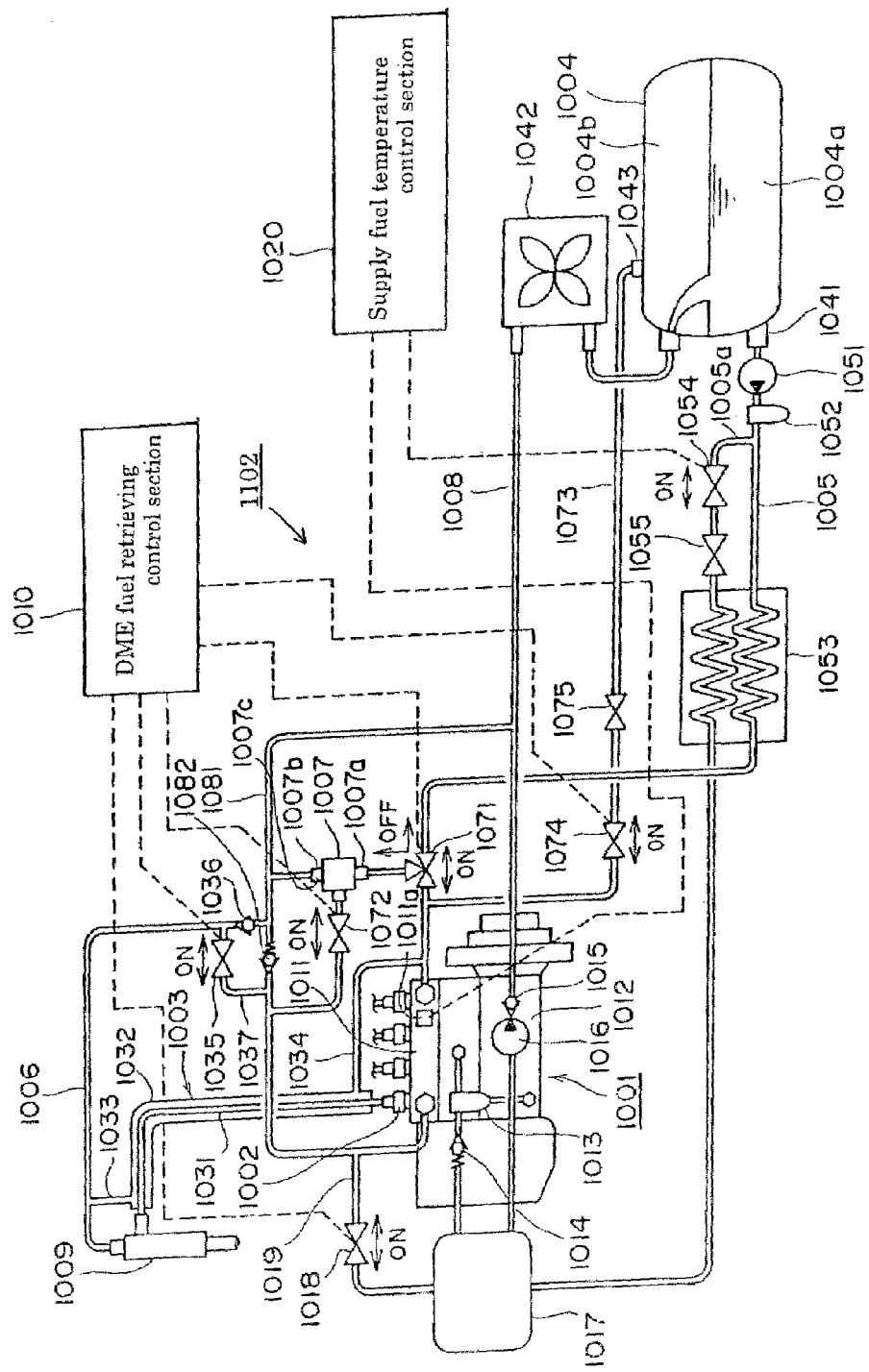
FIG. 16 is a schematic diagram of a fourth embodiment of the DME fuel supply device according to the invention of the present application.

A DME fuel supply device according to a fourth embodiment of the invention of the present application is provided with a "supply fuel cooling unit" for cooling DME fuel to be supplied to the injection pump 1001 in addition to the foregoing third embodiment. FIG. 16 is a schematic diagram of a fourth embodiment of the DME fuel supply device according to the invention of the present application.

A DME fuel supply device 1102 has a "supply fuel cooling unit" having a temperature sensor 1011a as "temperature detecting means" for detecting the temperature of DME fuel in the fuel gallery 1011, a fuel cooler 1053 having a fuel carburetor 1055 for evaporating DME fuel as coolant, a coolant supply pipe 1005a for supplying DME fuel from the fuel tank 1004 to the fuel cooler 1053, a coolant supply pipe switching solenoid valve 1054 capable of opening and closing the coolant supply pipe 1005a, and a supply fuel temperature control section 1020. The supply fuel temperature control section 1020 controls the coolant supply pipe switching solenoid valve 1054 to control the temperature of DME fuel flowing through the feed pipe 1005 so that the temperature of DME fuel delivered from the fuel gallery 1011 to each injection pipe 1003 injection fuel passage 1031) can be constant based on the temperature of DME fuel in the fuel gallery 1011 detected by the temperature sensor 1011a.

The fuel cooler 1053 evaporates DME fuel flowing through the coolant supply pipe 1005a with the fuel carburetor 1055 and cools DME fuel flowing through the feed pipe 1005 using the heat of vaporization of the DME fuel. The supply fuel temperature control section 1020 opens the coolant supply pipe switching solenoid valve 1054 so that DME fuel as coolant can be supplied to the fuel cooler 1053 to cool DME fuel flowing through the feed pipe 1005 when the temperature of DME fuel in the fuel gallery 1011 detected by the temperature sensor 1011a is higher than a specified value, and closes the coolant supply pipe switching solenoid valve 1054 so that DME fuel as coolant cannot be supplied to the fuel cooler 1053 when the temperature of DME fuel in the fuel gallery 1011 detected by the temperature sensor 1011a is lower than a specified value.

Since the temperature of DME fuel in the fuel gallery 1011 can be maintained constant by cooling DME fuel flowing through the feed pipe 1005 as described above, the injection characteristics of the fuel injection nozzle 1009 can be stabilized without correcting the injection amount of DME fuel with temperature in the injection pump 1001.

Figure 17:
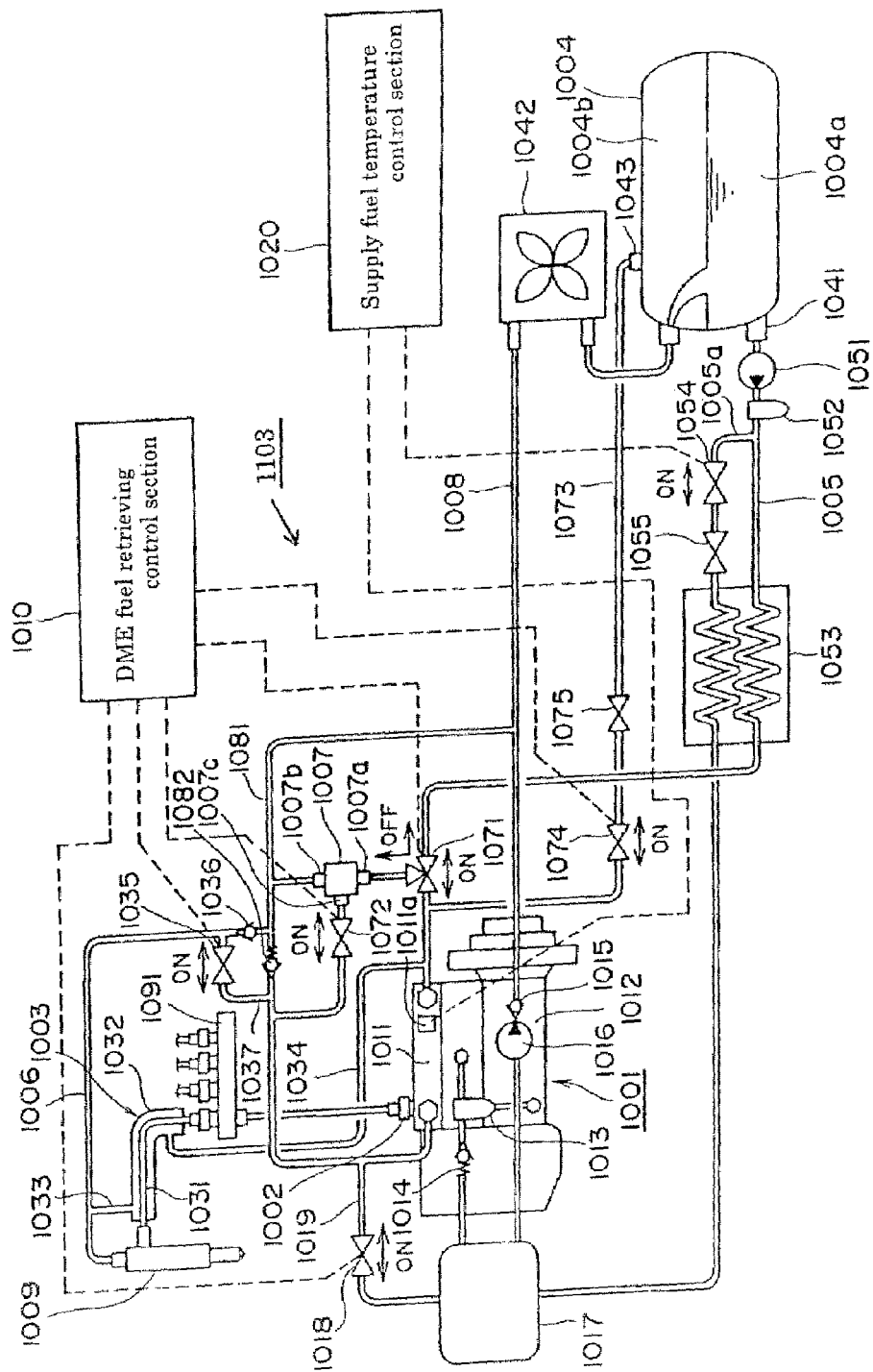
FIG. 17 is a schematic diagram of a fifth embodiment of the DME fuel supply device according to the invention of the present application.

In a fifth embodiment of the invention of the present application, a common rail system is employed in the DME fuel supply device 1102 of the fourth embodiment. FIG. 17 is a schematic diagram of the fifth embodiment of the DME fuel supply device according to the invention of the present application.

The invention of the present application can be embodied and the effects of the invention of the present application can be obtained in a common rail type DME fuel supply device 1103 in which DME fuel delivered under pressure from an injection pump 1001 is supplied via a common rail 1091 to which the fuel injection nozzles 1009 are connected.

In the DME fuel supply device for a diesel engine according to the invention of the present application, it is possible to reduce the possibility that the injection characteristics of DME fuel injected from a fuel injection nozzle becomes unstable when the temperature of the injection pipe is increased and the possibility that DME fuel cannot be filled into the injection pipe when DME fuel is supplied into the injection pipe from the fuel tank immediately after the diesel engine is stopped.

Figure 19:
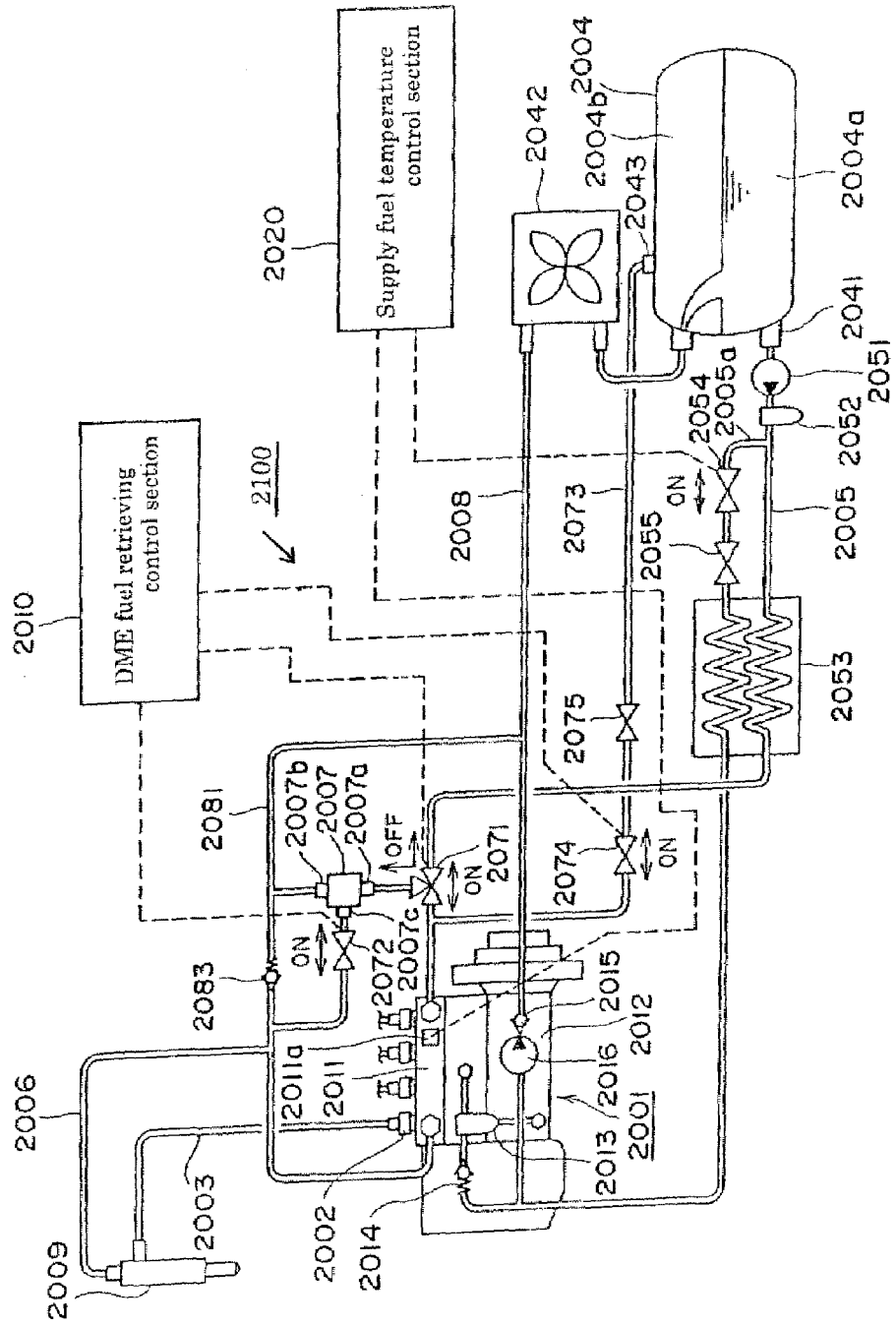
FIG. 19 is a schematic diagram of a sixth embodiment of the DME fuel supply device according to the invention of the present application.

FIG. 19 is a schematic diagram of a sixth embodiment of the DME fuel supply device according to the invention of the present application.

A DME fuel supply device 2100 for supplying DME fuel to a diesel engine has an injection pump 2001. The injection pump 2001 has the same number of injection pump elements 2002 as the number of cylinders which the diesel engine has. A feed pump 2051 pressurizes DME fuel reserved in a fuel tank 2004 to a specified pressure and delivers it into a feed pipe 2005. The fuel tank 2004 has a DME fuel delivery port 2041 which is located below the level of the DME fuel in the fuel tank 2004, and the feed pump 2051 is disposed in the vicinity of the DME fuel delivery port 2041 of the fuel tank 2004. The DME fuel delivered into the feed pipe 2005 is filtered by a filter 2051, and delivered to the injection pump

2001 via a three-way solenoid valve 2071. The three-way solenoid valve 2071 is ON in an injection state (while the diesel engine is operating) and permits flow in the direction indicated in the drawing.

A cam chamber 2012 in the injection pump 2001 has an exclusive lubricating system which is separated from the lubricating system of the diesel engine. An oil separator 2013 separates lubricating oil in the cam chamber 2012 in the injection pump 2001 containing DME fuel leaked into the cam chamber 2012 into DME fuel and lubricating oil and returns the lubricating oil to the cam chamber 2012. The DME fuel separated by the oil separator 2013 is delivered to a compressor 2012 via a check valve 2014 for preventing the pressure in the cam chamber 2016 from decreasing to atmospheric pressure or below, pressurized in the compressor 2016, and returned to the fuel tank 2004 via a check valve 2015 and the cooler 2042. The check valve 2015 is provided to prevent DME fuel from flowing in reverse direction from the fuel tank 2004 to the cam chamber 2012 when the diesel engine is stopped. The DME fuel supply device 2100 of this embodiment does not need an electric compressor, and the compressor 2016 uses a cam in the cam chamber 2012 as a driving source. Thus, it is possible to achieve a low power consumption DME fuel supply device 2100.

The DME fuel pressurized to a specified pressure by the feed pump 2051 and delivered from the fuel tank 2004 is delivered under pressure in a specified amount from each of the injection pump elements 2001 of the injection pump 2002 to a fuel injection nozzle 2003 provided in each of the cylinders of the diesel engine via an injection pipe 2009 at specified timing. An overflow fuel pipe 2081 is provided with an overflow valve 2082 to maintain the pressure of DME fuel in a fuel gallery 2011 at a specified pressure and to regulate overflowed DME fuel to flow only in the direction of being returned to the fuel tank. The DME fuel overflowed from the injection pump 2001 is returned to the fuel tank 2004 via the overflow fuel pipe 2081, the overflow valve 2082, an overflow return pipe 2008 and a cooler 2042. The DME fuel overflowed from each fuel injection nozzle 2009 is returned to the fuel tank 2004 via a nozzle return pipe 2006, the overflow fuel pipe 2081, the overflow return pipe 2008 and the cooler 2042.

The DME fuel supply device 2100 also has "residual fuel retrieving means" for retrieving DME fuel remaining in the fuel gallery 2011 of the injection pump 2001, the overflow fuel pipe 2081 and the nozzle return pipe 2006 into the fuel tank 2004 when the diesel engine is stopped. The "residual fuel retrieving means" has an aspirator 2007, a three-way solenoid valve 2071, a two-way solenoid valve 2072 and a DME fuel retrieving control section 2010. The DME fuel retrieving control section 2010 detects the operating state of the diesel engine (the injection/non-injection state of the DME fuel supply device 2100) and controls the ON and OFF of the three-way solenoid valve 2071, the two-way solenoid valve 2072, the feed pump 2051 and so on depending on the detected state. When the diesel engine is stopped, the DME fuel retrieving control section 2010 performs control to retrieve DME fuel remaining in the fuel gallery 2011, the overflow fuel pipe 2081, and the nozzle return pipe 2006.

The aspirator 2007 has an inlet 2007a, an outlet 2007b and a suction port 2007c. The inlet 2007a and the outlet 2007b are communicated with each other via a straight communication passage, and the suction port 2007c is branched at generally a right angle from the communication passage between the inlet 2007a and the outlet 2007b. The outlet of a communication passage, through which flow can pass when the three-way solenoid valve 2071 is OFF, is connected to the inlet 2007a, and the outlet 2007b is connected to a passage to the fuel tank 2004 via the cooler 2042. The suction port 2007c is connected to the two-way solenoid valve 20072, which is closed in an OFF state in the injection state (while the diesel engine is operating).

In the non-injection state (while the diesel engine is stopped), the DME fuel retrieving control section 2010 controls the three-way solenoid valve 2071 to be OFF to form the communication passage between the feed pipe 2005 and the inlet 2007a of the aspirator 2007, and also controls the two-way solenoid valve 2072 to be ON to communicate the overflow fuel pipe 2081 upstream from the overflow valve 2082 and the suction port 2007c of the aspirator 2007. Thus, DME fuel delivered from the feed pump 2051 is delivered not to the injection pump 2001 but to the aspirator 2007, passed from the inlet 2007a to the outlet 2007b, returned to the fuel tank 2004 via the overflow fuel pipe 2081 downstream from the overflow valve 2082, the overflow return pipe 2008 and the cooler 2042, and delivered again from the feed pump 2051 to the aspirator 2007. That is, the DME fuel is circulated via the aspirator 2007. DME fuel remaining in the fuel gallery 2011 in the injection pump 2001 and the overflow fuel pipe 2081 upstream from the overflow valve 2082 is evaporated by a suction force produced by the flow of DME fuel from the inlet 2007a to the outlet 2007h, and the evaporated DME fuel is sucked through the suction port 2007c, joins the flow of DME fuel from the inlet 2007a to the outlet 2007b and is retrieved into the fuel tank 2004.

The DME fuel supply device 2100 also has a vapor-phase pressure delivery pipe 2073 connecting an outlet for a vapor phase 2004b in the fuel tank 2004 (vapor phase delivery port 2043) and the inlet of the fuel gallery 2011 of the injection pump 2001. The vapor-phase pressure delivery pipe 2073 has a small-diameter portion 2075 where the inside diameter is partially reduced, and a vapor-phase pressure delivery pipe switching solenoid valve 2074 for opening and closing the vapor-phase pressure delivery pipe 2073. While DME fuel in the fuel gallery 2011, the overflow fuel pipe 2081 and the nozzle return pipe 2006 is sucked and retrieved into the fuel tank 2004 by the foregoing "residual fuel retrieving means", the DME fuel retrieving control section 2010 controls the vapor-phase pressure delivery pipe switching solenoid valve 2074 to be ON so that flow can pass through the vapor-phase pressure delivery pipe 2073 connecting the vapor phase 2004b in the fuel tank 2004 and the inlet of the fuel gallery 2011. The DME fuel in a liquid state remaining in the fuel gallery 2011, the overflow fuel pipe 2081 and the nozzle return pipe 2006 is delivered under pressure to the suction port 2007c of the aspirator 2007 by the high pressure of the vapor phase 2004b. The pressure is further increased by the small-diameter portion 2075 of the vapor-phase pressure delivery pipe 2073, where the inside diameter is partially reduced, and the DME fuel can be delivered under a higher pressure.

As described before, the suction force of the aspirator 2007 can only suck evaporated DME fuel at most. Thus, the time necessary to retrieve the DME fuel remaining in the fuel gallery 2011, the overflow fuel pipe 2081 and the nozzle return pipe 2006 can be significantly reduced by delivering the DME fuel in a liquid state to the suction port 2007c of the aspirator 7 using the pressure of the vapor phase 2004b. Then, after a lapse of a predetermined period of time, the DME fuel retrieving control section 2010 closes only the vapor-phase pressure delivery pipe switching solenoid valve 2074 to shut off the communication between the fuel gallery

2011 and the high-pressure vapor phase 2004*b*. Since the pressures in the fuel gallery 2011, the overflow fuel pipe 2081 and the nozzle return pipe 2006 can be thereby further decreased, evaporation of residual DME fuel in a liquid state which was unable to be delivered by the pressure of the vapor phase is promoted. Thus, the time necessary for the "residual fuel retrieving means" to retrieve residual DIME fuel can be further reduced.

The DME fuel supply device 2100 has a "supply fuel cooling unit" having a temperature sensor 2011*a* as "temperature detecting means" for detecting the temperature of DME fuel in the fuel gallery 2011, a fuel cooler 2053 having a fuel carburetor 2055 for evaporating DME fuel as coolant, a coolant supply pipe 2005*a* for supplying DME fuel from the fuel tank 2004 to the fuel cooler 2053, a coolant supply pipe switching solenoid valve 2054 capable of opening and closing the coolant supply pipe 2005*a*, and a supply fuel temperature control section 2020. The supply fuel temperature control section 2020 controls the coolant supply pipe switching solenoid valve 2054 to control the temperature of DME fuel flowing through the feed pipe 2005 so that the temperature of DME fuel delivered from the fuel gallery 2011 to each injection pipe 2003 (injection fuel passage 2031) can be constant based on the temperature of DME fuel in the fuel gallery 2011 detected by the temperature sensor 2011*a*.

The fuel cooler 2053 evaporates DME fuel flowing through the coolant supply pipe 2005*a* with the fuel carburetor 2055 and cools DME fuel flowing through the feed pipe 2005 using the heat of vaporization of the DME fuel. The supply fuel temperature control section 2020 opens the coolant supply pipe switching solenoid valve 2054 so that DME fuel as coolant can be supplied to the fuel cooler 2053 to cool DME fuel flowing through the feed pipe 2005 when the temperature of DME fuel in the fuel gallery 2011 detected by the temperature sensor 2011*a* is higher than a specified value, and closes the coolant supply pipe switching solenoid valve 2054 so that DME fuel as coolant cannot be supplied to the fuel cooler 2053 when the temperature of DME fuel in the fuel gallery 2011 detected by the temperature sensor 2011*a* is lower than a specified value.

Since the temperature of DME fuel in the fuel gallery 2011 can be maintained constant by cooling DME fuel flowing through the feed pipe 2005 as described above, the injection characteristics of the fuel injection nozzle 2009 can be stabilized without correcting the injection amount of DME fuel with temperature in the injection pump 2001.

Figure 20:
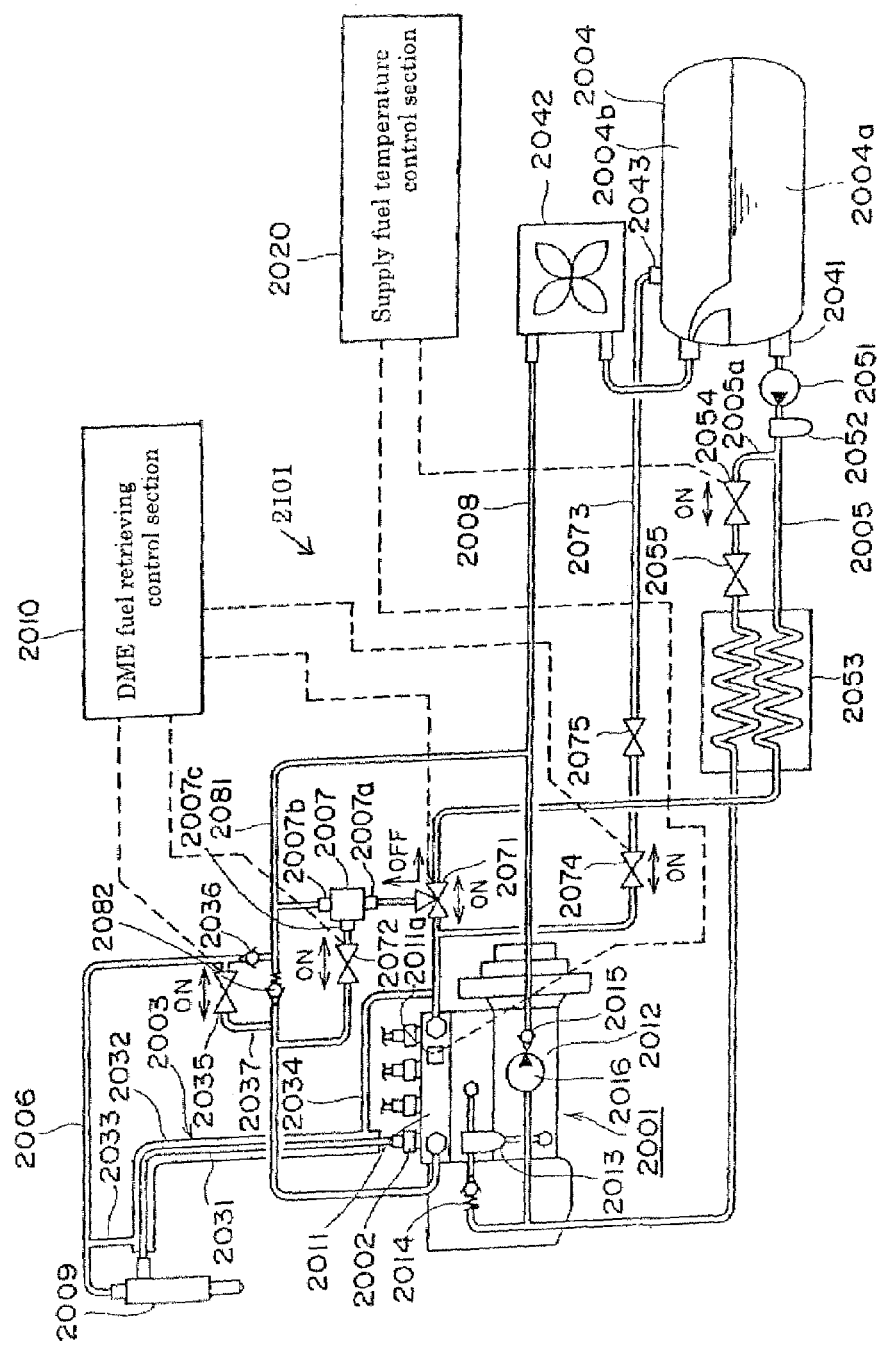
FIG. 20 is a schematic diagram of a seventh embodiment of the DME fuel supply device according to the invention of the present application.

A DME fuel supply device according to a seventh embodiment of the invention of the present application has a feature that, in addition to the features of the sixth embodiment, each injection pipe 3 has a double pipe structure. FIG. 20 is a schematic diagram of the seventh embodiment of the DME fuel supply device according to the invention of the present application.

Each injection pipe 2003 of the DME fuel supply device 2101 has a double pipe structure having an injection fuel passage 2031 and a coolant passage 2032 as means for cooling the injection pipe 2003. The injection pipe 2003 has generally the same constitution as the injection pipe 1003 shown in FIG. 18. The injection fuel passage 2031 communicates the delivery port of the injection pump element 2002 with the fuel injection nozzle 2009 so that high-pressure DME fuel delivered under pressure from the fuel gallery 2011 delivered from the injection pump elements 2002 to the fuel injection nozzle 2009. The coolant passage 2032 is formed around the injection fuel passage 2031 and communicates the feed pipe 2005 upstream from the inlet of the fuel gallery 2011 and the nozzle return pipe 2006 so that DME fuel delivered from the fuel tank 2004 to the feed pipe 2005 by the feed pump 2051 flows through the coolant passage 2032 as coolant for cooling DME fuel flowing through the injection fuel passage 2031.

That is, when the feed pump 2051 is operating, DME fuel in the fuel tank 2004 flows as a coolant through a circulation route. In other words, DME fuel flows into the coolant passage 2032 from the feed pipe 2005 via a pipe 2034, flows out to the nozzle return pipe 2006 via a pipe 2033, and returns to the fuel tank 2004 via a check valve 2036, the overflow fuel pipe 2081, the overflow return pipe 2008 and the cooler 2049. A check valve 2036 prevents DME fuel in the fuel tank 2004 from flowing in reverse direction from the overflow fuel pipe 2081 to the coolant passage 2032. The DME fuel flowing through the coolant passage 2032 cools the injection fuel passage 2031 and prevents temperature rise of the injection fuel passage 2031.

DME fuel remaining in the coolant passage 2032 in a non-injection state is retrieved by the foregoing "residual fuel retrieving means". The DME fuel retrieving control section 2010 controls the two-way valve 2035 to be ON in a non-injection state so that the nozzle return pipe 2006 and the overflow fuel pipe 2081 upstream from the overflow valve 2082 can be communicated with each other via a coolant passage retrieving pipe 2037. Thus, DME fuel remaining in the nozzle return pipe 2006 and the coolant passage 2032 is sucked into the suction port 2007*c* of the aspirator 2007 via the coolant passage retrieving pipe 2037 and the overflow fuel pipe 2081 upstream from the overflow valve 2082 and retrieved into the fuel tank 2004.

Since the fuel injection passage 2031 can be cooled by DME fuel as coolant flowing through the coolant passage 2032 as described above, it is possible to prevent heat from the DME fuel supply device 2101 and the diesel engine from being transferred to the injection pipe 2003 and increasing the temperature of the injection pipe 2003. Thus, it is possible to prevent temperature rise of DME fuel delivered under pressure to the fuel injection nozzle 2009, and to reduce the possibility that the injection characteristics of DME fuel injected from the fuel injection nozzle 2009 become unstable. Also, since the injection pipe 2003 has a double pipe structure having the injection fuel passage 2031 and the coolant passage 2032 and DME fuel in the fuel tank 2004 is circulated through the coolant passage 2032 as coolant, it is possible to achieve means for cooling the injection pipe 2003 at a low cost.

Since temperature rise of the injection pipe 2003 can be prevented, it is possible to reduce the possibility that part of the DME fuel filled into the injection pipe is evaporated and the evaporated DME fuel prevents DME fuel from filling into the injection fuel passage 2031 of the injection pipe 2003 when DME fuel is supplied into the injection pipe 2004 from the fuel tank 2004 immediately after the diesel engine is stopped. In addition, a coating 2003*a* of a heat insulating material is applied on the outer peripheral surface of the injection pipe 2003 to insulate heat to the injection pipe 2003 from around it, and the temperature rise of the injection pipe 2003 can be reliably prevented.

According to the invention of the present application, the injection characteristics of DME fuel can be stabilized without correcting the injection amount of the DME fuel by maintaining the temperature of the DME fuel in the fuel gallery constant.

Figure 21:
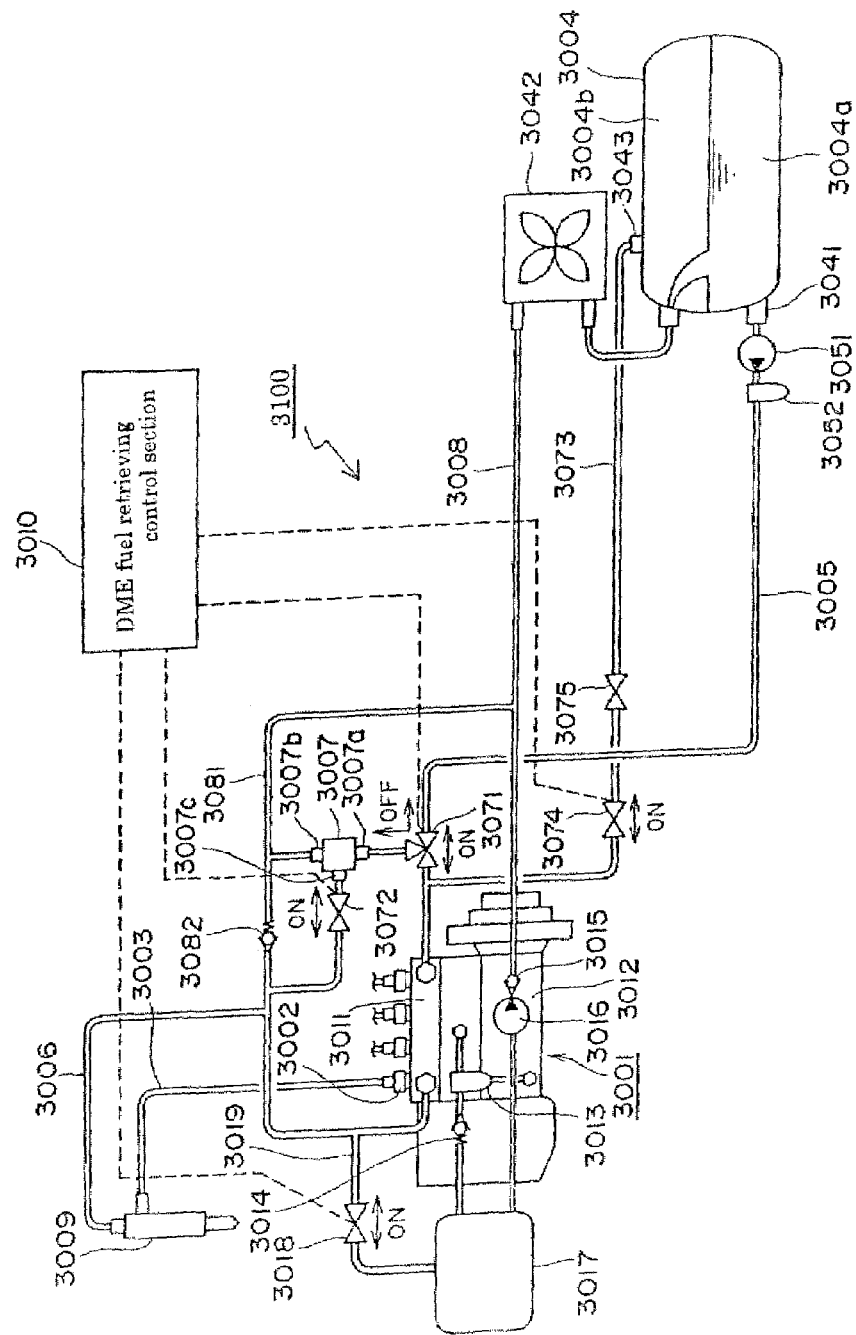
FIG. 21 is a schematic diagram of an eighth embodiment of the DME fuel supply device according to the invention of the present application.

FIG. 21 is a schematic diagram of an eighth embodiment of the DME fuel supply device according to the invention of the present application.

A DME fuel supply device 3100 for supplying DME fuel to a diesel engine has an injection pump 3001. The injection pump 3001 has the same number of injection pump elements 3002 as the number of cylinders which the diesel engine has. A feed pump 3051 pressurizes DME fuel reserved in a fuel tank 3004 to a specified pressure and delivers it into a feed pipe 3005. The fuel tank 3004 has a DME fuel delivery port 3041 which is located below the level of the DME fuel in the fuel tank 3004, and the feed pump 3051 is disposed in the vicinity of the DME fuel delivery port 3041 of the fuel tank 3004. The DME fuel delivered into the feed pipe 3005 is filtered by a filter 3051, and delivered to the injection pump 3001 via a three-way solenoid valve 3071. The three-way solenoid valve 3071 is ON in an injection state (while the diesel engine is operating) and permits flow in the direction indicated in the drawing.

A cam chamber 3012 in the injection pump 3001 has an exclusive lubricating system which is separated from the lubricating system of the diesel engine. An oil separator 3013 separates lubricating oil in the cam chamber 3012 in the injection pump 3001 containing DME fuel leaked into the cam chamber 3012 into DME fuel and lubricating oil and returns the lubricating oil to the cam chamber 3012. The DME fuel separated by the oil separator 3013 is delivered to a compressor 3016 via a check valve 3014 for preventing the pressure in the cam chamber 3012 from decreasing to atmospheric pressure or below, pressurized in the compressor 3016, and returned to the fuel tank 3004 via a check valve 3015 and the cooler 3042. The check valve 3015 is provided to prevent DME fuel from flowing in reverse direction from the fuel tank 3004 to the cam chamber 3012 when the diesel engine is stopped. The DME fuel supply device 3100 of this embodiment does not need an electric compressor, and the compressor 3016 uses a cam in the cam chamber 3012 as a driving source. Thus, it is possible to achieve a low power consumption DME fuel supply device 3100.

The DME fuel pressurized to a specified pressure by the feed pump 3051 and delivered from the fuel tank 3004 is delivered under pressure in a specified amount from each of the injection pump elements 3002 of the injection pump 3001 to a fuel injection nozzle 3009 provided in each of the cylinders of the diesel engine via an injection pipe 3003 at specified timing. An overflow fuel pipe 3081 is provided with an overflow valve 3082 to maintain the pressure of DME fuel in a fuel gallery 3011 at a specified pressure and to regulate overflowed DME fuel to flow only in the direction of being returned to the fuel tank. The DME fuel overflowed from the injection pump 3001 is returned to the fuel tank 3004 via the overflow fuel pipe 3081, the overflow valve 3082, an overflow return pipe 3008 and a cooler 3042. The DME fuel overflowed from each fuel injection nozzle 3009 is returned to the fuel tank 3004 via a nozzle return pipe 3006, the overflow fuel pipe 3081, the overflow return pipe 3008 and the cooler 3042.

The DME fuel supply device 3100 also has "residual fuel retrieving means" for retrieving DME fuel remaining in the fuel gallery 3011 of the injection pump 3001, the overflow fuel pipe 3081 and the nozzle return pipe 3006 into the fuel tank 3004 when the diesel engine is stopped. The "residual fuel retrieving means" has an aspirator 3007, a three-way solenoid valve 3071, a two-way solenoid valve 3072 and a DME fuel retrieving control section 3010. The DME fuel retrieving control section 3010 detects the operating state of the diesel engine (the injection/non-injection state of the DME fuel supply device 3100) and controls the ON and OFF of the three-way solenoid valve 3071, the two-way solenoid valve 3072, the feed pump 3051 and so on depending on the detected state. When the diesel engine is stopped, the DME fuel retrieving control section 3010 performs control to retrieve DME fuel remaining in the fuel gallery 3011, the overflow fuel pipe 3081, and the nozzle return pipe 3006.

The aspirator 3007 has an inlet 3007a, an outlet 3007b and a suction port 3007c. The inlet 3007a and the outlet 3007b are communicated with each other via a straight communication passage, and the suction port 3007c is branched at generally a right angle from the communication passage between the inlet 3007a and the outlet 3007b. The outlet of a communication passage, through which flow can pass when the three-way solenoid valve 3071 is OFF, is connected to the inlet 3007a, and the outlet 3007b is connected to a passage to the fuel tank 3004 via the cooler 3042. The suction port 3007c is connected to the two-way solenoid valve 3072, which is closed in an OFF state in the injection state (while the diesel engine is operating).

In the non-injection state (while the diesel engine is stopped), the DME fuel retrieving control section 3010 controls the three-way solenoid valve 3071 to be OFF to form the communication passage between the feed pipe 3005 and the inlet 3007a of the aspirator 3007, and also controls the two-way solenoid valve 3072 to be ON to communicate the overflow fuel pipe 3081 upstream from the overflow valve 3082 and the suction port 3007c of the aspirator 3007. Thus, DME fuel delivered from the feed pump 3051 is delivered not to the injection pump 3001 but to the aspirator 3007, passed from the inlet 3007a to the outlet 3007b, returned to the fuel tank 3004 via the overflow fuel pipe 3081 downstream from the overflow valve 3082, the overflow return pipe 3008 and the cooler 3042, and delivered again from the feed pump 3051 to the aspirator 3007. That is, the DM fuel is circulated via the aspirator 3007. DME fuel remaining in the fuel gallery 3011 in the injection pump 3001 and the overflow fuel pipe 3081 upstream from the overflow valve 3082 is evaporated by a suction force produced by the flow of DME fuel from the inlet 3007a to the outlet 3007b, and the evaporated DME fuel is sucked through the suction port 3007c, joins the flow of DME fuel from the inlet 3007a to the outlet 3007b and is retrieved into the fuel tank 3004.

The DME fuel supply device 3100 also has a vapor-phase pressure delivery pipe 3073 connecting an outlet for a vapor phase 3004b in the fuel tank 3004 (vapor phase delivery port 3043) and the inlet of the fuel gallery 3011 of the injection pump 3001. The vapor-phase pressure delivery pipe 3073 has a small-diameter portion 3075 where the inside diameter is partially reduced, and a vapor-phase pressure delivery pipe switching solenoid valve 3074 for opening and closing the vapor-phase pressure delivery pipe 3073. While DME fuel in the fuel gallery 3011, the overflow fuel pipe 3081 and the nozzle return pipe 3006 is sucked and retrieved into the fuel tank 3004 by the foregoing "residual fuel retrieving means", the DME fuel retrieving control section 3010 controls the vapor-phase pressure delivery pipe switching solenoid valve 3074 to be ON so that flow can pass through the vapor-phase pressure delivery pipe 3073 connecting the vapor phase 3004b in the fuel tank 3004 and the inlet of the fuel gallery 3011. The DME fuel in a liquid state remaining in the fuel gallery 3011, the overflow fuel pipe 3081 and the nozzle return pipe 3006 is delivered under pressure to the suction port 3007c of the aspirator 3007 by the high pressure of the vapor phase 3004b. The pressure is further increased by the small-diameter portion 3075 of the vapor-phase pressure delivery pipe 3073, where the inside diameter is partially reduced, and the DME fuel can be delivered under a higher pressure.

As described before, the suction force of the aspirator 3007 can only suck evaporated DME fuel at most. Thus, the time necessary to retrieve the DME fuel remaining in the fuel gallery 3011, the overflow fuel pipe 3081 and the nozzle return pipe 3006 can be significantly reduced by delivering the DME fuel in a liquid state to the suction port 3007c of the aspirator 3007 using the pressure of the vapor phase 3004b. Then, after a lapse of a predetermined period of time, the DME fuel retrieving control section 3010 closes only the vapor-phase pressure delivery pipe switching solenoid valve 3074 to shut off the communication between the fuel gallery 3011 and the high-pressure vapor phase 3004b. Since the pressures in the fuel gallery 3011, the overflow fuel pipe 3081 and the nozzle return pipe 3006 can be thereby further decreased, evaporation of residual DME fuel in a liquid state which was unable to be delivered by the pressure of the vapor phase is promoted. Thus, the time necessary for the "residual fuel retrieving means" to retrieve residual DME fuel can be further reduced.

A low-pressure tank 3017 with a sealed structure and a capacity which is smaller than that of the fuel tank 3004 is disposed between the oil separator 3013 and the compressor 3016. The low-pressure tank 3017 is communicated with the overflow fuel pipe 3081 upstream from the overflow valve 3082 via a purge pipe 3019. A purge pipe switching solenoid valve 3018 capable of opening and closing the purge pipe 3019 is disposed in the purge pipe 3019. The purge pipe switching solenoid valve 3018 is controlled by the DME fuel retrieving control section 3010. The purge pipe switching solenoid valve 3018 is controlled to be ON and opened so that the low-pressure tank 3017 and the overflow fuel pipe 3081 can be communicated with each other when the diesel engine is stopped, and controlled to be OFF and closed so that the communication between the low-pressure tank 3017 and the overflow fuel pipe 3081 can be shut off when the diesel engine is operating A check valve 3014 is disposed between the low-pressure tank 3017 and the oil separator 3013. The check valve 3014 maintains the pressure on the oil separator 3013 side constant and prevents DME fuel from flowing in reverse direction from the low-pressure tank 3017 to the oil separator 3013.

DME fuel separated from lubricating oil in the cam chamber 3012 by the oil separator 3013 is sucked by the compressor 3016 via the low-pressure tank 3017. Since the pressure in the low-pressure tank 3017 is decreased by the suction of the compressor 3016 and since the check valve 3014 maintains the pressure on the oil separator 3013 side constant, a low pressure is created in the low-pressure tank 3017. Since the low-pressure tank 3017 has a sealed structure, the low-pressure state can be maintained in the low-pressure tank 3017 even when the diesel engine is stopped and the compressor 3016 is stopped. When the purge pipe switching solenoid valve 3018 is controlled to be ON to communicate the low-pressure tank 3017 and the overflow fuel pipe 3081 while the low-pressure state is maintained in the low-pressure tank 3017 after stopping the diesel engine, part of DME fuel remaining in the overflow fuel pipe 3081 (and DME fuel in the nozzle return pipe 3006 when the two-way valve 3035 is ON and opened) is sucked and retrieved into the low-pressure tank 3017 by the negative pressure in the low-pressure tank 3017. The DME fuel retrieved into the low-pressure tank 3017 is sucked by the compressor 3016 and retrieved into the fuel tank 3004 when the diesel engine is stated again and the compressor 3016 starts operating.

Thus, when the purge pipe switching solenoid valve 3018 is controlled to be ON after the DME fuel remaining in the fuel gallery 3011, the overflow fuel pipe 3081 and the nozzle return pipe 3006 has been retrieved by the "residual fuel retrieving means", residual DME fuel which was unable to be retrieved by the "residual fuel retrieving means" can be sucked and retrieved into the low-pressure tank 3017 at once. Thus, the time necessary for the "residual fuel retrieving means" to retrieve residual DME fuel can be thereby reduced. The same effect can be expected when the above operation is performed before the "residual fuel retrieving means" retrieves DME fuel remaining in the fuel gallery 3011, the overflow fuel pipe 3081 and the nozzle return pipe 3006.

Figure 22:
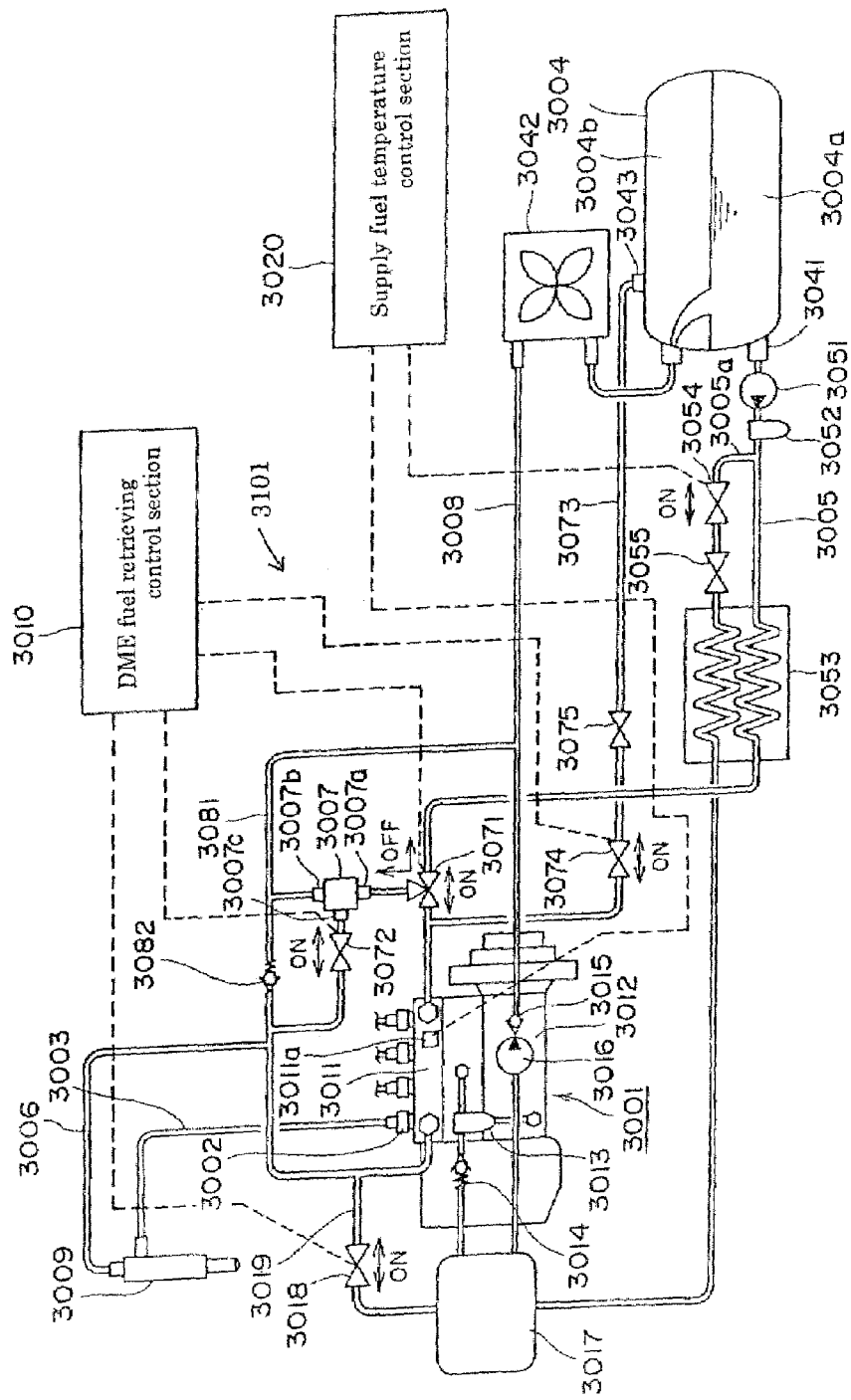
FIG. 22 is a schematic diagram of a ninth embodiment of the DME fuel supply device according to the invention of the present application.

A DME fuel supply device according to a ninth embodiment of the invention of the present application is provided with a "supply fuel cooling unit" for cooling DME fuel to be supplied to the injection pump 1 in addition to the foregoing eighth embodiment. FIG. 22 is a schematic diagram of the ninth embodiment of the DME fuel supply device according to the invention of the present application.

A DME fuel supply device 3101 has a "supply fuel cooling unit" having a temperature sensor 3011a as "temperature detecting means" for detecting the temperature of DME fuel in the fuel gallery 3011, a fuel cooler 3053 having a fuel carburetor 3055 for evaporating DME fuel as coolant, a coolant supply pipe 3005a for supplying DME fuel from the fuel tank 3004 to the fuel cooler 3053, a coolant supply pipe switching solenoid valve 3054 capable of opening and closing the coolant supply pipe 3005a, and a supply fuel temperature control section 3020. The supply fuel temperature control section 3020 controls the coolant supply pipe switching solenoid valve 3054 to control the temperature of DME fuel flowing through the feed pipe 3005 so that the temperature of DME fuel delivered from the fuel gallery 3011 to each injection pipe 3003 (injection fuel passage 3031) can be constant based on the temperature of DME fuel in the fuel gallery 3011 detected by the temperature sensor 3011a.

The fuel cooler 3053 evaporates DME fuel flowing through the coolant supply pipe 3005a with the fuel carburetor 3055 and cools DME fuel flowing through the feed pipe 3005 using the heat of vaporization of the DME fuel. The supply fuel temperature control section 3020 opens the coolant supply pipe switching solenoid valve 3054 so that DME fuel as coolant can be supplied to the fuel cooler 3053 to cool DME fuel flowing through the feed pipe 3005 when the temperature of DME fuel in the fuel gallery 3011 detected by the temperature sensor 3011a is higher than a specified value, and closes the coolant supply pipe switching solenoid valve 3054 so that DME fuel as coolant cannot be supplied to the fuel cooler 3053 when the temperature of DME fuel in the fuel gallery 3011 detected by the temperature sensor 3011a is lower than a specified value.

Since the temperature of DME fuel in the fuel gallery 3011 can be maintained constant by cooling DME fuel flowing through the feed pipe 3005 as described above, the injection characteristics of the fuel injection nozzle 3009 can be stabilized without correcting the injection amount of DME fuel with temperature in the injection pump 3001.

In a DME fuel supply device according to a tenth embodiment of the invention of the present application, a low-pressure tank 3017 is connected to a suction port of the compressor 3016. FIG. 23 is a schematic diagram of the tenth embodiment of the DME fuel supply device according to the invention of the present application.

A low pressure is created in the low-pressure tank 3017 by the suction of the compressor 3016, and the low-pressure state in the low-pressure tank can be maintained by a check valve 3171 even when the compressor 3016 is stopped. The low-pressure tank 3017 is communicated to the overflow fuel pipe 3081 upstream from the overflow valve 3082 via a purge pipe 3019, and a purge pipe switching solenoid valve 3018 capable of opening and closing the purge pipe 3019 is disposed in the purge pipe 3019. The purge pipe switching solenoid valve 3018 is controlled by the DME fuel retrieving control section 3010. The purge pipe switching solenoid valve 3018 is controlled to be ON and opened so that the low-pressure tank 3017 and the overflow fuel pipe 3081 can be communicated with each other when the diesel engine is stopped, and controlled to be OFF and closed so that the communication between the low-pressure tank 3017 and the overflow fuel pipe 3081 can be shut off when the diesel engine is operating. The other constitution is the same as that of the eighth embodiment, and hence its description will be omitted.

To retrieve residual DME fuel after stopping the diesel engine, the DME fuel retrieving control section 3010 retrieves DME fuel remaining in the fuel gallery 3011 and the overflow fuel pipe 3081 with the aspirator 3007 for a predetermined period of time and then controls the feed pump 3051 to be OFF to stop it and controls the two-way solenoid valve 3072 to be OFF to shut off the communication between the overflow fuel pipe 3081 and the suction port 3007c of the aspirator 3007. Then, the DME fuel retrieving control section 3010 controls the purge pipe switching solenoid valve 3018 to be ON to communicate the low-pressure tank 3017 maintained at a low pressure and the overflow fuel pipe 3081. DME fuel remaining in the overflow fuel pipe 3081 is sucked and retrieved into the low-pressure tank 3017 by the negative pressure in the low-pressure tank 3017. The DME fuel retrieved into the low-pressure tank 3017 is sucked by the compressor 3016 and retrieved into the fuel tank 3004 when the diesel engine is stated again and the compressor 3016 starts operating.

It should be understood that the invention of the present application is not limited to the above embodiments and that various changes and modifications may be made within the scope of the invention described in the scope of the appended claims and those are also included in the scope of the invention of the present application.

INDUSTRIAL APPLICABILITY

According to the invention of the present application, in a DME fuel supply device for a diesel engine, the time necessary to retrieve DME fuel remaining in the injection system after stopping the diesel engine into the fuel tank can be reduced. The DME fuel supply device can be suitably applicable to a diesel engine provided with an injection pump.

We claim:

1. A DME fuel supply device for a diesel engine having:
  an injection pump for delivering DME fuel supplied from a fuel tank via a feed pipe in a specified amount to an injection pipe in communication with a fuel injection nozzle of a diesel engine at specified timing;
  an overflow fuel pipe for returning the DME fuel overflowed from the fuel injection pump to the fuel tank;
  a nozzle return pipe for delivering the DME fuel overflowed from the fuel injection nozzle to the overflow fuel pipe; and
  residual fuel retrieving means for retrieving the DME fuel remaining in a fuel gallery, the nozzle return pipe and the overflow fuel pipe after stopping the diesel engine into the fuel tank;
  the DME fuel supply device comprising:
  a oil separator for separating the DME fuel contained in lubricating oil in the cam chamber in the injection pump having an exclusive lubricating system which is separated from the lubricating system of the diesel engine;
  a compressor for pressurizing the DME fuel separated by the oil separator and delivering it to the fuel tank;
  a low-pressure tank disposed between the oil separator and the compressor;
  a purge pipe for communicating the low-pressure tank and the overflow fuel pipe; and
  a purge pipe switching solenoid valve for opening and closing the purge pipe.

2. The DME fuel supply device for a diesel engine according to claim 1, further comprising a check valve disposed between the oil separator and the low-pressure tank for maintaining the pressure on the oil separator side and preventing DME fuel from flowing in reverse direction from the low-pressure tank to the oil separator.

3. A DME fuel supply device for a diesel engine having:
  an injection pump for delivering DME fuel supplied from a fuel tank via a feed pipe in a specified amount to an injection pipe in communication with a fuel injection nozzle of a diesel engine at specified timing;
  an overflow fuel pipe for returning the DME fuel overflowed from the fuel injection pump to the fuel tank;
  a nozzle return pipe for delivering DME fuel overflowed from the fuel injection nozzle to the overflow fuel pipe; and
  residual fuel retrieving means for retrieving the DME fuel remaining in the fuel gallery, the nozzle return pipe and the overflow fuel pipe after stopping the diesel engine into the fuel tank;
  the DME fuel supply device comprising:
  an oil separator for separating DME fuel contained in lubricating oil in the cam chamber in the injection pump having an exclusive lubricating system which is separated from the lubricating system of the diesel engine;
  a compressor for pressurizing the DME fuel separated by the oil separator and delivering it to the fuel tank;
  a low-pressure tank connected to a suction port of the compressor;
  a purge pipe for communicating the low-pressure tank and the overflow fuel pipe; and
  a purge pipe switching solenoid valve for opening and closing the purge pipe.

4. The DME fuel supply device for a diesel engine according to claim 3, further comprising a check valve disposed between the compressor and the low-pressure tank for maintaining the pressure in the low-pressure tank.

5. The DME fuel supply device for a diesel engine according to claim 1 to 4, further comprising DME fuel retrieving control section for performing control to retrieve DME fuel remaining in the fuel gallery, the nozzle return pipe and the overflow fuel pipe into the fuel tank with the residual fuel retrieving means for a predetermined period of time and then open the purge pipe switching solenoid valve to retrieve the DME fuel which was unable to be retrieved by the residual fuel retrieving means using a negative pressure in the low-pressure tank after stopping the diesel engine.

6. The DME fuel supply device for a diesel engine according to any one of claims 1 to 4, further comprising a vapor-phase pressure delivery pipe connecting an inlet of the fuel gallery to which the feed pipe is connected and a vapor phase in the fuel tank; and a vapor-phase pressure delivery pipe switching solenoid valve for opening and closing the vapor-phase pressure delivery pipe.

7. The DME fuel supply device for a diesel engine according to claim 6, wherein the vapor-phase pressure delivery pipe has a small-diameter portion where the inside diameter is partially reduced.

8. The DME fuel supply device for a diesel engine according to claim 7, further comprising a feed pump for pressurizing DME fuel in a fuel tank to a specified pressure and delivering it into a feed pipe, wherein the residual fuel retrieving means has an aspirator which is disposed between the feed pipe and the overflow fuel pipe and which returns the DME fuel delivered from the feed pump to the fuel tank so that the DME fuel remaining in the fuel gallery and the overflow fuel pipe can be drawn by the returning DME fuel and retrieved into the fuel tank.

9. The DME fuel supply device for a diesel engine according to claim 8, wherein the residual fuel retrieving means has a first solenoid valve for communicating a delivery port of the feed pipe with either an inlet to a circulation passage of the aspirator or an inlet to the fuel gallery, and a second solenoid valve for opening and closing the communication of a suction port of the aspirator with the fuel gallery and the overflow fuel pipe, wherein the DME fuel retrieving control section performs control to switch the first solenoid valve to communicate it with the inlet of the aspirator and open the second solenoid valve to form a passage for returning the DME fuel delivered from the feed pump to the fuel tank and open the vapor-phase pressure delivery pipe switching solenoid valve and to close only the vapor-phase pressure delivery pipe switching solenoid valve a lapse of a predetermined period of time for a predetermined period of time after stopping the diesel engine.

10. The DME fuel supply device for a diesel engine according to claim 9, wherein the DME fuel retrieving control section has means for opening the purge pipe switching solenoid valve after the second solenoid valve has been closed.

11. The DME fuel supply device for a diesel engine according to any ones of claims 1 to 4, further comprising:
a supply fuel cooling unit for cooling DME fuel flowing through the feed pipe with a cooling cycle using the DME fuel as coolant;
temperature detecting means for detecting the temperature of the DME fuel in the injection pump; and
a supply fuel temperature control section for controlling the supply fuel cooling unit to control the temperature of the DME fuel flowing through the feed pipe so that the temperature of the DME fuel to be delivered to the injection pipe can be constant based on the temperature of the DME fuel in the injection pump detected by the temperature detecting means.

12. The DME fuel supply device for a diesel engine according to claim 11, wherein the supply fuel cooling unit has a fuel cooler using DME fuel as coolant;
a coolant supply pipe for supplying the DME fuel as the coolant from the fuel tank to the fuel cooler; and
a coolant supply pipe switching solenoid valve for opening and closing the coolant supply pipe, wherein the fuel cooler evaporates the DMS fuel flowing through the coolant supply pipe and cools the DME fuel flowing through the feed pipe using the heat of vaporization of the DME fuel, and wherein the supply fuel temperature control section control the temperature of the DME fuel flowing through the feed pipe by opening and closing the coolant supply pipe switching solenoid valve.

13. The DME fuel supply device for a diesel engine according to claim 12, wherein the DME fuel supplied from the fuel tank to the fuel cooler and evaporated therein is delivered to the compressor.

14. The DME fuel supply device for a diesel engine according to any one of claims 1 to 4, wherein the DME fuel delivered from the injection pipe is supplied to a common rail and delivered to the fuel injection nozzle from the common rail.

15. A DME fuel supply device for a diesel engine for supplying DME fuel from a fuel tank to an injection nozzle of the diesel engine via a fuel gallery, comprising:
a cam chamber having an exclusive lubricating system which is separated from the lubricating system of the diesel engine;
an overflow fuel pipe for returning the DME fuel overflowed from the fuel gallery to the fuel tank;
a nozzle return pipe for delivering the DME fuel overflowed from the fuel injection nozzle to the overflow fuel pipe;
residual fuel retrieving means for retrieving the DME fuel remaining in the fuel gallery, the nozzle return pipe and the overflow fuel pipe after stopping the diesel engine into the fuel tank;
the DME fuel supply device comprising:
an oil separator for separating the DME fuel leaked from the fuel gallery into the cam chamber and mixed in lubricating oil;
a compressor for pressurizing the DME fuel separated by the oil separator and delivering it to the fuel tank;
a low-pressure tank disposed between the oil separator and the compressor;
a purge pipe for communicating the low-pressure tank and the overflow fuel pipe; and
a purge pipe switching solenoid valve for opening and closing the purge pipe.

16. A DME fuel supply device for a diesel engine for supplying DME fuel from a fuel tank to an injection nozzle of the diesel engine via a fuel gallery, comprising:
a cam chamber having an exclusive lubricating system which is separated from the lubricating system of the diesel engine;
an overflow fuel pipe for returning the DME fuel overflowed from the fuel gallery to the fuel tank;
a nozzle return pipe for delivering the DME fuel overflowed from the fuel injection nozzle to the overflow fuel pipe;
residual fuel retrieving means for retrieving the DME fuel remaining in the fuel gallery, the nozzle return pipe and the overflow fuel pipe after stopping the diesel engine into the fuel tank;
the DME fuel supply device comprising:
an oil separator for separating the DME fuel leaked from the fuel gallery into the cam chamber and mixed in lubricating oil;
a compressor for pressurizing the DME fuel separated by the oil separator and delivering it to the fuel tank;
a low-pressure tank connected to a suction port of the compressor;
a purge pipe for communicating the low-pressure tank and the overflow fuel pipe; and
a purge pipe switching solenoid valve for opening and closing the purge pipe.

* * * * *